US008074161B2

(12) United States Patent
Nicol et al.

(10) Patent No.: US 8,074,161 B2
(45) Date of Patent: Dec. 6, 2011

(54) METHODS AND SYSTEMS FOR SELECTION OF MULTIMEDIA PRESENTATIONS

(75) Inventors: John R. Nicol, Framington, MA (US); Christopher M. Martin, Walpole, MA (US); James E Paschetto, Waltham, MA (US); Kent B. Wittenberg, Lynnfield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 856 days.

(21) Appl. No.: 11/758,835

(22) Filed: Jun. 6, 2007

(65) Prior Publication Data

US 2007/0234196 A1    Oct. 4, 2007

Related U.S. Application Data

(60) Division of application No. 09/560,006, filed on Apr. 27, 2000, now Pat. No. 7,281,199, which is a continuation-in-part of application No. 09/302,874, filed on Apr. 30, 1999, now Pat. No. 6,515,656.

(60) Provisional application No. 60/137,688, filed on Jun. 4, 1999, provisional application No. 60/136,002, filed on May 26, 1999, provisional application No. 60/129,297, filed on Apr. 14, 2009.

(51) Int. Cl.
*G06F 13/00* (2006.01)

(52) U.S. Cl. ......... 715/203; 715/201; 715/205; 715/208
(58) Field of Classification Search .................. 715/200, 715/201, 202, 203, 205, 208, 234, 255, 273
See application file for complete search history.

(56) References Cited

U.S. PATENT DOCUMENTS 5,191,410 A    3/1993  McCalley et al.
5,395,243 A    3/1995  Lubin et al.
(Continued)

FOREIGN PATENT DOCUMENTS
WO          98/03963         1/1998
(Continued)

OTHER PUBLICATIONS

Kerne, A. "Collage Machine: Temporality and Indeterminancy in Media Browsing Via Interface Ecology", In Proceedings of CHI '97: Human Factors in Computing Systems, Extended Abstracts, ACM Press, 1997, pp. 297-298.

(Continued)

*Primary Examiner* — Stephen Hong
*Assistant Examiner* — Gregory J Vaughn

(57) ABSTRACT

Described are a variety of techniques for viewing multimedia-based information in accordance with user controls for the speed and direction of the multimedia presentation. Different techniques for presenting multimedia data items are disclosed. User controls providing control for speed and direction in accordance with a user selection device being in a particular location. When a user device is within the defined area, the speed and direction control are on. When the user selection device leaves the defined area, the speed and direction are off. Also described is a system using a browser tool for displaying multimedia data in accordance with these viewing techniques. Multimedia data items displayed with the viewing techniques are indices into multimedia presentations. A user selection is made by viewing the multimedia data items and control is transferred accordingly to an appropriate application to present a multimedia presentation corresponding to a selected multimedia data item. A technique is disclosed for generating an index database of the multimedia data items used as indices into the multimedia presentations.

14 Claims, 34 Drawing Sheets

U.S. PATENT DOCUMENTS

| | | | |
|---|---|---|---|
| 5,440,678 A | | 8/1995 | Eisen et al. |
| 5,451,998 A | | 9/1995 | Hamrick |
| 5,519,828 A | | 5/1996 | Rayner |
| 5,526,480 A | | 6/1996 | Gibson |
| 5,604,800 A | * | 2/1997 | Johnson et al. ............... 713/189 |
| 5,644,737 A | | 7/1997 | Tuniman et al. |
| 5,649,234 A | | 7/1997 | Klappert et al. |
| 5,678,015 A | | 10/1997 | Goh |
| 5,680,639 A | | 10/1997 | Milne et al. |
| 5,717,854 A | * | 2/1998 | Egawa et al. ................. 709/219 |
| 5,734,805 A | | 3/1998 | Isensee et al. |
| 5,786,818 A | | 7/1998 | Brewer et al. |
| 5,786,820 A | | 7/1998 | Robertson |
| 5,815,154 A | | 9/1998 | Hirschtick et al. |
| 5,822,537 A | | 10/1998 | Katseff et al. |
| 5,838,319 A | | 11/1998 | Guzak et al. |
| 5,847,709 A | | 12/1998 | Card et al. |
| 5,862,403 A | * | 1/1999 | Kanai et al. ........................ 710/6 |
| 5,864,868 A | | 1/1999 | Contois |
| 5,867,177 A | | 2/1999 | Okuyama et al. |
| 5,894,333 A | | 4/1999 | Kanda et al. |
| 5,933,141 A | | 8/1999 | Smith |
| 5,953,005 A | | 9/1999 | Liu |
| 5,959,621 A | | 9/1999 | Nawaz et al. |
| 5,970,471 A | | 10/1999 | Hill |
| 5,978,875 A | * | 11/1999 | Asano et al. .................. 710/107 |
| 5,990,898 A | | 11/1999 | Urano |
| 5,995,094 A | | 11/1999 | Eggen et al. |
| 6,006,241 A | | 12/1999 | Purnaveja et al. |
| 6,008,807 A | | 12/1999 | Bretschneider |
| 6,009,429 A | | 12/1999 | Greer et al. |
| 6,014,137 A | | 1/2000 | Burns |
| 6,016,145 A | | 1/2000 | Horvitz et al. |
| 6,028,600 A | | 2/2000 | Rosin et al. |
| 6,032,130 A | | 2/2000 | Alloul et al. |
| 6,044,365 A | | 3/2000 | Cannon et al. |
| 6,049,333 A | | 4/2000 | LaJoie et al. |
| 6,058,417 A | * | 5/2000 | Hess et al. ..................... 709/219 |
| 6,064,379 A | | 5/2000 | DeMoney |
| 6,076,070 A | * | 6/2000 | Stack .............................. 705/20 |
| 6,084,582 A | | 7/2000 | Qureshi et al. |
| 6,104,398 A | * | 8/2000 | Cox et al. ...................... 715/821 |
| 6,144,991 A | | 11/2000 | England |
| 6,189,003 B1 | | 2/2001 | Leal |
| 6,226,655 B1 | | 5/2001 | Borman et al. |
| 6,301,586 B1 | | 10/2001 | Yang et al. |
| 6,342,904 B1 | | 1/2002 | Vasudevan et al. |
| 6,388,688 B1 | * | 5/2002 | Schileru-Key ................. 715/854 |
| 6,390,151 B1 | * | 5/2002 | Christman et al. ............ 141/231 |
| 6,453,420 B1 | * | 9/2002 | Collart ............................ 726/26 |
| 6,505,171 B1 | | 1/2003 | Cohen et al. |
| 6,529,920 B1 | | 3/2003 | Arons et al. |
| 6,577,329 B1 | | 6/2003 | Flickner et al. |
| 6,771,875 B1 | | 8/2004 | Kunieda et al. |
| 2003/0133702 A1 | * | 7/2003 | Collart .......................... 386/125 |

FOREIGN PATENT DOCUMENTS

| | | |
|---|---|---|
| WO | WO/98/03953 | 1/1998 |
| WO | 98/56188 | 12/1998 |

OTHER PUBLICATIONS

J.D. Hollan, et al., "Information Visualization", Handbook of Human-Computer Interaction, North Holland, pp. 33-48 M.G. Helander, T.K. Landauer, and P.V. Prabhu (eds.) (1997).

Komlodi et al., "Key Frame Preview Technique for Video Browsing", In Proceedings of Digital Libraries '98 (Pittsburgh, PA), ACM Press, 1998, pp. 118-125.

Tse et al., "A Dynamic Key Frame Presentation Techniques for Augmenting Video Browsing", In Proceeding of AVI '98: Advanced Visual Interfaces (L'Aquila, Italy), May 1998, ACM Press, pp. 185-194.

Wittenburg et al., "Rapid-Fire Image Previews for Information Navidagation", In Proceedings of AVI '98: Advanced Visual Interfaces (L'Aquila, Italy), 1998, pp. 76-82, http://acat.gte.com/aiit/kentw/homepage/papers/avi98.pfd.

Christel et al., "Multimedia Abstractions for a Digital Video Library", In Proceedings of Digital Libraries '97 (Philidelphia, PA), ACM Press, 1997, pp. 21-29.

Taniguchi et al., "An Intuitive and Efficient Access Interface to Real-Time Incoming Video Based on Automatic Indexing", In Proceedings of ACM Multimedia '95 (San Francisco, CA), Nov. 1995, ACM Press, 1995, pp. 25-33.

Yeo et al., "Retrieving and Visualizing Video", Communications of the ACM 40 (12), 1997, pp. 43-52.

Enarsson, Magnus. "ET Message Scroll" (version 2.1, Java.TM. applet). Submitted Jun. 7, 1998 to jars.com, pp. 1-3.

Darnell, Daniel P. "Ultimate Solitaire!" (Java.TM.applet). Found at ourworld.compuserve.com/homepages/d_jdarnelll/solapp.htm via jars.com search. .RTM, 1997, pp. 1-2.

Simmons, Dale. "Just-in-Time Knowledge" (conference paper). Delivered Mar. 18, 1997. Found at www.atlantis.com/avalon/perfpara.htm, pp. 1-8.

"Avalon to Incorporate Microsoft's NetMeeting.TM. into BRIGHTLight.TM." (Press Release dated Mar. 31, 1998). Found at www.atlantis.com/avalon/anew/htm, pp. 1-2.

Tze, Jay. "ISCUpScroll" (Java.TM. applet). Mecklermedia Corporation, .RTM.1998. Found at javaboutique.internet.com, pp. 1-5.

Wittenburg, et al., "Polynesian Navigation: Locomotion and Previewing Aspects", published in Proceedings of CHI '98: Extended Abstracts (Apr. 1998, Los Angeles, CA USA), http://acat.gte.com/aiit/kentw/homepage/papers/chi98.htm. pp. 317-318 (1-3).

England et al., "IBrowse: The Bellcore Video Library Toolkit", In Proceedings SPIE Photonics West '96: Storage and Retrieval for Image and Video Database IV (San Jose, CAI, Jan. 1996, pp. 254-264.

Ding, w., "A Study on Video Browsing Strategies", Nov. 10, 1998 http://www.lean.umd.edu/wp/speedexp.html, pp. 1-20.

* cited by examiner

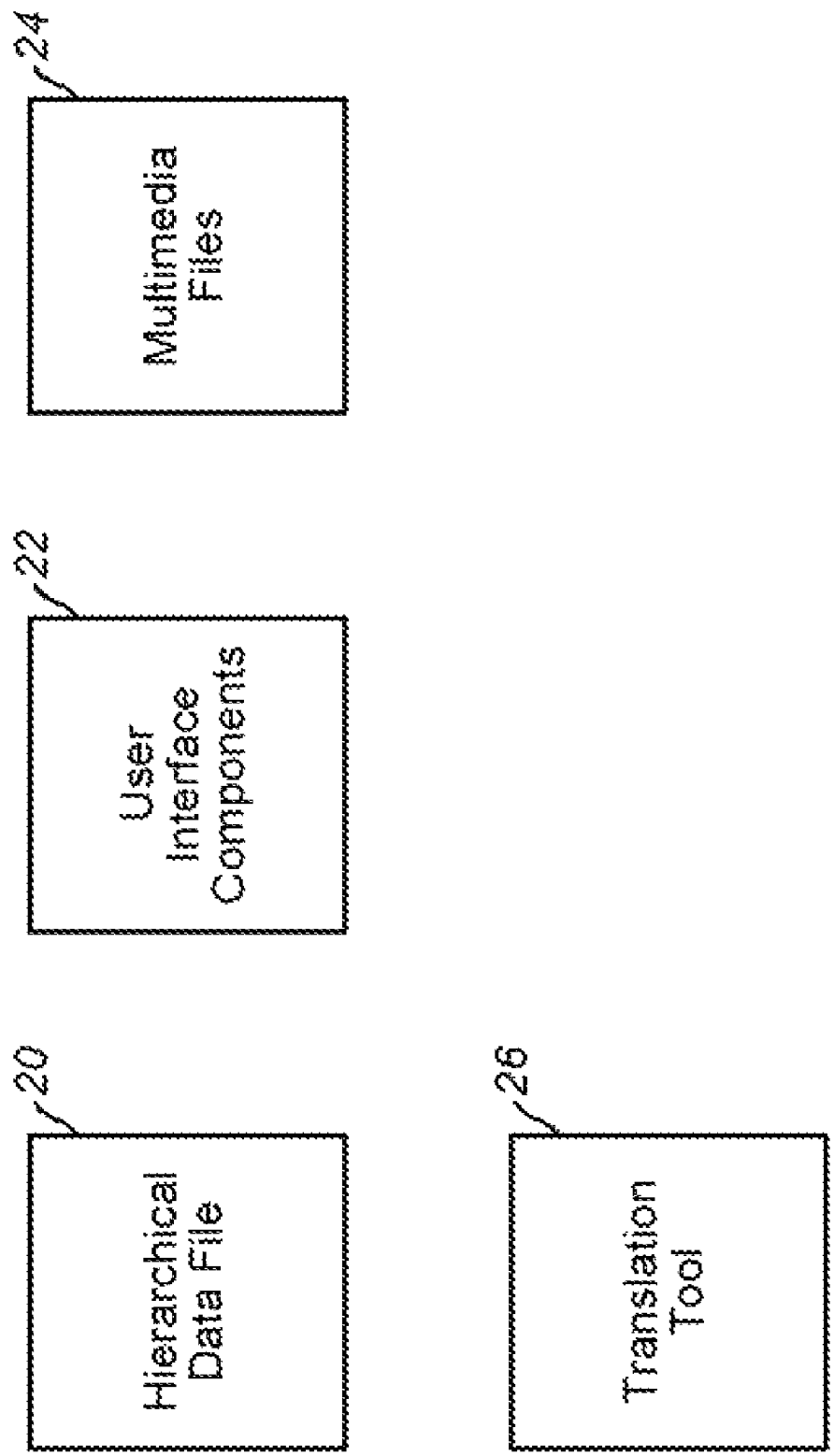

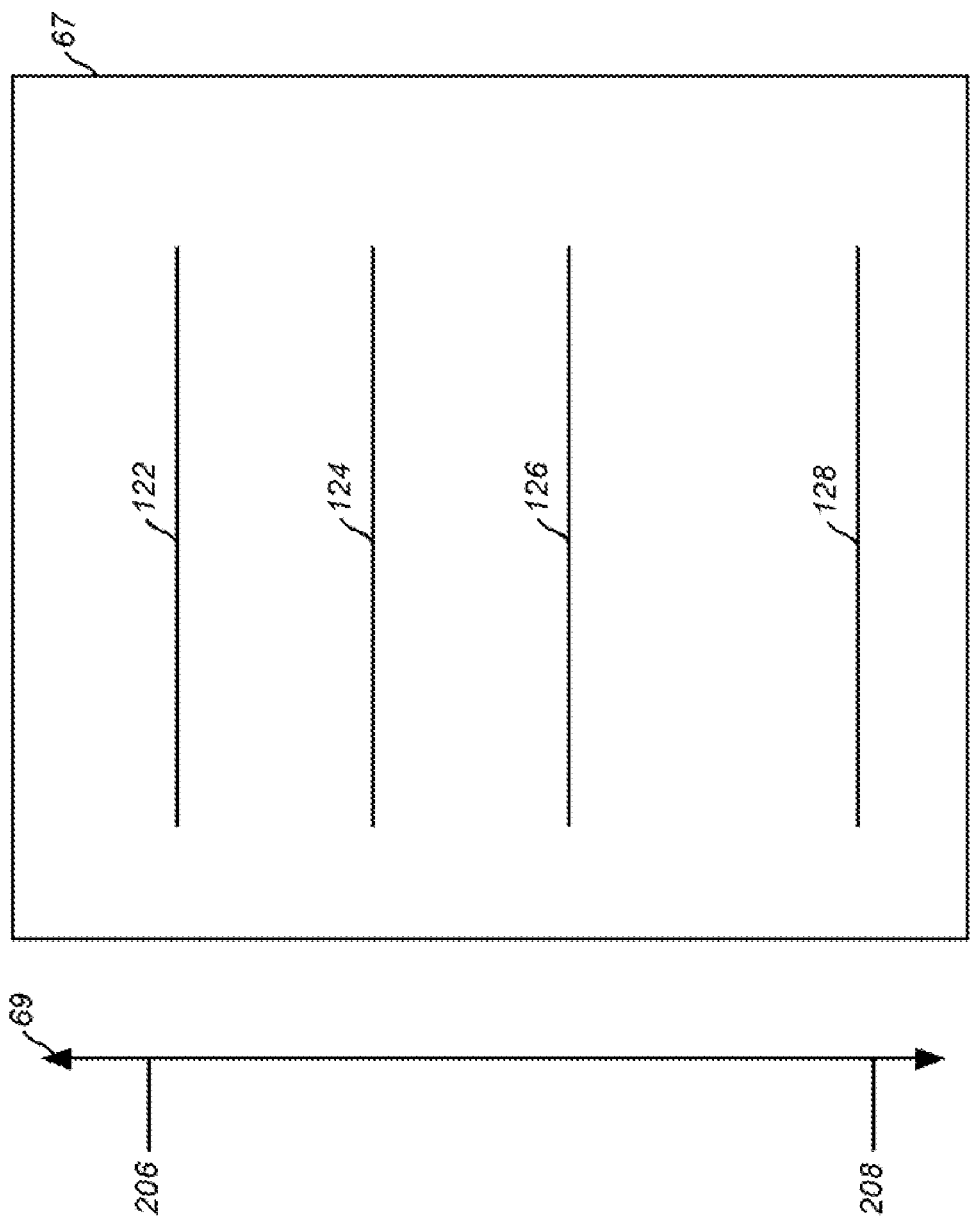

| Movie 1 | Index 1 | ... | Index n |
| Movie 2 | Index 1 | ... | Index n |
| ... | ... | ... | ... |
| Movie n | Index 1 | ... | Index n |

METHODS AND SYSTEMS FOR SELECTION OF MULTIMEDIA PRESENTATIONS

REFERENCES TO RELATED APPLICATIONS

This application is a continuation of U.S. patent application Ser. No. 09/560,006, filed Apr. 27, 2000, which claims priority from U.S. Provisional Application No. 60/137,688, filed Jun. 4, 1999, U.S. Provisional Application No. 60/136,002, filed May 26, 1999, and is a continuation-in-part of U.S. patent application Ser. No. 09/302,874, filed Apr. 30, 1999, which claims priority to U.S. Provisional Application No. 60/129,297, filed Apr. 14, 1999, each of which is incorporated herein by reference.

BACKGROUND

This application generally relates to computer systems, and more particularly to computer executed techniques for locating and selecting information.

Computer systems may be used in a variety of applications and environments. For example, in commercial applications of computer systems, a computer may assist a user in making a decision or choice based on information that is viewed using the computer. A computer storing information may be used to display information to a user. Subsequently, the user may make a decision or selection in light of the information presented. One type of information from which a user may make a selection is multimedia data.

When selecting and searching for items within multimedia data, one concern is what to utilize as an index into the multimedia data. One technique uses video key frames as an approach to indexing or accessing into portions of multimedia data. For example, video key frames may serve as reference frames and be used to index into videos. However, a problem may be encountered when the key frames are similar in that a user is associating a key frame with a distinct portion of a video segment. Additionally, when there are multiple media streams associated with one presentation, it may not be clear which one of the media streams to use as an index. In this instance, for example, use of video key frames as an index into portions of multimedia data for selecting and browsing may not be adequate.

Another problem is how to display multimedia data items and associated indices to enable one to browse and select a corresponding presentation. Browsing and selecting techniques, such as those employed by an Internet browser like Internet Explorer or Netscape Navigator, may be used in conjunction with static data or content information. However, these techniques may not be particularly suitable for use with temporal based multimedia information such as the foregoing video information and other types of multimedia data that may be used as indices into multimedia presentations being browsed.

Thus, there is required a technique for efficiently locating, browsing, and indexing multimedia information.

BRIEF DESCRIPTION OF THE DRAWINGS

The above-mentioned and other features of the invention will now become apparent by reference to the following description taken in connection with the accompanying drawings, in which:

FIG. 2 is an example of a block diagram of software components included in the system of FIG. 1;
FIG. 12A is an example of an embodiment of a top-down view of multimedia data presented using the flyby effect and layout technique of FIG. 11;
FIG. 21 is an example of an embodiment of a data structure used to associate indices with each multimedia presentation item.

SUMMARY OF THE INVENTION

In accordance with one aspect of the invention is a method and computer program product for selecting a multimedia presentation. A subset of multimedia presentations are determined in accordance with predetermined criteria. One or more multimedia data items are determined. Each of the one or more multimedia data items is an index into a corresponding one of the subset of multimedia presentations. The one or more multimedia data items are viewed using a browser. Direction and speed of the one or more multimedia data items viewed is controlled. A first of the one or more multimedia data items is selected. Control is transferred to machine executable code associated with a first multimedia presentation having the first multimedia data item as an index.

In accordance with another aspect of the invention is a method and apparatus for selecting a multimedia presentation. One or more indices are determined for a multimedia presentation. The multimedia presentation has a first media stream and a second media stream. A portion of the first media stream is used as an index into a portion of said second media stream. Information about the indices is stored in a database. Multimedia objects are displayed in accordance with the information about the indices in the database using a browser. Direction and speed of the multimedia objects displayed are controlled. A first of the multimedia objects is selected. A software program is invoked for presenting the multimedia presentation having the first multimedia object as an index.

In accordance with yet another aspect of the invention is a method and apparatus for selecting a multimedia presentation. A subset of multimedia presentation is determined in accordance with predetermined criteria. One or more multimedia data items is determined. Each of the one or more multimedia data items is an index into a corresponding one of the subset of multimedia presentations. One or more multimedia data items is viewed using a browser to select a multimedia presentation. Direction and speed of the one or more multimedia data items viewed is controlled. A first of the one or more multimedia data items associated with the multimedia presentation is selected.

DETAILED DESCRIPTION OF THE PREFERRED EMBODIMENT

Figure 1:
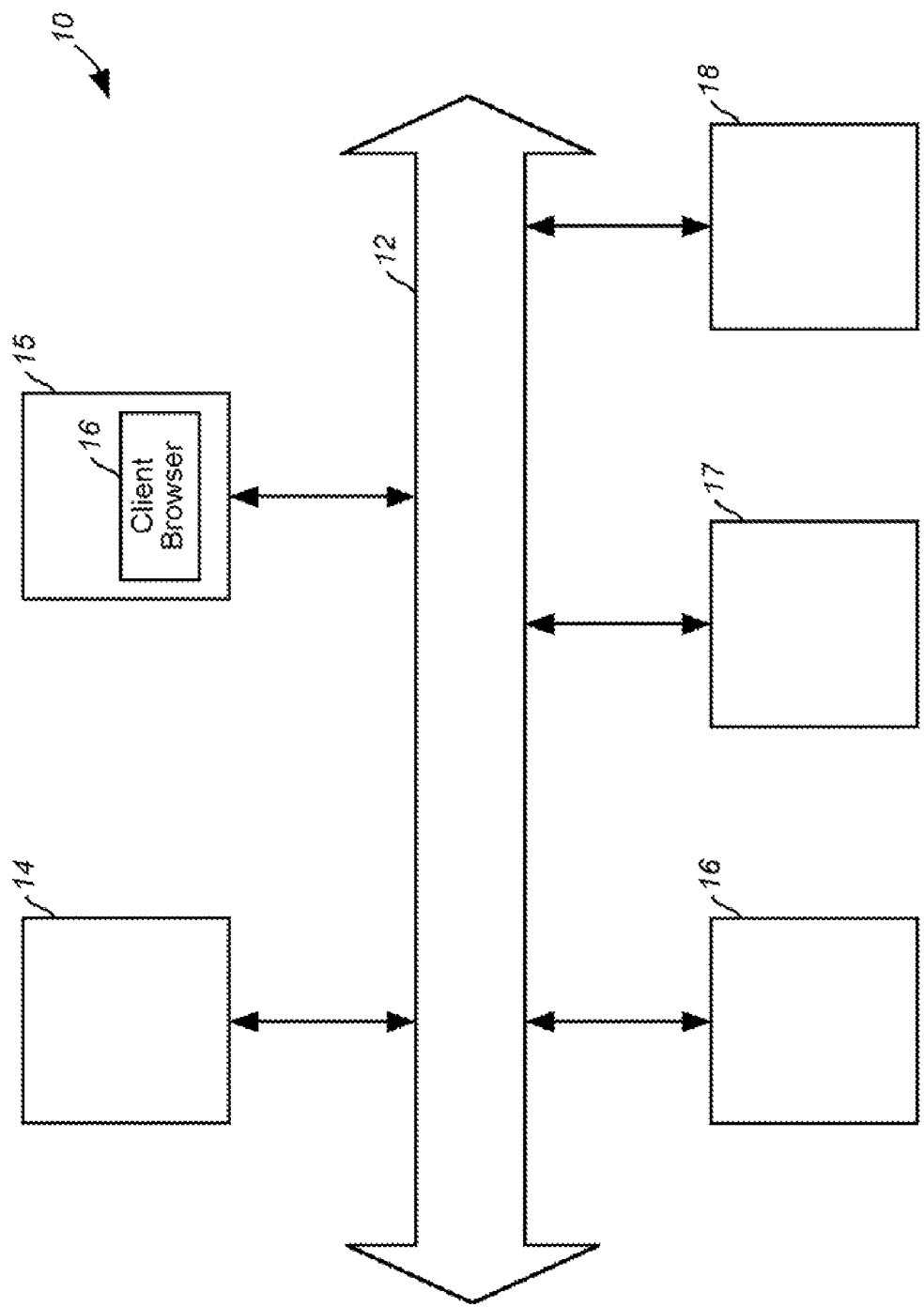
FIG. 1 is an example of an embodiment of a system.

Referring now to FIG. 1, shown is an embodiment of a system. A computer system 10 is shown to include a network 12 by which computer nodes 14-18 may communicate with each other. In the computer system 10 of FIG. 1, one of the computer nodes, such as node 15, acts as a client node upon which a user executes a client browser 16. The client node 15 communicates with one or more other nodes in the system 10 in which the one or more other nodes in the computer system 10, such as node 14, may act as a server node providing certain functions or responding to certain requests made by the client browser executing in the client node 15.

It should be noted that the system of FIG. 1 may include one or more computer nodes and the nodes, if there are more than one, may communicate through any type of communications medium, such as a network, a hardwire connection, or other means of communication known to those skilled in the art. It should also be noted that each of the computer nodes in the system 10 may be any type of computer processor, such as a commercially available personal computer, or a larger scale multi-user computer system.

Referring now to FIG. 2, shown is an embodiment of various software components that may be included in one or more nodes of the computer system 10 of FIG. 1. Generally, the software components in FIG. 2 may be used to produce the files needed to build a software browsing tool. Additionally, some of the components included in FIG. 2 are files that may be used by the software browsing tool once complete. Generally, the software browsing tool that will be described in paragraphs that follow is a tool providing overviews of dynamically specified data for the purpose of, for example, previewing or assessing data. Generally, the tool presents an organizational structure by which a user may view various data components and objects, such as those associated with image-based and/or multimedia data presentations.

Included in FIG. 2 is a hierarchical data file 20, user interface components 22, multimedia files 24, and a translation tool 26. The hierarchical data file 20 generally includes a description of the various data components to be presented and viewed by a user in some type of hierarchical organization. In one embodiment, the hierarchical data file may include a list of the various URLs specifying images and/or other multimedia data files to be presented to a user. Additionally, various URLs are grouped together to represent the grouping hierarchy by which these components are to be presented. For example, the hierarchical data file may include a nesting structure nesting various groups of one or more of the URL identified files presented to the user. The user interface components 22 generally include software used to produce the user interface displays with the browsing software tool. As will be described in paragraphs that follow, user interface components may include, for example, JavaScript code and data, and dynamic HTML files. Multimedia data files 24 generally include multimedia data to be presented to the user in conjunction with the user interface. Generally, the multimedia data files include that data which is organized and represented by the hierarchical data file. It should also be noted that other types of data files, such as multimedia data files including audio files may also be included in other embodiments. The translation tool 26 is generally used to produce other pieces of software which are used in displaying the user interface and associated data files. In one embodiment, the translation tool 26 includes Java code to produce files which will be described in conjunction with FIG. 3.

It should generally be noted that other embodiments may include additional software components from those described in FIG. 2.

Figure 2A:
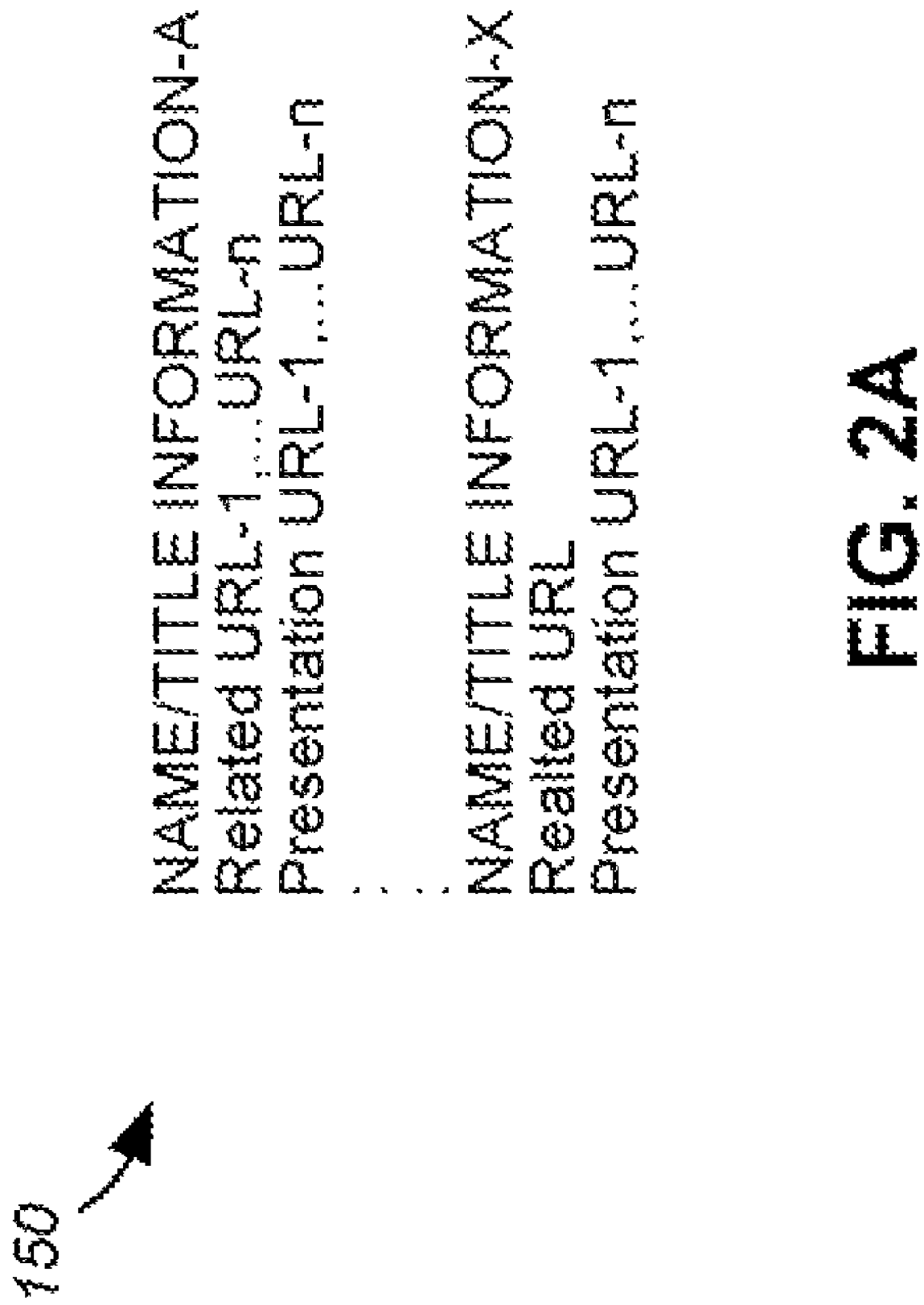
FIG. 2A is an example of one embodiment of the hierarchical data file of FIG. 2.

Referring now to FIG. 2A, shown is an example of an embodiment of a hierarchical data file as included in FIG. 2. The hierarchical data file includes data 150 that may be grouped together as previously set forth in conjunction with FIG. 2. In this embodiment, the hierarchical data file, for each grouping of one or more multimedia files, includes NAME/TITLE INFORMATION, one or more Related URLs, and one or more Presentation URLs. Generally, the NAME/TITLE INFORMATION is a text description of the multimedia files that are the Presentation URLs. The NAME/TITLE INFORMATION may be included, as in a menu area, as will be described in following paragraphs. The Presentation URLs are one or more multimedia files presented to the user in a presentation area, for example, of a user interface. The one or more Related URLs may annotate or further describe the one or more Presentation URLs. For example, the Presentation URLs may identify images of various types of cars by a manufacturer. One of the Related URLs may identify a website of the manufacturer. The NAME/TITLE INFORMATION may be a text description identifying the manufacturer and type of cars presented. Another one of the Presentation URLs may be a video clip of a commercial for the types of cars presented. Yet another Presentation URL may identify an audio file of a recorded jingle or song by the manufacturer as used, for example, in a commercial.

Figure 3:
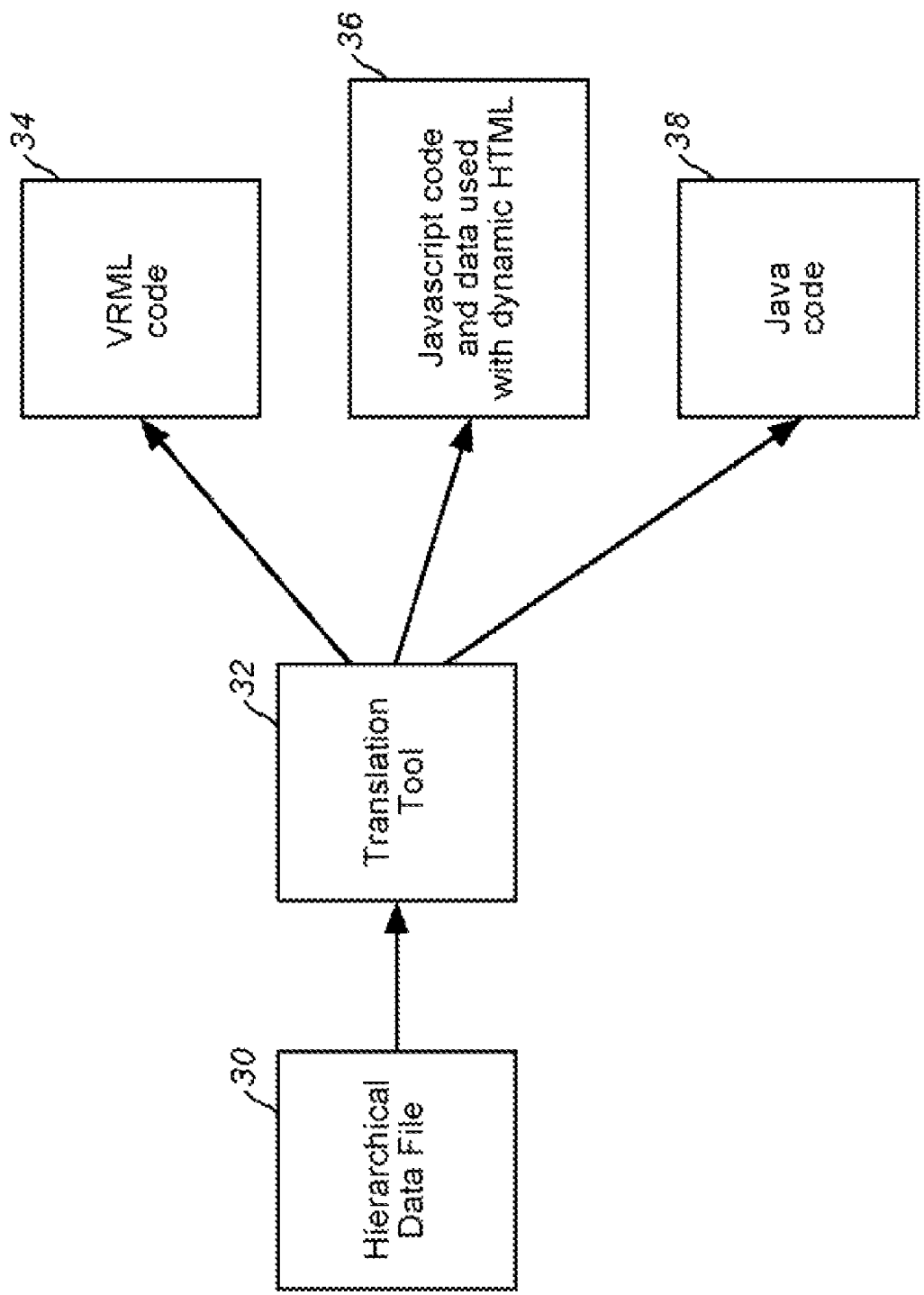
FIG. 3 is an example of an embodiment of a block diagram illustrating the flow of control in producing and using various software components included in the system of FIG. 1.

Referring now to FIG. 3, shown is an example of an embodiment of the various data files used and produced by the translation tool 32 to display the user interface and provide the software browsing tool. The hierarchical data file 30 is used as input to the translation tool 32. The translation tool 32 may produce a variety of software output files. Generally, the software output files are included in the software browsing tool used to present data. The actual output produced by the translation tool is in accordance with the actual implementation of the various components of the software browsing tool. For example, in one preferred embodiment, the translation tool produces the VRML code 34. Generally, VRML code 34 is code written in a language called Virtual Reality Modeling Language. As known to those skilled in the art, a VRML player which interprets or executes the VRML code 34 may be included in browsers such as the Netscape 4.0 or the Internet Explorer 4.0 browser. The VRML player, for example, is one component required to execute the VRML code which implements one of the components of the browsing software which will be described in paragraphs that follow.

The translation tool 32 may also produce JavaScript code and data used with, for example, dynamic HTML files 36. Generally, if an implementation or embodiment includes the use of HTML files or VRML code 34, the translation tool 32 may generate JavaScript code and data.

The translation tool 32 may also produce Java Code 38. Java Code 38 may be used as an alternative to writing various components of the software browsing tool using the dynamic HTML files.

It should generally be noted that the software components of FIG. 2 as well as additional software components included in other embodiments may be included on one machine, or on any combination of different nodes in the system of FIG. 1. It should also be noted that various embodiments may include various restrictions in accordance with the particular versions of software, for example, used in a particular embodiment. For example, if the translation tool 32 of FIG. 3 includes Java code which is run using a version 1.1 Java applet with the default security model, it should be noted that this version of Java is only able to load components from the same machine that it was loaded from due to the security model of that version. Thus, various components described in FIG. 2 must reside on the same computer node of FIG. 1, such as the Java code used for the translation 32, the multimedia files 24, such as sound files, the user interface components, and the hierarchical data file 20.

In contrast, if this default is changed or another version of Java is used to execute the Java code included in the translation tool 32, this restriction may be removed. Thus, the various components described may be located on other nodes of the computer system 10 of FIG. 1. It should also be noted that when different software components as included in FIG. 2 are located on different nodes in the computer system 10 of FIG. 1, different transferring mechanisms may be used to transfer files. For example, in a network environment with the Internet protocol, HTTP may be used. Additionally, FTP may be used to fetch files.

Figure 4:
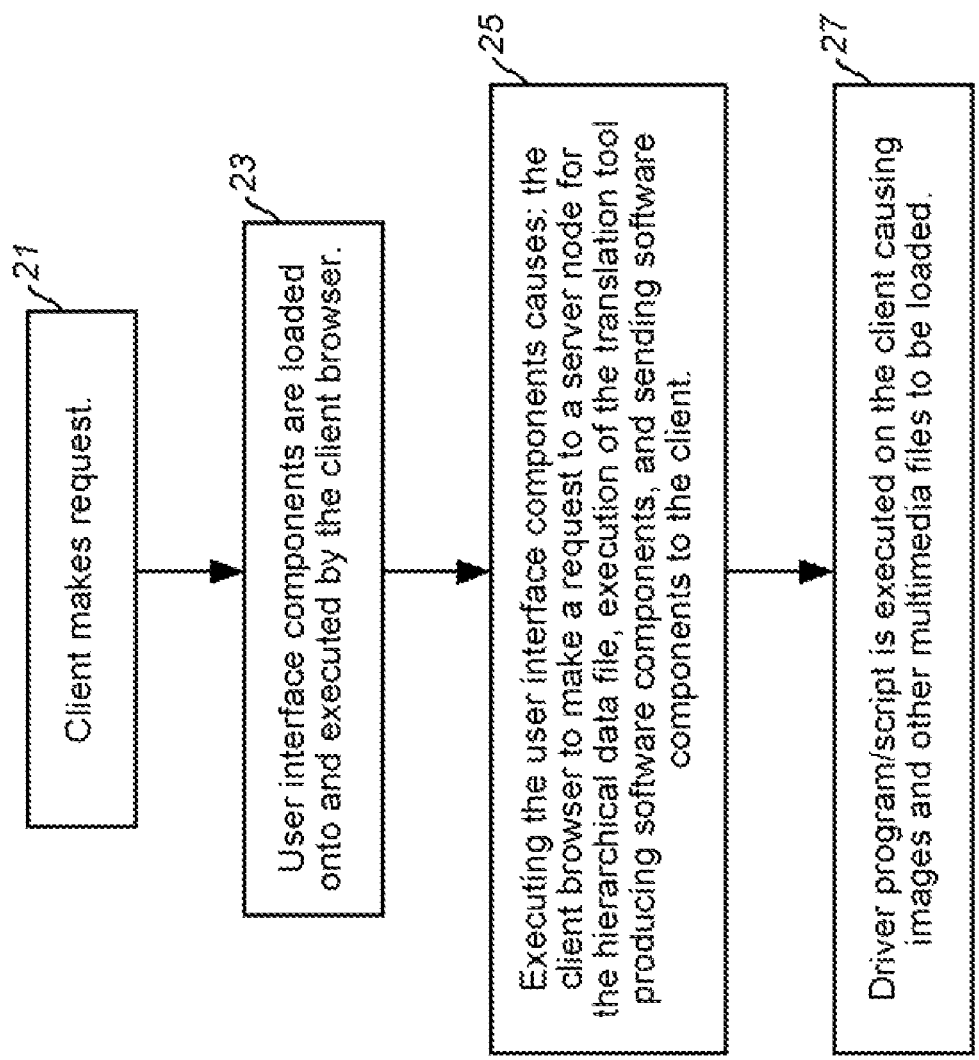
FIG. 4 is a flowchart of an example embodiment of method steps performed at run time when a client browser 16 issues a request for the software browsing tool.

Referring now to FIG. 4, shown is a flowchart of an example of an embodiment of the method steps of what happens at run time when a client browser 16 issues a request for the software browsing tool. At step 21, the client makes a request. For example, referring back to FIG. 1, the client browser 16 on node 15 may issue a request using network 12 to communicate to another server node, such as node 14. At step 23, the user interface components located on a node, such as server node 14, are loaded into and executed on the client system by the client browser 16. At step 25, execution of the user interface components causes the client browser 16 to make a request to the server node 14 for the hierarchical data file. Additionally, execution of the user interface components causes the translation tool to execute producing the various software components of the software browsing tool and subsequently sending these software components produced to the client node 15. At step 27, these translated files produced by the translation tool 32 are executed by the client browser on the client system 15 causing images and other multimedia files to be loaded in accordance with a particular embodiment. It should be noted that depending upon where the various software components of FIG. 2 are located, various communication requests may need to be issued by the server node, for example, to obtain the necessary files to produce the software components. Additionally, as noted at step 27, the precise images and other multimedia files loaded are in accordance with each particular embodiment. For example, use of the VRML player causes all images to be loaded by default. Other software tools may have other defaults as well as variants which may allow image files and other multimedia data files to be loaded on demand. It should also be noted that in an embodiment where all of the files in processing occurs on the client system, no additional communication may be needed since the client and server node are the same.

Figure 5:
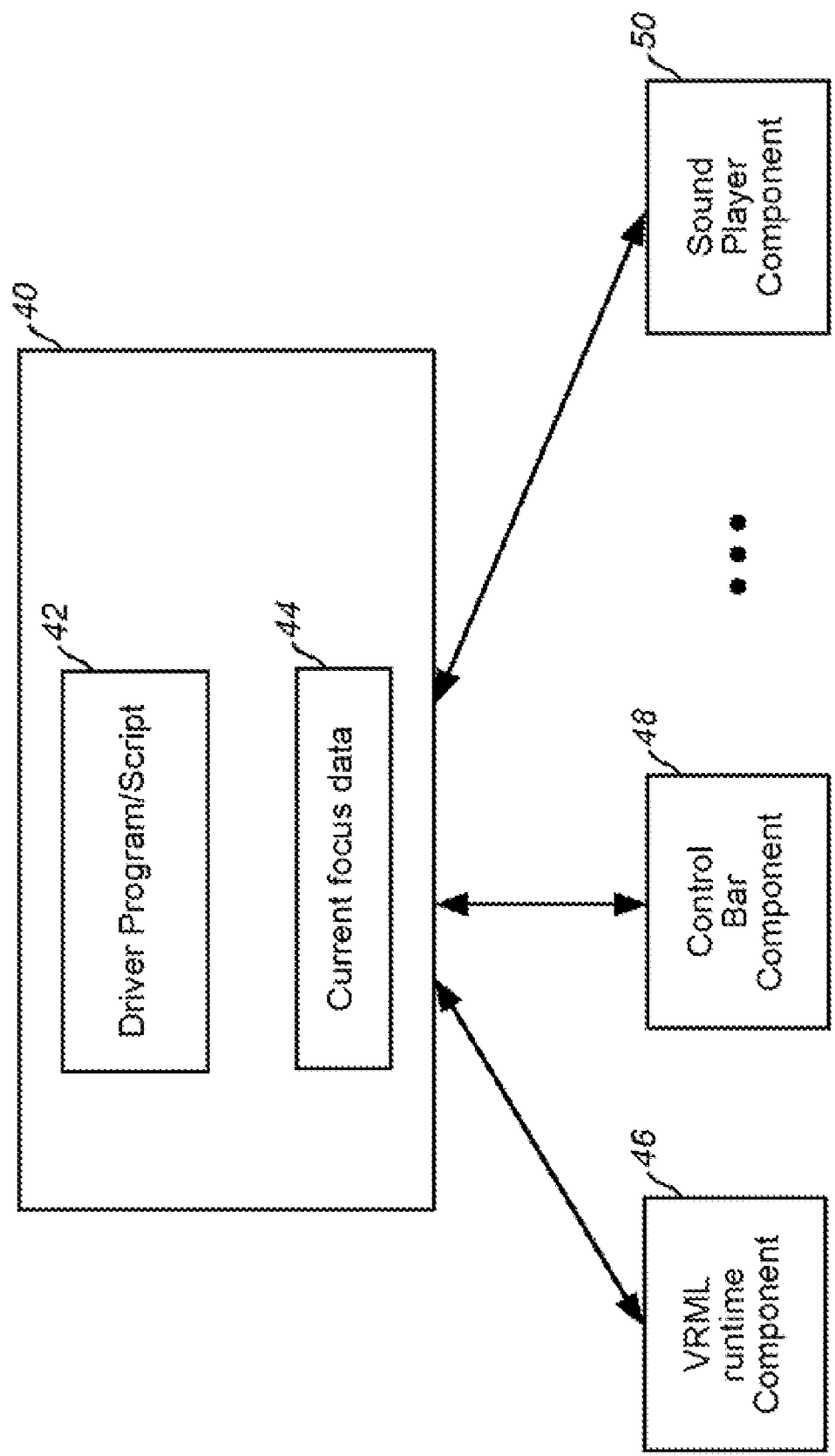
FIG. 5 is an example of an embodiment of the browsing software tool that may be included in the system of FIG. 1.

Referring now to FIG. 5, shown is a block diagram of one example of an embodiment of a software browsing tool. Generally, the software browsing tool of FIG. 5 includes driver commands and data 40 and various software components 46-50. The software components may vary with each particular embodiment of the software browsing tool and the functions provided, as well as the tools used to implement the software browsing tool. In this particular embodiment, the driver program and data 40 includes a driver program or script 42 and current focus data 44. Generally, the driver program or script 42 is a set of commands or statements which drive or control the software browsing tool. The current focus data 44 is generally a common shared data area describing the focus of the data presented to the user.

When the user is viewing data, the current focus of the data being presented may be changed as the user cycles through and views the various multimedia data items. As this happens, the focus changes as the user examines different images or other multimedia data. When there is a change in the focus, the focus data 44 is updated by a signaling handler as specified in the driver program or script 42. A mechanism exists in the driver program or script providing a control for updating the focus data 44 and additionally signaling all of the components as to the change in the current focus. The various components then update their local copy of the focus data and redisplay their various portions of the user interface. In this particular embodiment, for example, the driver/program script 42 is a JavaScript and the current focus data is represented as a JavaScript object. All of the URLs which are presented to the user representing multimedia data are represented as JavaScript objects with the grouping structure or hierarchy described in the hierarchical data file 20. The driver program or script 42 may be one of the JavaScript code and data components produced by the process of FIG. 3 by the translation tool 32. The VRML runtime component 46 may include VRML code 34 as produced by the translation tool 32 of FIG. 3.

It should be noted that other embodiments may implement the current focus data as other language entities or data objects in accordance with the implementation language chosen.

The various other components, such as the control bar component 48 and the sound player component 50, may be implemented using a variety of different coding languages. In one embodiment, Java code, as may be produced by the translation tool 32, may be the language of implementation for these components. In another embodiment, one or more of these components 48-50 may be implemented using JavaScript code and data with dynamic HTML. The precise control mechanism used by the driver program/script 42 may also vary with implementation and embodiment. In this particular embodiment, the Java scripting language provides a control mechanism by which the various components are updated when the user focus changes. It should be noted that each of the components 46-50 of FIG. 5 for the browsing software tool are generally independent, pluggable pieces that may be removed or added independent of the other components. Generally, as will be described in paragraphs that follow, each component maps to a particular component of the user interface displayed and is responsible, for example, for updating and performing other functions within that particular portion of the user interface.

It should also be noted that the hierarchical data file 30 of FIG. 3 may be produced manually or in an automated fashion, such as by a software tool that may be implemented using one of many different languages known to those skilled in the art. For example, various directory structures and subdirectories may be used to group files in accordance with the hierarchy description to be included in the hierarchical data file. A software program written in a commercially written programming language, for example, may use system functions to inquire as to the contents of the various directories and subdirectories and accordingly, produce a hierarchical data file in accordance with the directory and subdirectory structure. Other embodiments may include different ways of producing the hierarchical data file in an automated fashion in accordance with a particular system of FIG. 1.

It should also be noted that the various images or other multimedia data files which will be used in presenting information to the user by the software browsing tool of FIG. 5, may be loaded prior to runtime, such as by caching data in memory on the server or other node as part of a preprocessing step.

Figure 6:
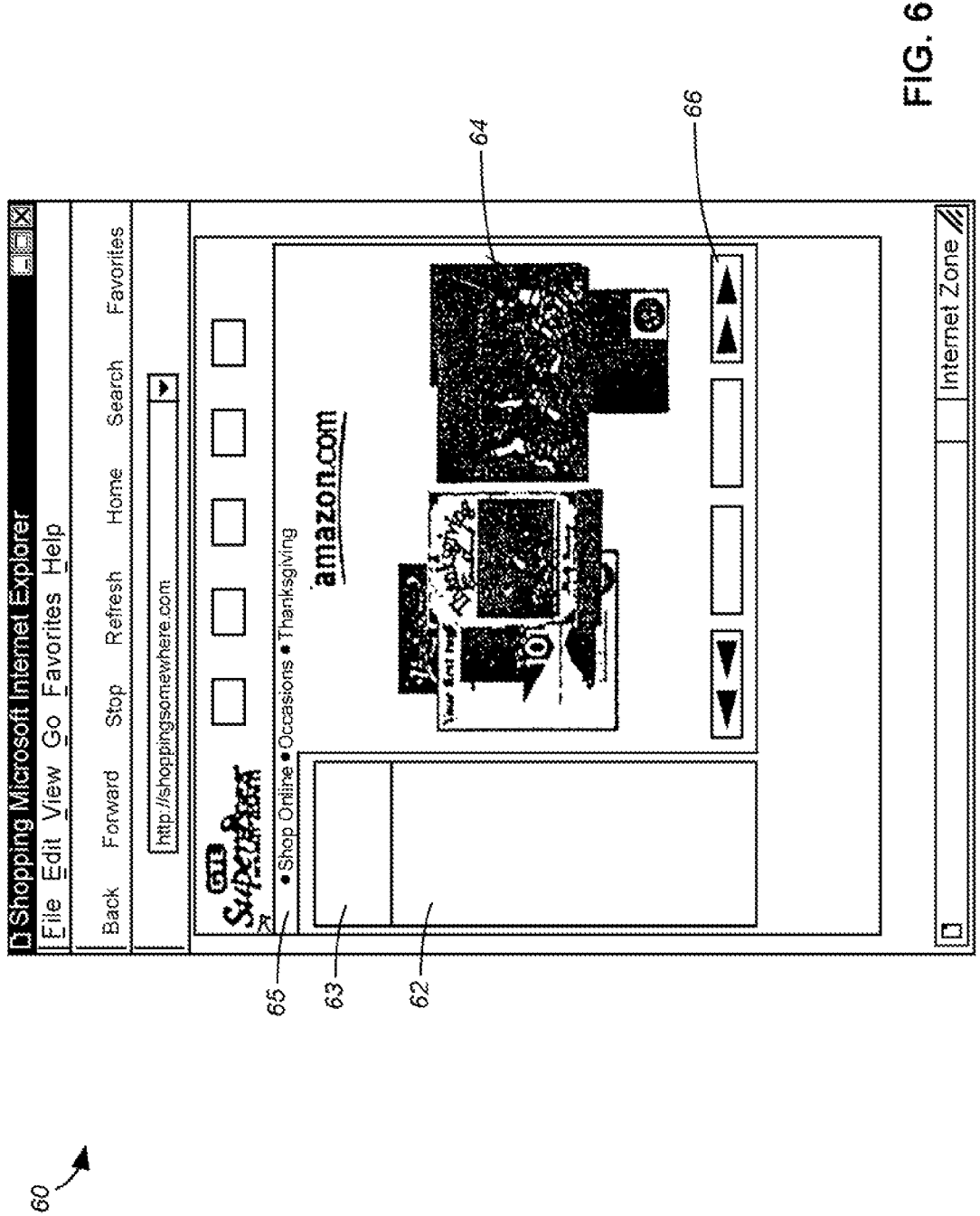
FIG. 6 is an example of a user interface display for a generated browser software tool.

Referring now to FIG. 6, shown in an example of an embodiment of a user interface as displayed by the software browsing tool. Generally, FIG. 6 shows an example of the browsing tool used in the application of the domain of Internet shopping. The user interface 60 includes a menu or outline portion 62, a presentation area 64, and user control buttons 66. Generally, the outline or menu portion 62 displays various topics or text descriptions which accompany the items, images, or other multimedia data being presented in the presentation area 64. The user may control the speed or direction in which the images or other multimedia data which correspond to various items listed in the menu area 62 are displayed to the user. For example, as will be described in paragraphs that follow, control display 66 includes buttons which provide for backward and forward review of the multimedia data presented in the presentation area 64. Accordingly, the active or highlighted portion, for example, of the outline or menu area 62 is synchronized with the presentation in accordance with the user positioning of the controls. If the user, for example, wants to preview multimedia data items that were already presented, the rewind button from the user control area 66 would be used also causing the menu portion 62 to have its active item updated in accordance with the multimedia data items presented in the presentation area 64.

In the menu or outline area 62, the active or current focus is denoted by highlighting, for example, a particular item in the menu portion 62. In one embodiment, as shown in FIG. 6, the current outline or menu item has an arrow 63 next to it in the upper left hand corner. As the user is presented with multimedia data in different areas in accordance with different portions of the outline, the arrow in the left hand corner advances accordingly in the menu portion 62. Other techniques may be used to indicate an active or current focus on the outline area 62. Other ways of indicating an active or current menu item in the area 62 include highlighting a particular area on the menu, or showing a color contrast from the rest of the menu items.

With regard to the user interface displayed in FIG. 6, the content of the multimedia data presented has to do with promotional advertisements generally associated with online or virtual storage such as those available through the Internet that had been categorized by product type as well as occasion. For example, suppose the user has selected the category "Thanksgiving" through the button bar area 65. In this particular embodiment, the system generates the browser tool for the set of stores that have a promotional offering in the category selected by the option 65. As the user places the cursor over the arrow controls at the bottom of the main presentation area 66, images and/or other multimedia data representing the promotional content are presented one after the other in a semi-random spatial layout in the presentation area 64. Transitions between stores clear the presentation area. Additionally, the store whose promotional items are currently being presented in the presentation area 64 are indicated in the listing at the left by the appearance of a red arrow, as indicated in the outline or menu portion 62.

The user may control the speed of the presentation of the images and other multimedia data by choosing among the arrow controls 66. In this particular embodiment, the greater distance the cursor is placed from the center of the control area, the greater the speed in a particular direction. For example, two sets of arrows in the control area 66 go to the right indicating forwarding of the multimedia data presentation, and two sets of display arrows go to the left indicating reversing the multimedia data presentation. The farther to the left the cursor is placed over the arrows, the faster in reverse the multimedia data in the presentation area is displayed. This also parallels the fast forwarding controls as indicated by the arrows to the right in the control area 66.

It should generally be noted that the multimedia data presented in the presentation area 64 of FIG. 6 and in other user interfaces which will be described in paragraphs that follow may be presented in a variety of different presentation arrangements. In this particular embodiment, the multimedia data is presented in a stacking arrangement, as will be described in more detail below.

Figure 7:
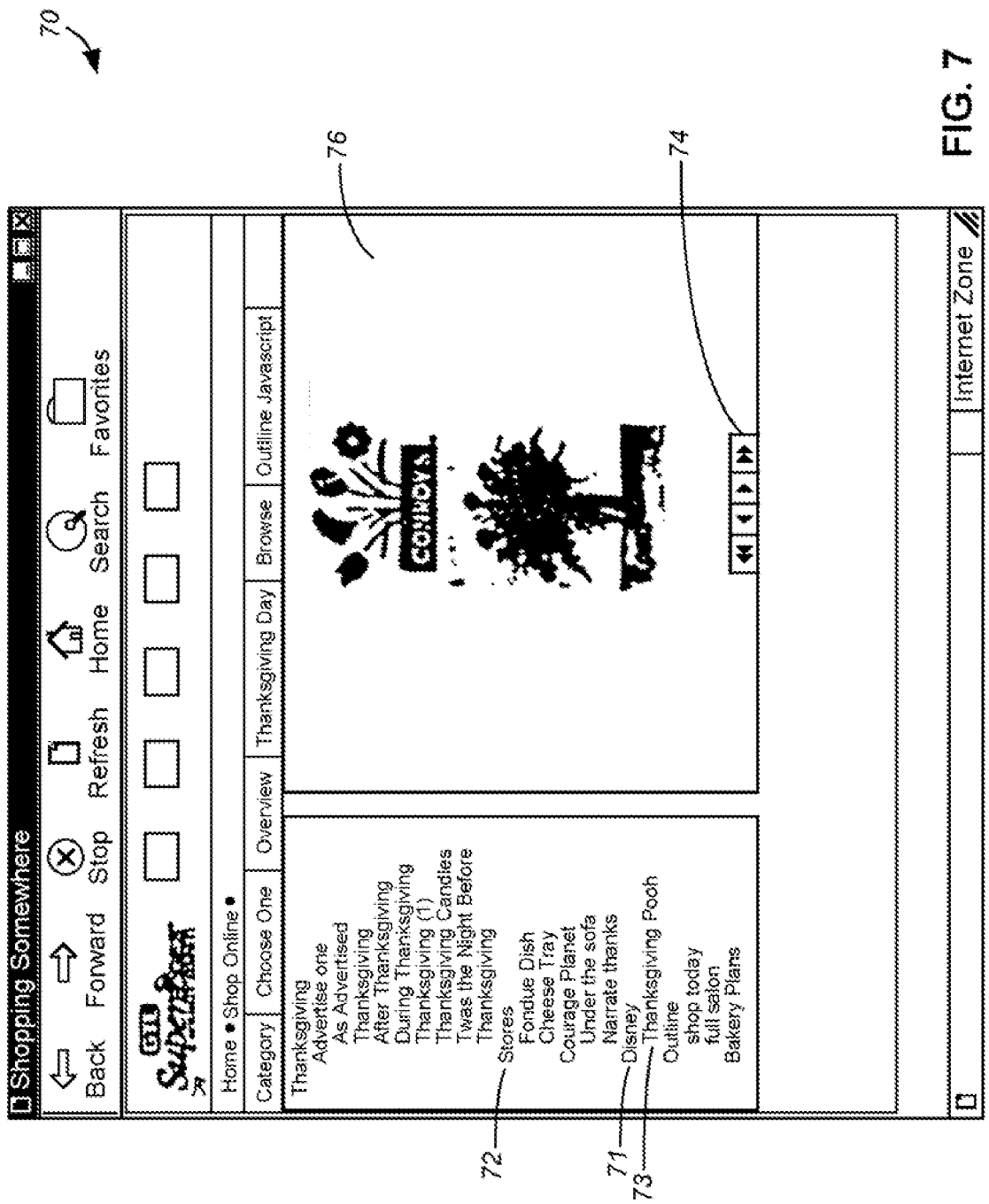
FIG. 7 is an example of an embodiment of a user interface displayed with a detailed outline.

Referring now to FIG. 7, shown is a user interface of the browser software tool with a variant including more detail in the text outline portion 72. FIG. 7 includes a presentation area 76, user control 74, and an outline or menu portion 72. These areas are similar to those as previously described in conjunction with FIG. 6 user interface 60. This variant of the browser is also for the shopping domain in which the listing of the stores in the left hand portion includes store titles as well as the names of the products being promoted. In FIG. 6, the user interface 60 included only stores in the outline or menu area. In this embodiment of the user interface of FIG. 7, the outline or menu area 72 includes a store name, such as Disney™ 71, as well as the product being promoted such as Thanksgiving Pooh™ 73. In this variant, products are shown one at a time in order to make synchronization with the presentation area 76 and the menu item 72 straight forward with the detailed hierarchical text outline listing. Thus, at execution time, the browser variant 70 of FIG. 7 may present one image or other multimedia data element at a time. This is in contrast to the user interface 60 of FIG. 6, in which multiple multimedia data objects or elements are presented which may overlap or be superimposed upon one another.

It should generally be noted that the multimedia data presented in the presentation areas 76, 64, and other user interfaces which will be described in paragraphs that follow, may be "dragged and dropped" for performing other user functions. For example, the user may drag and drop an item from the presentation area to place in a virtual shopping basket for items which the user may wish to purchase at the end of their viewing or browsing session. Additionally, by selecting one of the items in the presentation area, such as by a double click with the left hand mouse button, a user may be connected, as by a hyper link, to a different Internet website. Selection may also have other meanings depending on the application of the viewing or browsing session. For example, if the user is selecting or viewing movies or TV channels, selecting a particular item in the presentation area may mean to select a movie and view a portion of a movie trailer, for example. If it were a TV channel selection, an image selection from the television show on each particular channel may be presented in the presentation area 76. The user may select a TV channel and the particular TV program for current viewing.

Additionally, when multimedia data is presented to a user, various multimedia files may also be executed, for example, while an image is being viewed. For example, a sound file in addition to an image file may be played to a user when viewing images, for example, of a particular movie.

It should also be noted that in the menu areas 72 and 62 a user may jump to a particular section in the sequence by selecting an item from the menu. For example, if the user's focus or current point is at the top item as in FIG. 6, a user may advance to the end of the menu item and accordingly cause presentation of the multimedia data associated with that item by selecting the last item from the menu area. This is a shortcut method by which a user may quickly advance to a particular area in the menu to look at and view the images and other multimedia data associated with that particular item in the menu selection.

The user interface of FIG. 6 may generally be described as a slide show presentation by which the user may begin a multimedia presentation associated with the first item in the menu area 62. An embodiment of this may automatically advance at a set speed from the beginning to the end of the menu and accordingly present multimedia data in the presentation area 64 at a given pace. The user may control the presentation of the multimedia data by using the control area 66. This is similar to the way in which a movie, for example, may be viewed in which the play button causes the images of the movie to be presented at a particular speed. However, a user may rewind or fast forward to a particular section using the controls. This is a method of auto-scrolling through multimedia data associated with the menu selection area 62.

The multimedia presentation of FIG. 7 generally includes a hierarchical level of menus displayed in the area 72. In this particular embodiment, there is a nesting of several levels of menu items. Generally, the outermost level menu is denoted as level 1 and the level numbers increase sequentially to 3 and the like as the nesting gets deeper. In this particular display 72, while an innermost level is displayed, the outermost levels also stay constant on the menu. For example, if the nesting level was level 3, and the menu items spanned more than one screenful, while the additional items from the level 3 menu were displayed, the level 1 and level 2 items would appear constant on the screen for the user so that the user is provided with information indicating where the current focus is for the menu items being displayed. In other words, the user is provided with context feedback information describing where at any particular time multimedia data in the presentation area is located relative to the menu items 72. The presentation area 76 of FIG. 7 may present images and other multimedia data using a variety of techniques. Multimedia data may be presented in a temporal fashion, one multimedia data item at a time with subsequent data items replacing or overlaying previous multimedia data items, in synchronization with a sound file and the more detailed menu 72, for example. Multimedia data may also be presented in a rolling or scrolling fashion in an upward or downward direction. This technique is further described below.

Figure 8:
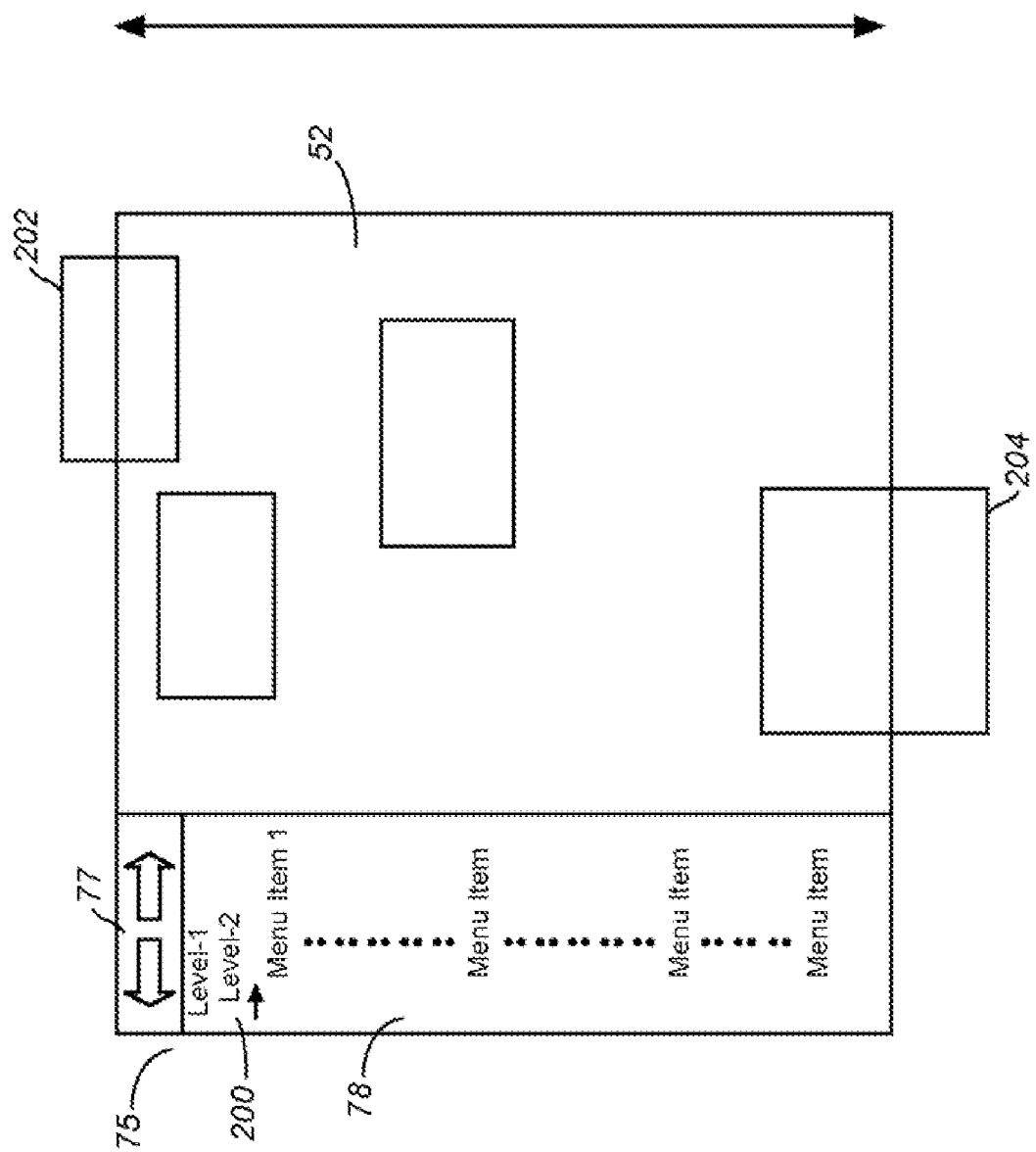
FIG. 8 is an example of an embodiment of a user interface of the software browsing tool using an auto-scrolling method for presenting multimedia data.

Referring now to FIG. 8, shown is an example of a user interface of the software browsing tool which presents the auto-scrolling method for presenting multimedia data. The user interface 75 includes user control 77, a presentation area 75, with multimedia data presented, such as multimedia data items 202 and 204, and a menu or outline area 78. In this variant of the user interface of the browsing tool, the user scrolls through a series of multimedia data items which are predetermined in a format layout out such as in a top to bottom fashion. The motion of controlling or scrolling through the multimedia data using control 77 scrolls along in the x-y plane as indicated by the arrow on the right hand side for forward and reverse direction of presenting the multimedia data items. A portion of multimedia data items 202 and 204 are shown as extending beyond the user interface screen 75 for the purposes of demonstration only. Generally, if the user were to, for example, rewind or reverse through the user controls 77, a portion of the multimedia data 202 would be presented which is off the screen for the current point of view. Similarly, if the user were to slightly fast forward using the control 77, a portion of the multimedia data 204 which is shown as off the screen currently would be included on the presentation area 52 displacing a portion of the other multimedia data items, such as 202. Thus, the user has a point of view or focus which is the size of the presentation area 52 which scrolls downward through a prearranged presentation of multimedia data in a layout fashion. By using the user controls 77, a user may view portions of the multimedia data in the presentation area 52. As described before in conjunction with other figures, the user may advance to a different position on the scroll by selecting a particular menu item. This is in addition to using the user control 77 to rewind and fast forward to the multimedia data contained in the scroll.

It should be noted that "Level-1" and "Level-2" of menu area 78 may be "active" in that they may be selected and used to modify the current focus or point of view of the user with regard to the data presented in the presentation area 52.

Figure 9:
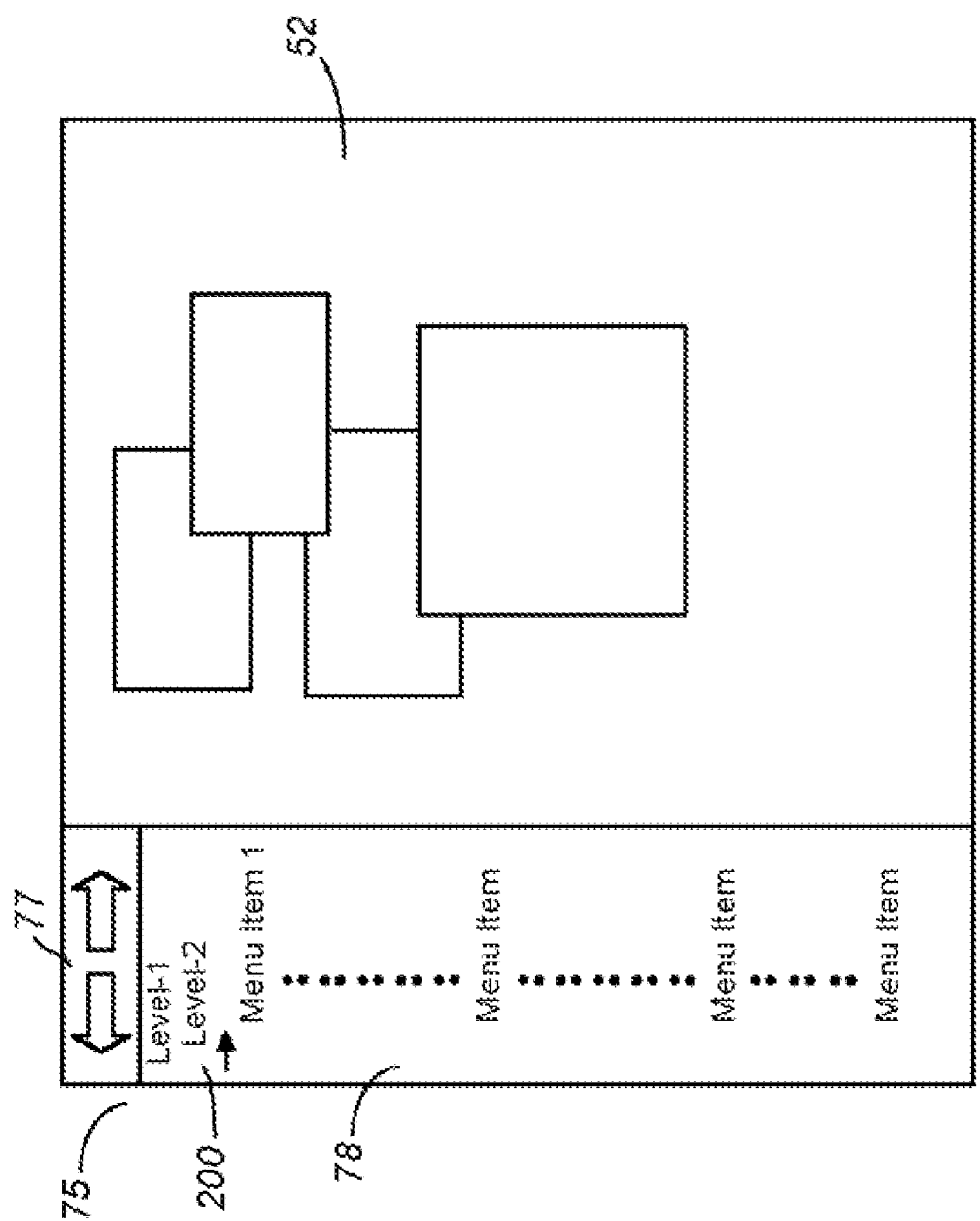
FIG. 9 is an example of an embodiment of a user interface of a software browsing tool that presents multimedia data as a stacked slide show.

Referring now to FIG. 9, shown is an example of an embodiment of the user interface for the browser tool which presents multimedia data in the presentation area 52 in a stacked slide show fashion. Generally, note that multimedia data items which may be presented in the presentation area 52 are slightly stacked upon one another for viewing at a predetermined time interval. The user may control with the user controls 77 how fast or slow the multimedia data items are stacked upon one another in the presentation area 52. It should generally be noted that the multimedia data may also appear in an unstacked fashion in the presentation area 52 such that the multimedia data items do not overlap each other. This is yet another variant of the browser presentation area for presenting multimedia data in accordance with a menu item 78 with user control over the presentation of the multimedia data 77.

Recall that the scrolling effect had the images and/or other multimedia data presented in a predetermined top to bottom fashion with the user interface presentation area acting as a window clipping or viewing a portion of this predetermined area. The stacked slide show is similar to the appearance of having a deck of cards where each multimedia data item corresponds to a card in the deck in which the cards are placed one on top of each other in the presentation area. Fast forwarding or rewinding through a stack slide show of multimedia data results in cards being removed or placed on top of the deck. Similarly, it would result in multimedia data items being stacked or layed on top of one another or removed from the stack.

Figure 10:
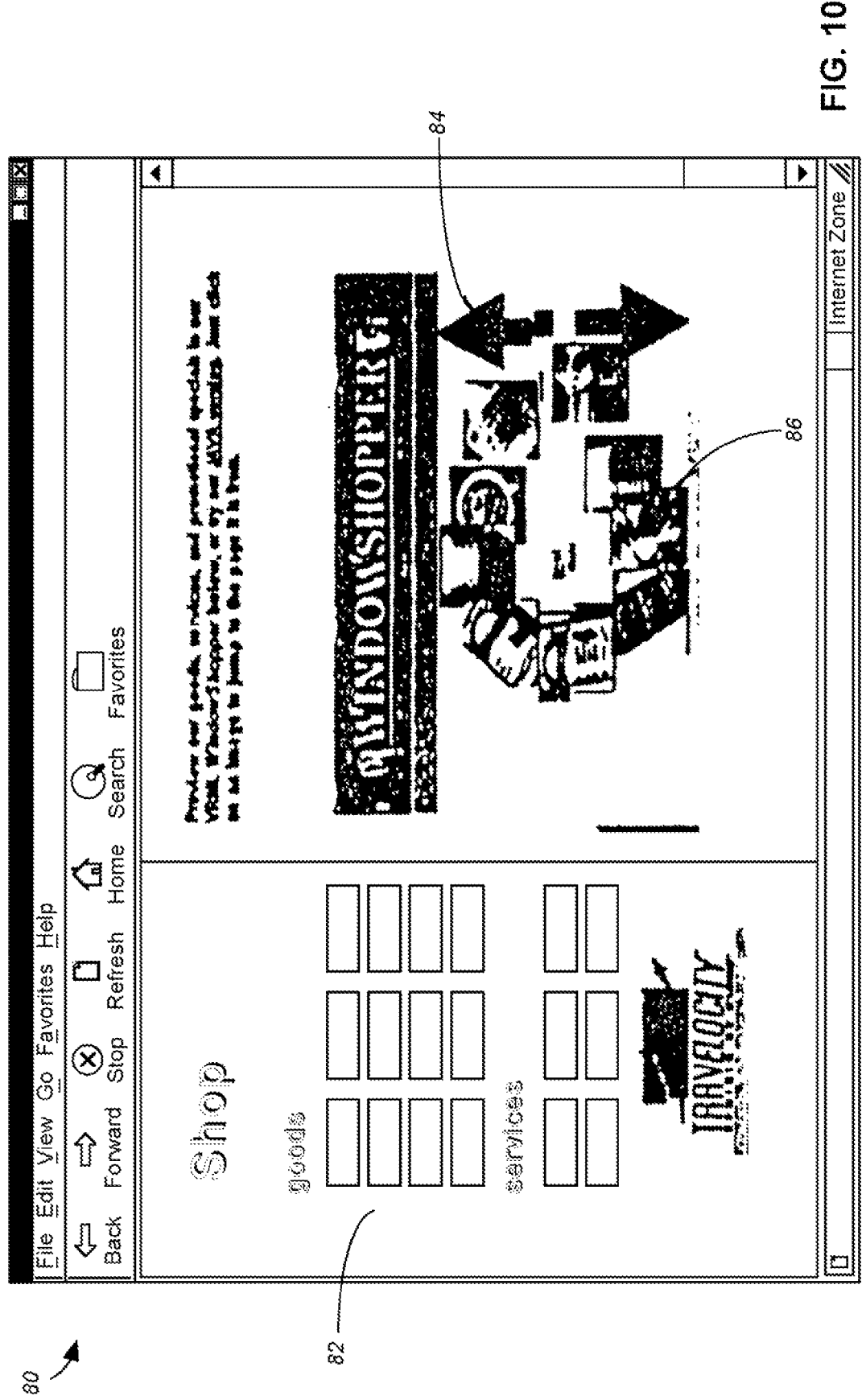
FIG. 10 is an example of an embodiment of a user interface displayed with the browser tool using the flyby effect.

Referring now to FIG. 10, shown is an example of a user interface of the browser variant in which the presentation area or the display area incorporates a three-dimensional fly through or flyby effect as opposed to the previously described scrolling effect in various slide show effects. The user may control the presentation in the presentation area 86 using the control arrows 84. The user may select various categories of multimedia data items to be presented using the buttons indicated in the selection area 82 of the user interface display 80. Additionally, as previously described in conjunction with other presentation areas, a user may select a particular multimedia data item from the presentation area 86 which causes the user to jump to the page where the multimedia data item is from. In other words, selecting an item from the presentation area such as with the mouse, a user may use the hyperlink Internet connection by which they are connected to the page on the Internet upon which an image or other multimedia data item may be located. Generally, the position of the user's mouse cursor, for example on the arrow 84, determines the speed of the presentation which essentially has an infinite range from 0 to the maximum that the display device is capable of achieving. Audio feedback of the current speed may also be included. Generally, the three dimensional flyby effect, which will be described in more detail in paragraphs that follow, involve the user being presented with images or other multimedia data as if they are flying by the user. Generally, multimedia data may include movie or video clips, sound files, or 3-D models, and the like. Each of the multimedia data presented is subject to a 3-D flyby effect with regard to the type of multimedia data. For example, if a multimedia data file presented is a sound file subject to the 3-D flyby effect, the intensity of the sound is varied in accordance with proximity to the user.

Figure 11:
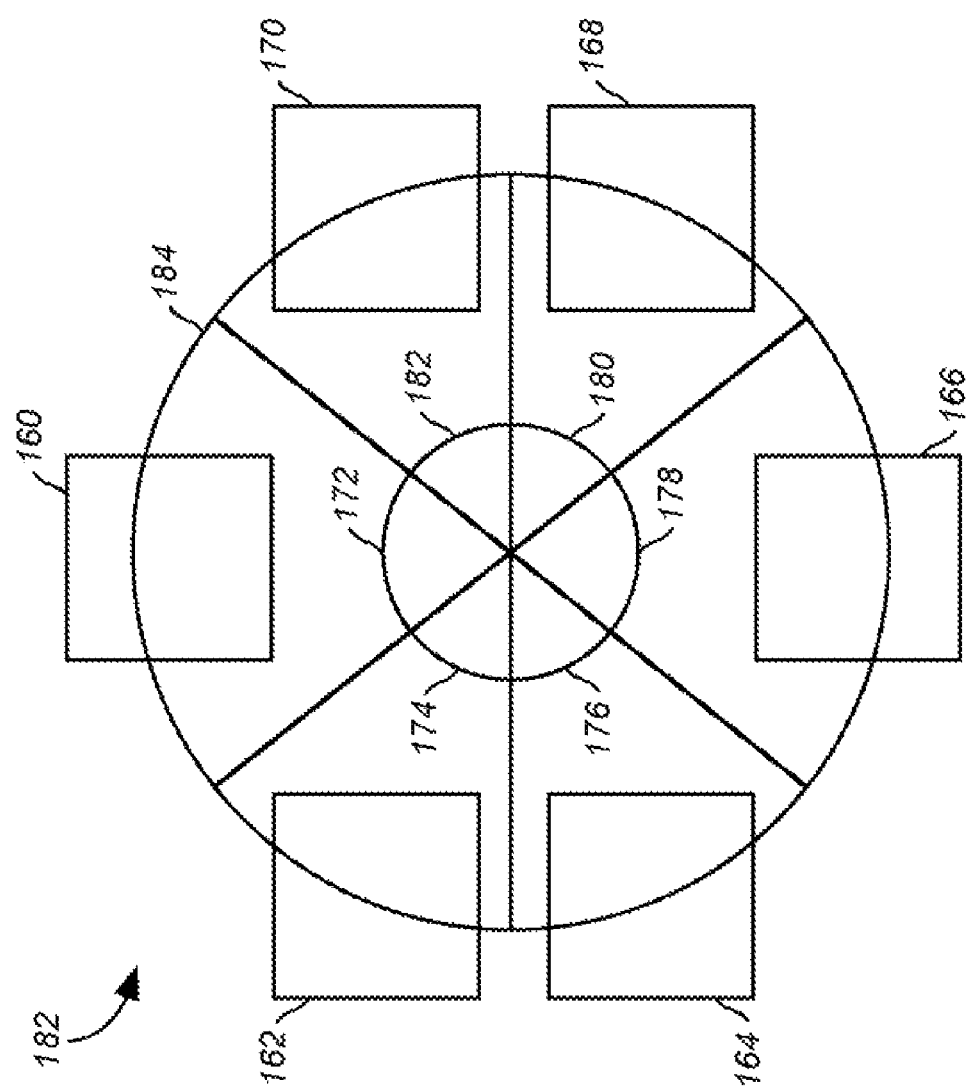
FIG. 11 is an example of an embodiment of a layout technique that may be used with the flyby effect in presenting a group of multimedia data.

Referring now to FIG. 11, shown is an example of an embodiment of a frontal point of view of multimedia data presented using the flyby effect of FIG. 10. The presentation arrangement 182 is one technique that may be used to present images in the presentation area 86 of FIG. 10. Data items 160-170 are presented in as a group of data. Data items are presented one at a time in a counter-clockwise direction in a circular arrangement. The center of each data item 160-170 is placed on the circumference of the circle 184 as it appears in the presentation area 86. It should be noted that circle 184 does not actually appear in the presentation area but is displayed in FIG. 11 to indicate placement of the data items 160-170. Each of the data items 160-170 are placed equidistant apart such that each of the angles 172-182 are the same. This technique may be generalized for any number of data items such that they are placed equidistant apart in a circular arrangement in a counter-clockwise order.

Subsequent groups of data items are presented in an arrangement with a random angular shift in the counterclockwise direction. In other words, in subsequent data item groups presented, the position of the first data item 160 is shifted by a random amount in the counterclockwise direction. Similarly, the placement of subsequently presented data items in the same group are positioned with the same angular shift.

Referring now to FIG. 12A, shown is a view of the multimedia data of FIG. 11 looking down with the 3D flyby effect being used to present the multimedia data to the user. Each of the data item groups 122-128 represents a group of data items presented similar to those in the group 182 of FIG. 11. In other words, each of the groups 122-128 is a "slice" or page of data items presented using the circular layout technique described in conjunction with FIG. 11.

Generally, the procedure for laying out multimedia data in a 3D flyby effect includes defining a certain area and placing the multimedia data for presentation within that defined area. A user's view or perspective at a particular point in time, such as a snapshot of the multimedia data in FIG. 11 is depicted as having the user move along the arrow indicated in the left-hand side of FIG. 12A on the x-y axis 69. Thus, at any particular point in time, a user's point of view or snapshot of the multimedia data, such as those presented in FIG. 10 in the presentation area 86 represent a viewpoint of the multimedia taken from user perspective. For example, as the user fast forwards or proceeds through the presenting of the multimedia data items moving towards the screen or towards the data item 122, the data items 124, 126, and 128 will appear to fly past the user and the data item 122 will appear to come closer to the user. Similarly, when rewinding or moving out from the direction from data item 122 towards 128, the data items will appear to fly by the user in reverse order with a perspective or focal point into the screen.

Generally, the data items presented have a perspective such that the farther the multimedia data items are in the fast forward direction, the farther away they appear in the presentation to the user and appear to go to a focal point into the screen. Similarly, as multimedia data items are viewed, they pass by the user on the presentation area 67 giving the user the impression that the multimedia data items are moving past where the user is out of the visual path. Thus, when a user rewinds the multimedia data items in the presentation area, the multimedia data items are presented or refreshed in reverse order. This gives the appearance as if the data items are coming from behind the user to the current focus on the screen and, as the rewinding continues, the multimedia data items move into the screen such as at a distant point.

The top or downward view of the user perspective in FIG. 12A generally includes a defined area 67 where groups of multimedia data items 122-128 may be positioned. The user's perspective or focus moves along the x-y axis, as indicated by the arrow 69. At any point in time, the user's view point may be associated with a point along the x-y axis 69. The multimedia data items are presented to the user from the user's perspective at a particular point along the x-y axis denoted by the arrow 69 as if the user were sitting in front of the defined area 67 with all of the multimedia data items coming towards the user or away from the user, as controlled by the control area 66 of FIG. 6. For example, if the user were sitting in front of the screen and the controls indicated the position with regard to the user's perspective with a focus at 208, the multimedia data item associated with 128 appears closest to the user with groups of multimedia data items 122-126 giving the perspective of being farther away. In contrast, if the controls indicate that the user perspective is at position 206, no multimedia data items are presented on the screen and this may give the user the perspective that all of the multimedia data items have already been viewed.

Figure 12B:
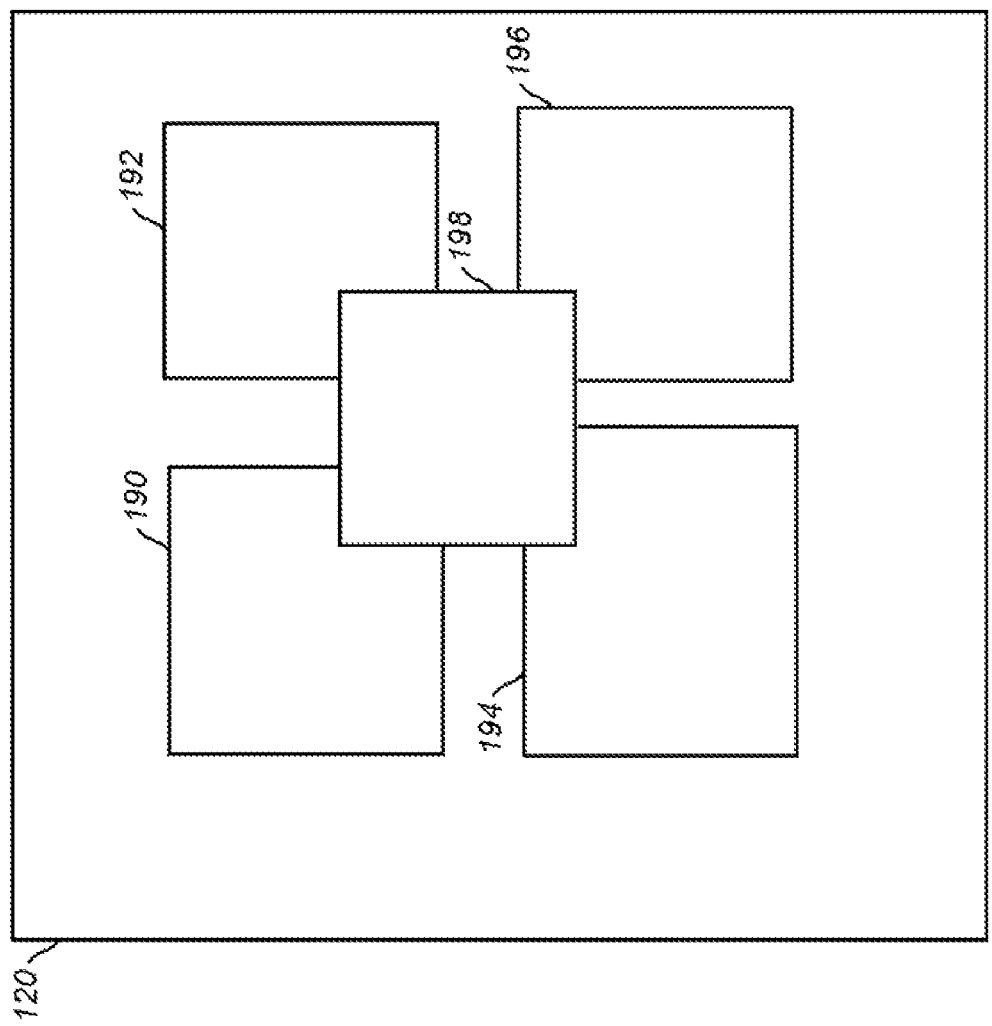
FIG. 12B is an example of an embodiment of a layout technique that may be used in a multimedia data presentation.

Referring now to FIG. 12B, shown is an example of an embodiment of another technique for presenting data in a presentation area 120. Generally, the presentation area 120 may be included in one of the user interface displays such as 80. What will be described in conjunction with the next two figure is a technique for presenting multimedia data in a group layout in which there is a parent and child relationship between various multimedia data items to be presented on the presentation area 120.

In this particular embodiment, there is a group of data items 190-198, with the parent 198 being located in the center of the presentation area and the children 190-196 being located surrounding the parent. In this particular embodiment of a group, the parent is presented in the center of the group with children being placed in four quadrants beginning with the upper left relative to the center of the group which includes the parent node. It should generally be noted that if there were only three children for a particular group, the children would be placed in order beginning with the upper left quadrant proceeding in a clockwise fashion until all the child data items have been presented. Similarly, it should be noted that if there are more than four data items, the fifth succeeding data item would overlap the first data item in the upper left quadrant and accordingly be placed in that quadrant with succeeding data items numbered 6, 7, 8, and so on overlapping successive quadrants. Using a slight variant of this technique, rather than successively present multimedia data in each of the four quadrants, one may view the upper left quadrant as a starting point and an end point and present multimedia data items in a clockwise circular fashion one on top of another in a slightly stacked fashion beginning and ending with the upper left quadrant and accordingly space the multimedia data in accordance with the number to be presented in a particular group.

The snapshot of multimedia data items presented in FIG. 12B represents the multimedia data items which may appear to a user, for example, at a particular point in time.

Figure 13:
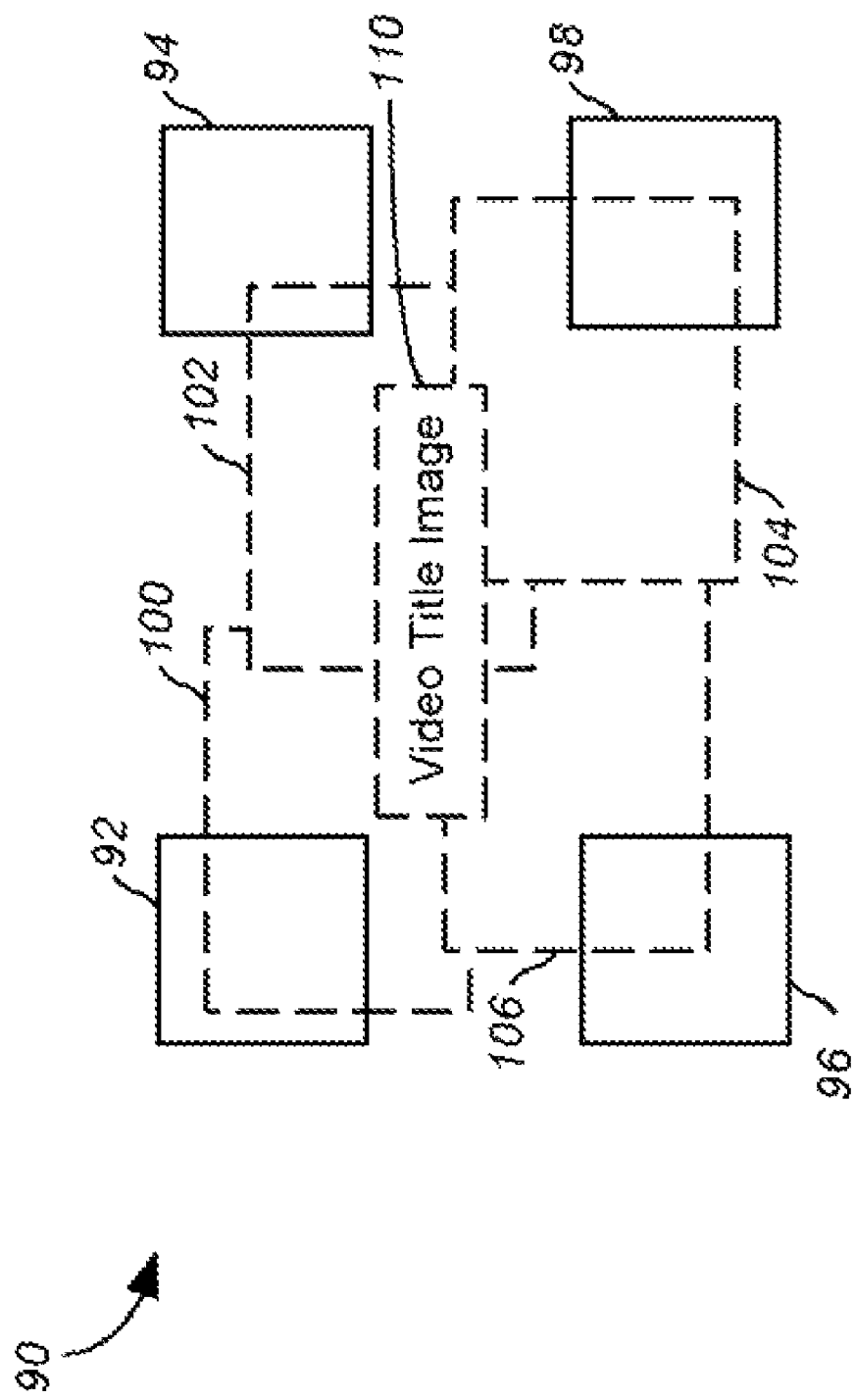
FIG. 13 is an example of an embodiment of a schematic for a technique for presenting multimedia data as in FIG. 12B.

Referring now to FIG. 13, shown is an example of an embodiment of a layout technique for presenting the data items of FIG. 12B. As previously described, the technique with regard to presenting a particular group of multimedia data items is a layout between a parent data item and its immediate children. For example, in presenting a video and various snapshots from that video in the presentation area 90, the video title may appear in the center 110 as the parent node.

The children may be the still images or snapshots of various pictures from the movie appearing as still images 100, 102, 104, and 106 in FIG. 13. The title of the group is placed in the center of the canvas or presentation area. The technique then rotates placement of succeeding images such as 100, 102, 104, and 106, in a clockwise fashion around four quadrants 92, 94, 96, and 98 beginning with the upper left quadrant 92. The title multimedia data or parent 110 always remains on top of the still images and/or other multimedia data or children while succeeding multimedia data items may overlap each other. Each of the quadrants itself is divided further into quadrants, and a corner of each multimedia data item is randomly placed within the outermost quadrant. That is, each of the multimedia data items shown in FIG. 13 has a corner placed somewhere in one of the rectangles 92, 94, 96 or 98. Such a technique for presenting multimedia data items provides a predictable temporal sequence by providing a regular rotation that is further reinforced through a layering effect in that more recent data items are always in a layer above the less recent ones. Also included is a fading effect through control such that only the most recent data item is fully opaque with others successively less so. The randomness and the overlapping allows the use of images and other multimedia data items of various sizes and aspect ratios. Referring back to FIG. 11, the technique described in conjunction with FIG. 13 is applied to the multimedia data items produced and presented in the presentation area 120. In effect, the multimedia data items presented in FIG. 11 are those at different points and times for different groups as they fly by the user.

The examples just described present user interfaces with images and/or other multimedia data items that particularly fall into two general domains which are Internet shopping, and video selection or program guides. However, the techniques and the user interfaces are widely applicable to any variety of data being presented associated with any particular domain or application in which the content may be structured hierarchically. Individual objects or multimedia data in the content may be rendered in a form of image based summary information. The techniques described are capable of using a number of different spatial layout techniques and transitions for rendering individual multimedia data items to be presented in a particular presentation area.

In addition to the actual presentation of the multimedia data items to the user in one of a variety of forms and techniques in the presentation area, the actual user controls as included in the control areas of the previously described user interfaces are also important.

One advantage of the foregoing technique is that each of the multimedia data items may be presented for a longer time period than using the prior art slide show technique improving recall and depth of processing of a particular set of objects when presented to a user. In other words, the combined temporal and spatial presentation of the foregoing technique provides coherence in associating content from the same grouping of objects with each other.

Figure 14:
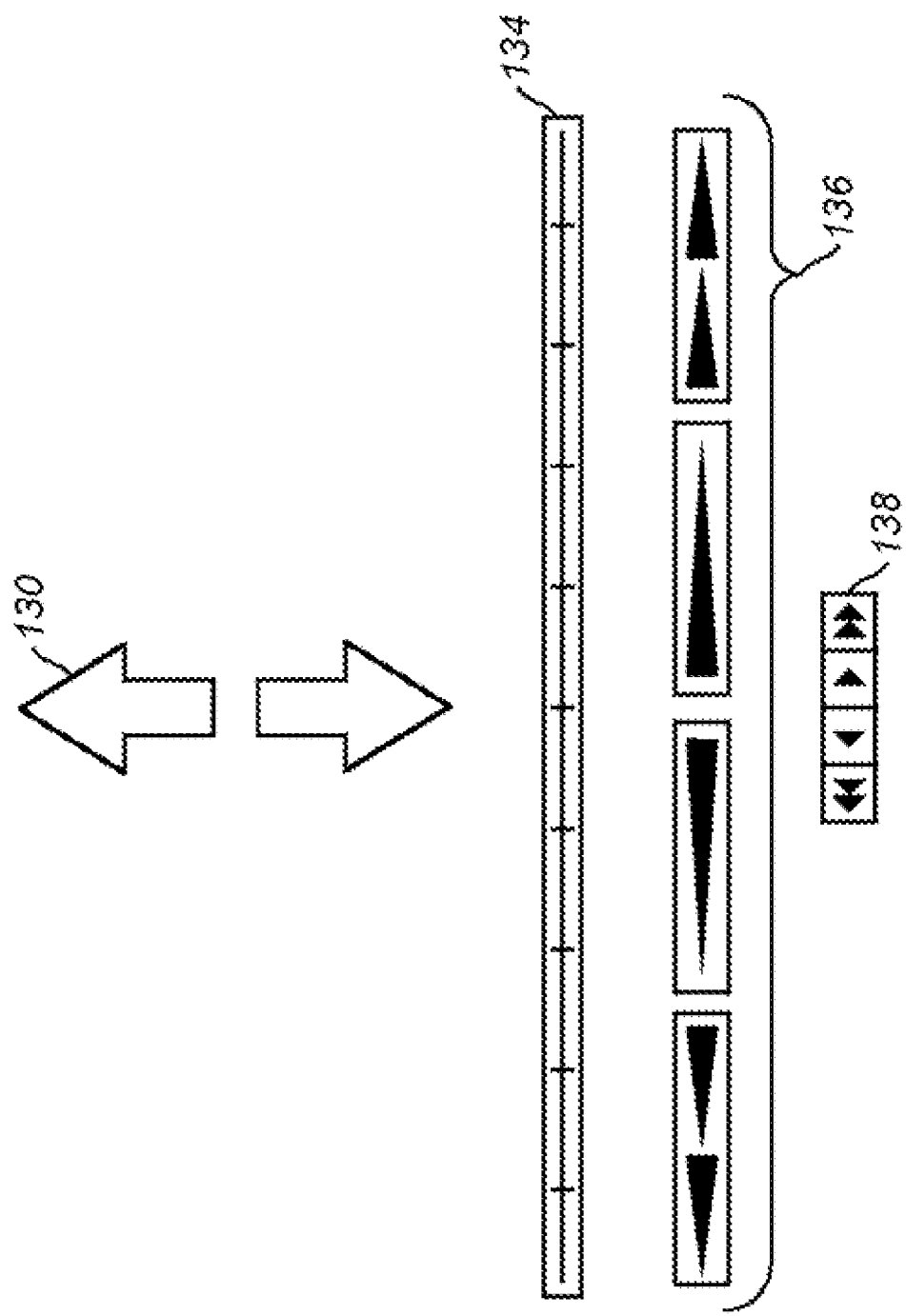
FIG. 14 is an example of an embodiment of user controls as included in various user interfaces for the browsing tool.

Referring now to FIG. 14, shown is an example of a variety of user controls as included in the previously described user interfaces. The controls allow the user to make adjustments to the speed as well as the direction of the temporal presentation. The user controls 130 may be used to control both direction and speed in which the position of the mouse cursor, for example, within the arrow is an indicator of the speed. As the mouse arrow approaches the arrow tip, the speed increases up to the maximum that the display device may support. Visual feedback is indicated to the user by the level of color saturation within the arrow. In other words, the faster the images/ and or other multimedia data items are presented, the closer to the arrow tip the mouse cursor is, and the darker or deeper the color of the display arrow. Additionally, instant on/off is achieved when the mouse is over the user control 130 or on the user control 130. In other words, the user does not need to select by depressing or clicking the mouse button in order to turn on or change the speed, or its direction. Simply by placing the mouse cursor over a particular portion of the arrow causes the speed to be altered or the direction to be changed. Cursor off of the arrow causes the speed to return to the predetermined rate, or stopping the presentation. Elements 136 and 138 are variants of the controls of the arrow depicted in 130. The slidebar 134 may be used also to slide to various points within the presentation of the multimedia data items in a continuous sequence. It should be noted that the function provided by the slidebar 134 is similar to the menu selection location as provided, for example, by the menu presented in the menu area 72 of FIG. 7.

Other embodiments of element 136 may have any number of additional arrow icon blocks in the forward and reverse direction offering a finer granularity of control. For example, the arrangement in 136 has one block of arrows for the forward and reverse direction. Another embodiment may include two or more blocks of arrows for each of the forward and reverse directions.

Generally, the different varieties of control buttons displayed as included in FIG. 14 include a feature such that the speed and direction may be controlled by instant on/off with a mouse cursor, for example, entering or leaving a display icon corresponding to the user control area. The user controls determine the speed and direction of a presentation in which the movement of the mouse cursor, for example, over a spatial area of the screen starts the presentation of a sequence of multimedia data items. Movement within a spatial area corresponding to the directional arrow determines the speed of the presentation. Subsequently, movement away from the spatial area corresponding to the user control arrow stops the presentation. Generally, the mouse over the arrow button area serves as a trigger for starting a temporal sequence and the mouse leaving this predetermined area causes the presentation of the multimedia data items to cease. This is in direct contrast to prior designs which require mouse clicks, for example, indicating users selection to start and stop display. With a rapid display of objects or images in the presentation area, users invariably may pass their intended stop location prior to physically depressing and selecting via the mouse control.

In the previously described user interfaces and browsing tool, the use of two or more synchronized displays provides a traversal in browsing of multimedia data items in a hierarchical structure. The presentation of the multimedia data items is generally controlled temporally with forward and backward and faster and slower controls for the purpose of content selection or assessment. The multimedia-based content of the individual items in this sequence may be rendered in a designated spatial container. Generally, multimedia data items are presented in a synchronized fashion with two or more components of the user interface, such as the menu selection or outline and the presentation area upon which multimedia data items are presented. This provides a technique for viewing or selecting a set of information object out of some larger collection. One technique was presented for grouping objects with various structure relations, such as the parent/child relation and the 3D flyby presentation.

The foregoing techniques are flexible in that they may be applied to a variety of domains of multimedia data and applications. Using combinations of the controls and the selection techniques, images and other multimedia data items may be presented for efficient selection based on content.

The foregoing techniques may be used in applications for browsing and selecting from multimedia data. One such system that includes the foregoing browsing techniques will now be described.

Content selection may be performed in connection with multimedia data from a variety of applications such as those using the Internet. The foregoing browsing techniques may be used in indexing into multimedia data using spatial and temporal aspects. In particular, what will be described is a synchronized spatial-temporal technique for browsing images for the assessment of content. Image-oriented data associated with interactive multimedia titles, for example, may be used to browse and index into different varieties of multimedia data associated with the titles. Due to the temporal nature of some forms of multimedia data, such as those involving audio and/or video data, it may be difficult to "drill down" or narrow a search to a subset of large volumes of data. The foregoing browsing techniques may be employed in a system that provides assistance in browsing and selecting from a subset of multimedia data.

Figure 15:
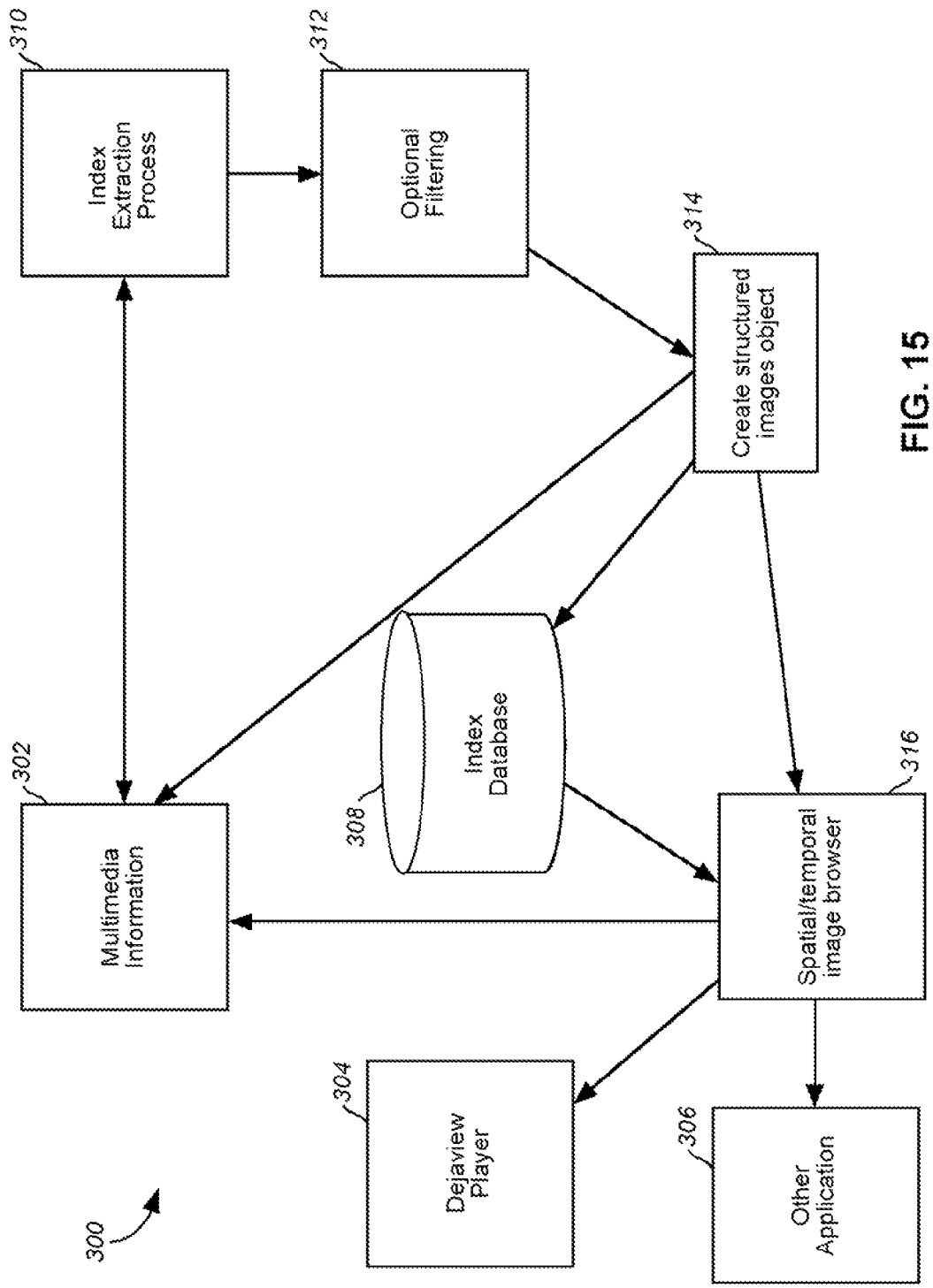
FIG. 15 is an example of an embodiment of data flow in a system for creating and using indices for multimedia data in conjunction with the browsing tool.

Referring to FIG. 15, shown is an example of the embodiment of data flow in a system for creating and using indices for multimedia information in connection with a browsing tool. The system 300 includes multimedia information 302 for which indices are created by an index extraction process 310 with an optional filtering process 312. Database records corresponding to, and representing, the multimedia indices are created 314 and stored in the index database 308. The browsing tool 316 uses information regarding the indices, as read from the index database 308, to allow the user to browse various multimedia indices. Using this browsing tool 316, a user selects a particular index and control is transferred to an application, such as 304 or 306, for presenting the corresponding multimedia information 302.

It should be noted that the spatial/temporal image browser 316 shown in FIG. 15 in the system 300 may be an embodiment of the previously described browsing tool as described in conjunction with the computer system 10 of FIG. 1. Generally, as will be described, the browsing tool 316 displays various multimedia information in one of several display formats, such as those previously described, to aid a user in the selection and viewing of various portions of multimedia presentations as may be stored in the multimedia information 302. The user then selects a particular index corresponding to a particular multimedia presentation as may be included in the multimedia information 302. Once this selection is made, control may be passed to an application, 304 or 306, for displaying a multimedia presentation.

The multimedia data which may be extracted and used as an index for the various multimedia presentations includes any one of a variety of multimedia types, for example, such as image data, audio data, other video data, view graphs and other media streams.

Generally, the multimedia information 302 may include different types of multimedia presentations and information and may further include one or more varying streams of information combined together to make a single multimedia presentation. For example, as will be described, one multimedia presentation may include four media streams in connection with a presentation such as a speaker that performs the presentation with view graphs. The four different media may include, for example, view graphs, an audio stream, a video stream and speaker notes. A second type of multimedia information that may be included in the system 300 includes video key frames that index into a video stream and an associated audio stream. This is an example of a video clip having a corresponding audio track, for example, as when viewing movie trailers or clips. Such multimedia information and presentation may be used, for example, in connection with a video-on-demand application.

A third type of multimedia information that may be included in the system 300 may be related to consumer online shopping, as may be included in an electronic commerce application providing product descriptions and information to consumers shopping over the Internet. This type of multimedia presentation may include several different types of media streams similar to the video-on-demand. For example, there may be a presentation or a video clip for a product demonstration as well as additional text and audio information, such as a jingle or a verbal description, placed in an audio file accompanying the product demonstration. Each of these items may be included in a different media stream which, when in combination, result in multimedia presentation for a particular product.

Figure 16:
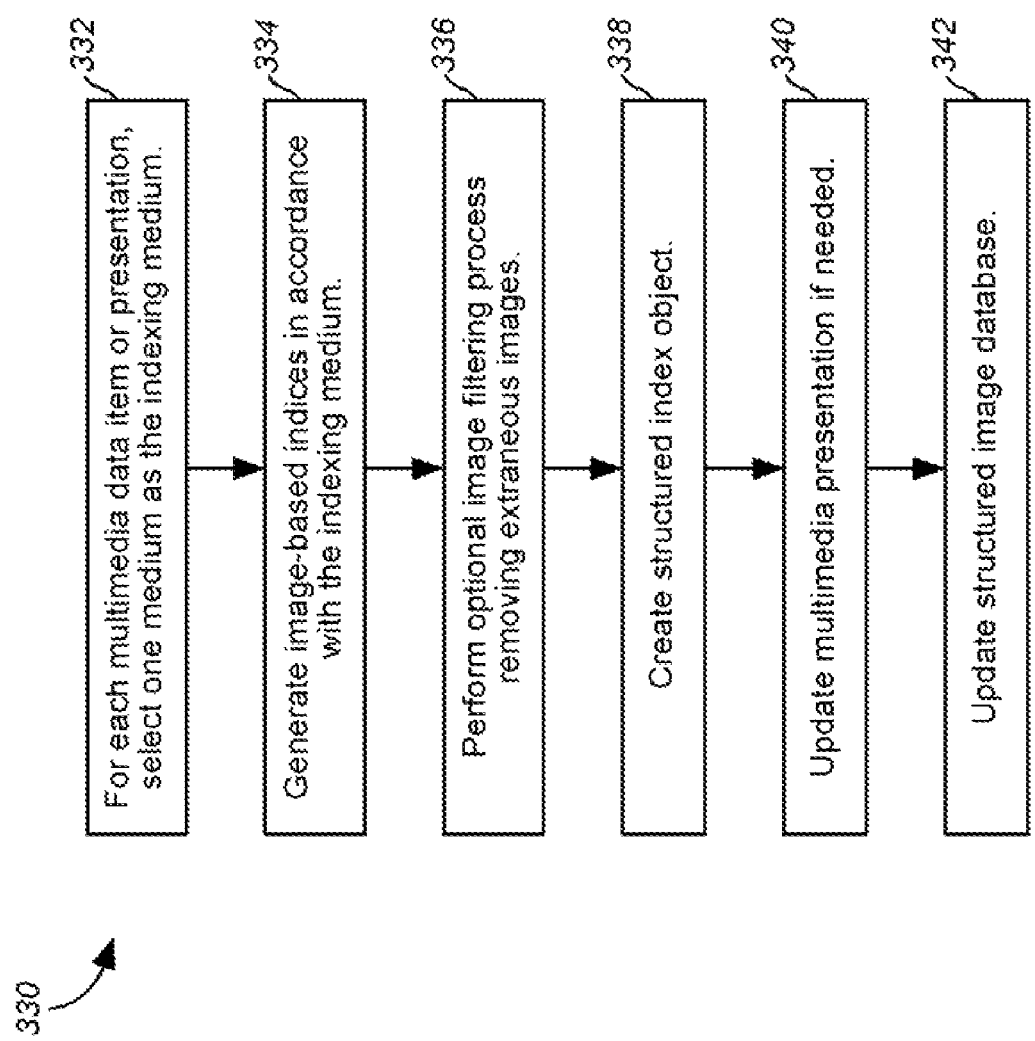
FIG. 16 is a flowchart of method steps of one embodiment for generating and using indices with a synchronized multimedia presentation.

Referring now to FIG. 16, shown is a flowchart of method steps of one embodiment for generating and using indices with synchronized multimedia presentations in the system 300 of FIG. 15. Generally, what will be described in conjunction with FIG. 16, flowchart 330 are method steps relating to the data flow and description previously set forth regarding the system 300. At step 332, for each multimedia data item or presentation included in multimedia information 302, one of the media types associated with the presentation is chosen as the indexing media. In one embodiment that includes multimedia presentations which are speaker presentations, using the previously described four media streams, view graphs may be used an index. A time stamp may be used to synchronize a particular point in the video, audio and speaker notes accompanying the corresponding view graph. Each view graph may be associated with a time stamp and a corresponding point found within each of the other media streams. In one embodiment, which includes the video or movie presentations, a video key frame may be used an index into a corresponding audio stream. In another embodiment that includes the online shopping multimedia presentations, a product image which represents a key frame in a video such as a product demo may be used as an index similar to the video key frame previously described with regard to a movie. The video key frame representing a product image is similarly used as an index into accompanying multimedia streams associated with a particular product being represented in a multimedia presentation.

At step 334, image-based indices are generated in accordance with the indexing media. It should be noted that at step 334, if other types of indices besides those which are image-based are used, these are also generated. It should be noted that at step 334 the image-based indices which are chosen are those which will be displayed in a particular format, for example, as by the browser tool 316 in one of the previously described display layouts to allow a user to select a particular multimedia presentation in accordance with the displayed multimedia indices. It should also be noted that different processes for generating the image-based indices at step 334 may vary in accordance with the particular media streams as well as the variety of software that may be available in each particular implementation. Example embodiments and processes for generating different types of indices will be described in more detail in paragraphs that follow. However, it should be noted that this should not be construed as a limitation as to techniques used to generate indices which are image-based used in conjunction with multimedia information 302.

It should also be noted that techniques providing for the automatic extraction of key frames from video streams are known to those skilled in the art. For example, the shot detection technique is an example of a well-known automatic extraction technique as may be implemented with the commercially available software Virage VideoLogger software system.

It should also be noted that at step 334, selection of particular portions of a medium, such as selecting a portion of a video frame to be used as a key frame and an index, may be done in an automated fashion as well as a manual fashion, or in combination. For example, there are techniques which determine that a video frame may be a video key frame in accordance with the amount of change detected between two consecutive images in a video. This may be done in an automated fashion, for example, using software which determines this difference in accordance with the data type and structure of the video files. Another key frame selection technique that may be performed, such as using videos with regard to the multimedia shopping presentation, may be performed manually. A video key frame may be selected as one to be used as an index, for example, if that frame of the advertisement for a product includes all of the components of a product in clear view. This may be performed manually by a person viewing the advertisement or clip for a particular product. Regarding the multimedia presentation of the speaker, each view graph included may be used as an index medium.

At step 336, optional image filtering processing is performed to remove any extraneous images. Step 336, for example, may be performed in an automated or a manual fashion. A person may view all of the image indices associated with a particular multimedia presentation and determine that one should be removed for any one of a variety of reasons in accordance with predetermined criterion. For example, a threshold number of indices may be chosen and a decision may be made to remove the first and the last image index for a particular presentation. Alternatively, for example, an automated process may be performed upon the selected image indices associated with a particular multimedia presentation to remove one or more images that do not meet predetermined criteria. Such predetermined criteria, for example, may include images of a particular color, including certain objects, or other criteria. One or more indices may be removed or "filtered out" in connection with, for example, heuristics related to the amount and/or number of colors, such as concentration and contrast related to image coloring, degree of similarity or difference between two images, and temporal proximity.

At step 338, a structured index object is created that may be stored in the database 308. As will be described in conjunction with other figures, at step 338, one or more records are generated in accordance with the various indices. At step 340, the multimedia presentation as may be included in multimedia information 302 is updated if needed. For example, at step 340, a time stamp associated with each view graph of a multimedia speaker presentation may be determined. It may then be necessary to accordingly update one or more of the associated multimedia streams also associated with that presentation to synchronize the multiple media streams of the presentation. This enables, for example, a synchronization point in each of the media streams for a particular view graph. Similarly, this update step may be performed for other types of multimedia presentation, such as the video and audio streams associated with the video-on-demand selection. Step 340 may be performed prior to this point in processing as included in the flowchart 330. However, since there is an optional filtering step 336, it may be beneficial to perform this step subsequent to performing any optional filtering so as not to unnecessarily update other media streams in the multimedia information 320 for indices which may be removed by the optional filtering step 336.

Each technique for updating the different streams in accordance with, for example, the indices selected, may vary with each particular embodiment and implementation. Particular examples will be described in paragraphs that follow. At step 340, the index database 308 may be updated to include the information for the indices created or determined for each particular multimedia presentation.

Referring back to FIG. 15 with system 300, what has been described in conjunction with FIG. 16, flowchart 330 is the process by which indices are extracted from the multimedia information 302 and information may be stored in the database 308 corresponding to the various multimedia indices. As previously described, the multimedia information 302 for which multimedia indices are determined may include, for example, an entertainment movie, a seminar style presentation, and an online shopping presentation, as well as other types of multimedia presentations in accordance with applications.

It should be noted that, as described in other sections included herein, the indices may be presented for viewing in accordance with a predetermined structure or format. For example, an HTML file may be dynamically generating using information from the index database for each multimedia presentation to be presented in accordance with a user selection, such as seminars or speaker presentations may be displayed in accordance with a predefined viewing format for a particular speaker selected by a user. The format or viewing structure of the various titles may be predetermined. However, the HTML file may be dynamically generated in accordance with the particular user selection.

Figure 17:
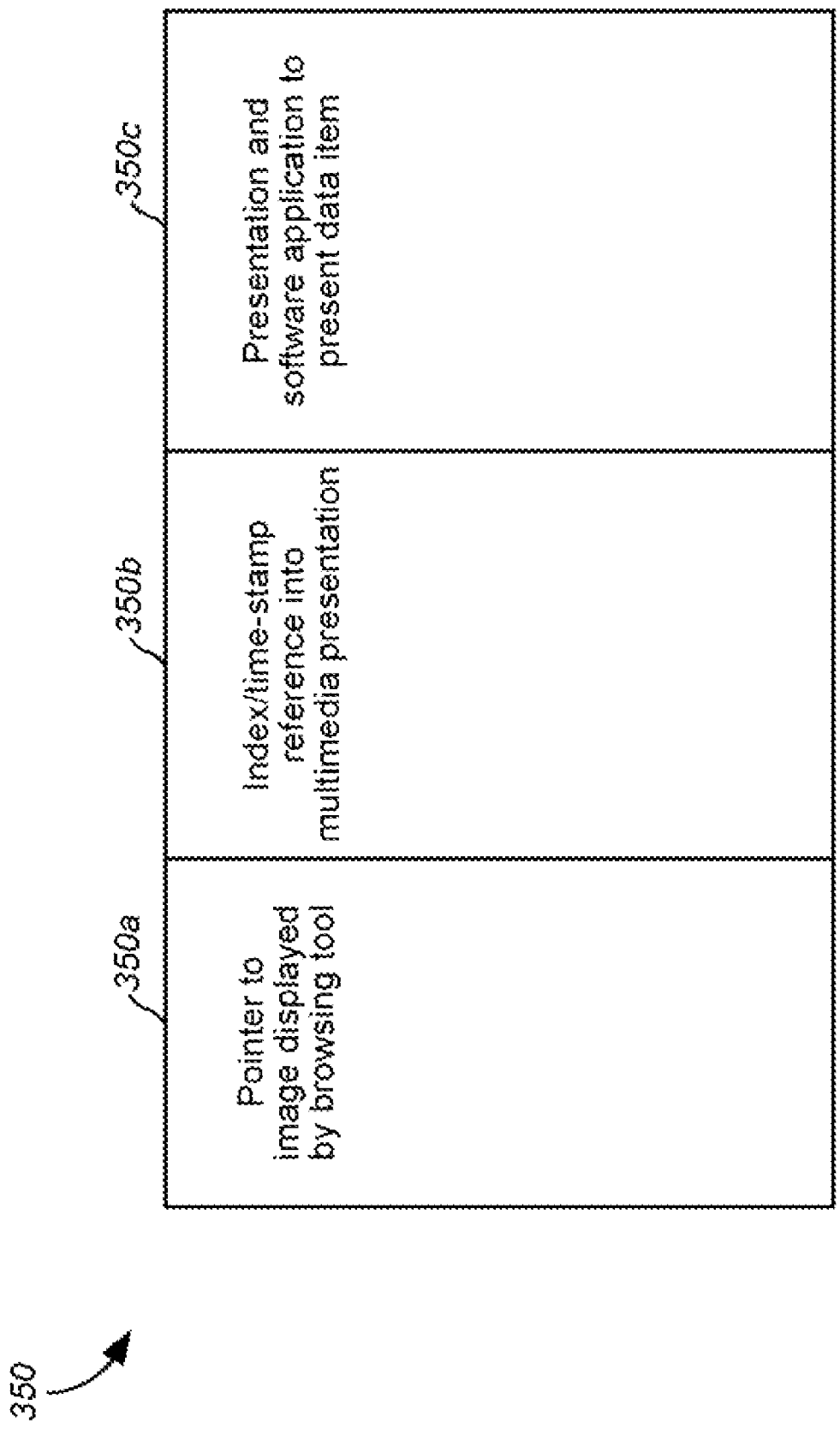
FIG. 17 is an example of an embodiment of a database schema record for indices created and used in connection with multimedia presentation to be browsed using the browsing tool.

Referring now to FIG. 17, shown is an example of an embodiment of a database schema record for indices created and used in connection with multimedia presentations to be browsed using the browsing tool. The record 350 is an example of a database schema record that may be stored, for example, in the index database 308 of the system 300 of FIG. 15. The record 350 in this embodiment includes three fields. It should be noted that although what will be described are three fields, other embodiments may include records that include a varying number of fields with other additional information in accordance with each particular implementation. The record 350 includes a pointer to the image to be displayed by the browsing tool 316 in the field 350*a*. Also included in the record field 350*b* is an index or time stamp reference into the multimedia presentation. Filed 350*c* specifies a software application to which control is to be transferred. In this embodiment, field 350*c* includes a URL with a file extension. The URL may identify a multimedia presentation and the file extension may identify a software application that is invoked to present the multimedia presentation. It should be noted that other techniques may be used to both specify the software application and the multimedia presentation in accordance with the functionality available with each particular embodiment.

Field 350*a*, which is a pointer to the image to be displayed by the browsing tool 316, may be a file identifier or handle identifying an associated image, such as a file identifier of a JPEG or .GIF image file. The information 350*a* is associated with or represents an address of an image that is displayed, for example, such as an image included in the display format 182 of FIG. 11 such as images 160 or 162. Field 350*b* identifies an associated temporal index or reference into the multimedia presentation. In particular, in this embodiment, the index or time stamp represents a reference with regard to the image associated with 350*a*. For example, with the video-on-demand application, the field 350*a* may be a pointer to an image which is a portion of a video in which the video key frame associated with field 350*a* occurs at a particular point in time with respect to a video clip. The point in time is referenced by field 350*b*. This index may be, for example, a temporal offset into a video with regard to playing time from the beginning of the clip. Field 350*c* represents a software application which, if the associated image is selected at field 350*a*, is invoked to display the multimedia presentation. In other words, field 350*c* is associated with a software application to which control is transferred to present one of a variety of different multimedia presentations.

Generally, the record format 350 of FIG. 17 includes information which is displayed by the browsing tool, such as the images associated with fields 350*a*. A user selects one of the associated images displayed, and accordingly, a software application is invoked through a control-transfer mechanism in accordance with each particular embodiment. The particular software application is identified in field 350*c*. The software application may be transferred control along with additional information such as the index time stamp reference into the multimedia presentation represented by field 350*b*.

Figure 18:
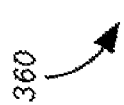
FIG. 18 is a more detailed example of the database schema record of FIG. 17.

Referring now to FIG. 18, shown is a more detailed description of a particular database schema record previously described in conjunction with FIG. 17. In this particular example 360, information may be included in the record in accordance with the previously described record structure for a particular multimedia presentation. Record includes an identifier of a file of a view graph miniature image in the first field, with the time stamp in the second field, and a software application identifier of a multimedia presentation player in the third field. In this particular example, the record 362 in the view graph miniature image file identifies a file, such as a URL or a file name, in accordance with a particular file system of the image that is to be displayed by the browsing tool 316. The second field includes a time stamp which represents the particular point in the presentation and in the associated multimedia streams which correspond to the particular image represented in the first field which has been chosen as an index into the presentation. The third field of record 362 is a presentation player URL. In this particular embodiment, a presentation player which has the name of the DejaView software application is identified by a particular file extension on a URL that may be included in this field. For example, a URL with the file extension ".DJVW" specifies that control is to be passed to a particular software application.

As will be described in following paragraphs, this application may be used to view a speaker presentation, for example, including viewgraphs, speaker notes, and an accompanying audio and video stream. In one embodiment, the third field may include a URL describing a particular presentation in which an association may be made between a software application and a particular file extension. For example, in this particular embodiment, the third field may specify a URL of a file with a file extension associated with a particular software application through a MIME type. The browser may use an operating system supplied control mechanism for passing control from the browser to the specific software application. As known to those skilled in the art, the particular mechanism by which control may be passed is in accordance with each particular embodiment and implementation and operating system-supplied mechanism.

The first record 362 may be an index into a speaker presentation as previously described which includes view graphs as well as speaker notes and a video and audio stream corresponding to a speaker presenting the view graph. Record 364 may correspond to an index, for example, with a video key frame serving as an index into a movie. The first field of record 364 identifies an image which is a video key frame. Similar to record 362, the second field represents a time stamp which is a temporal spacing into the associated video at the position where the video key frame occurs. The third field identifies a pay-per-view application, such as by a ".PPV" file extension which result in invoking a pay-per-view application. Thus, images displayed with this associated index may be a series of indices into movies or videos displayed, for example, by the browser tool 316 when a user is selecting a movie for a pay-per-view application.

Record 366 may correspond to an index, for example, of a particular product of an e-commerce shopping application. The first field may be associated with a file that is a product image. The second field may represent a time stamp or index into a video, for example, corresponding to a product demonstration. The third field may include a URL to an e-commerce shopping application identified through a particular file extension and its corresponding MIME type.

It should be noted that the foregoing is just one example of an embodiment of a database schema and record format which corresponds to each of the various indices in accordance with each of the multimedia data types. These records may be created and stored in the index database 308. The database itself may be any one of a variety of types of database such as an object database or relational database that can be implemented with any one of a variety of commercially available packages. At this point in the process, information about the indices have been gathered and created and stored in database 308. What will now be described in the paragraphs that follow is how this information stored in the index database may be loaded and used by the browser 316.

Figure 19:
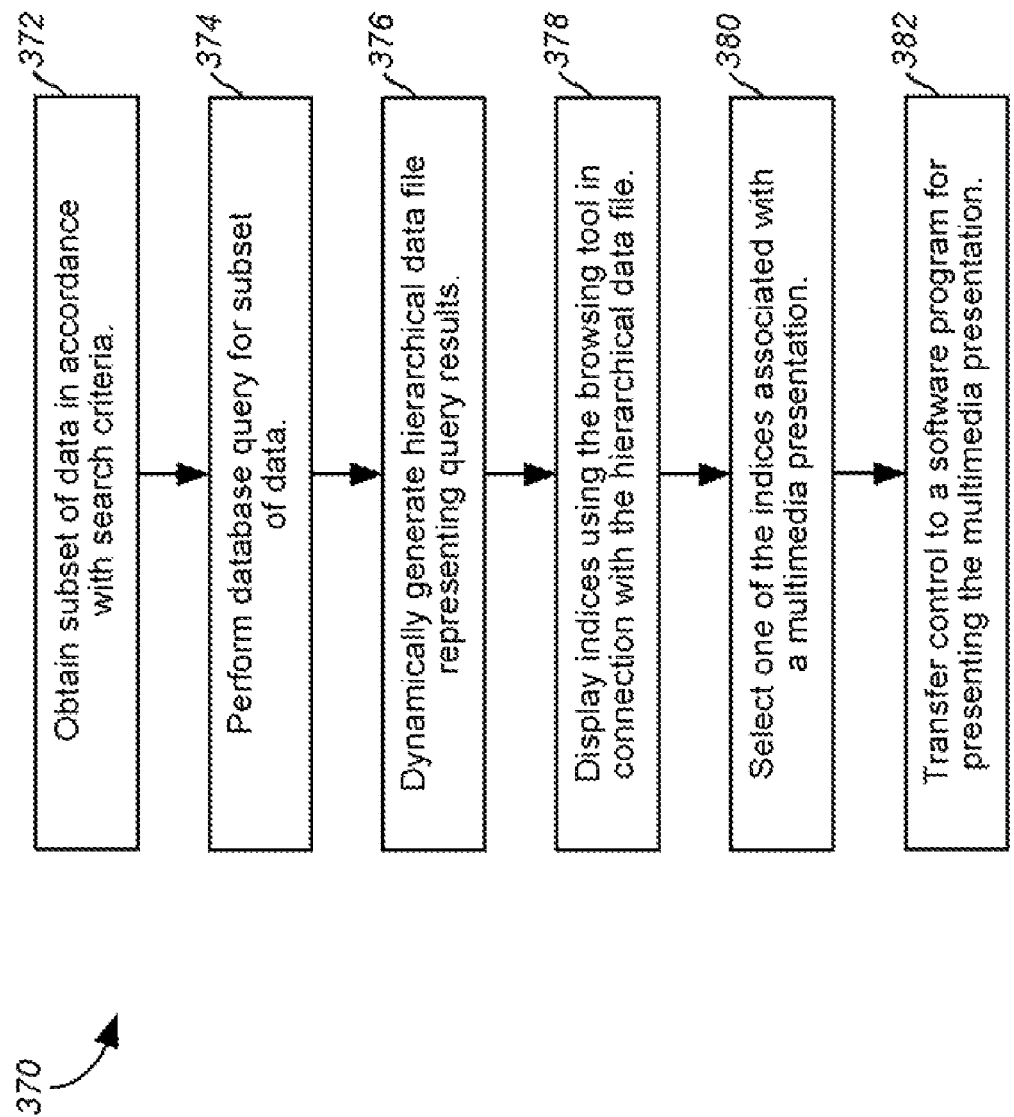
FIG. 19 is a flowchart of steps of a method for selecting a multimedia presentation using the browsing tool and multimedia presentation indices from the database.

Referring now to FIG. 19, shown is the flowchart 370 of steps of one embodiment of a method for selecting a multimedia presentation using the browsing tool and multimedia presentation indices from the database 308. At step 372, a subset or reduced set of data has been obtained in accordance with user search criteria. Generally, step 372 has the purpose of reducing the candidate set of data for which information is to be displayed by the browser 316 to a reasonable subset, for example, that may be displayed in accordance with one of the previously described display layouts and techniques. This subset of information may be obtained using any one of a variety of existing search engines and techniques. For example, for each multimedia presentation included in the multimedia information 302, categories may be associated with each of these. Each of the multimedia presentations and corresponding information may be indexed and stored in some type of structure from which data may be stored and retrieved, such as a linked list or other data structure known to those skilled in the art. A user may perform an initial query in accordance with predetermined categories associated with each of the multimedia presentations. As a result of performing this query in accordance with one or more user selected categories, the names of various multimedia presentations may be the resultant set. In this instance, the results set may include handles or identifiers associated with each of the records such as 362, 364, and 366 stored in the database 308. It should be noted that the embodiment of FIGS. 17 and 18 in the database schema record include, for simplicity, only that information which is associated with each of the applications and images. Other information that may be included in the database records and not shown in the foregoing figures, for example, is the link by which a query may be performed of the database. In other words, if a user has determined that they would like to look at multimedia presentations or videos associated with comedy movies, additionally stored in the database 308 or elsewhere is a link identifying each of the indices associated with a video key frame of a comedy movie. This information may be stored internally in the database 308 within each of the records, or separately in a different data structure or database schema. For example, if the category is a comedy movie, stored in the database 308 or elsewhere may be a list of database records associated given titles with predetermined categories. This may, for example, save time when performing a query of the database by having these records already pre-selected and predetermined for each of a particular category.

At step 374, a database query is performed to retrieve the records corresponding to indices for the subset of data to be displayed by the browsing tool 316. The information retrieved as a result of step 374, for example, may be the image URLs and other associated fields stored in each of the records. At step 376, a hierarchical data file is dynamically generated which represents these query results. For example, performed in the processing of step 376, the URLs may be organized in a format, for example, such as the hierarchical data file 150 of FIG. 2A in accordance with a predetermined display format. In other words, the URLs may be arranged in a particular format or structure in accordance with the display or viewing format.

At step 378, the image indices are displayed using the browsing tool 316 in connection with the hierarchical data file. At step 380, one of the displayed image indices is selected by a user such as from a display area having one of the image display formats, for example, as shown in FIG. 9 or FIG. 11. As the result of selecting one of the indices associated with a multimedia presentation, control is transferred at step 382 to a software program or application which presents the multimedia presentation corresponding to the index selected.

Referring back to FIG. 15, and to the information included in the database schema as described in conjunction with FIGS. 17 and 18, the browser 316 may be used to display the indices. A user makes a selection. The image browser 316 uses the information from the third field in the record, such as record 364, to invoke an application such as the pay-per-view application. Associated with the displayed index is a particular multimedia presentation, for example, as stored in accordance with the subset of information at step 374. In other words, there is a link between the various indices and a multimedia presentation where, given a particular index, a multimedia presentation may be found. Similarly, given a multimedia presentation, the various indices in the database may also be found. This data structure may be stored, for example, in the form of lists predetermined as previously described. For a specific index selected, the multimedia information is obtained from the multimedia information block 302. It should be noted that the browser 316 may obtain additional information as needed from the multimedia information store 302 in order to transfer control to a software application. The software application to be invoked is represented in the third field, for example, of a database schema record 360 of FIG. 18. Using an operating system or other implementation-specific transfer mechanism, control may be transferred to another application with the appropriate parameters and other information to invoke and display the multimedia presentation corresponding to the selected image index.

It should be noted that the techniques available for performing a database query, for example, of the database 308, may be supplied with a commercially available database package that may be chosen in accordance with each particular embodiment. Application Programmer Interfaces (APIs) may be supplied to allow a user to perform a data query retrieving the appropriate information that is used by the image browser 316. Information as to which of the indices correspond to a particular multimedia presentation associated with the subset as used in step 374 may be stored in the database 308 or elsewhere.

Figure 20:
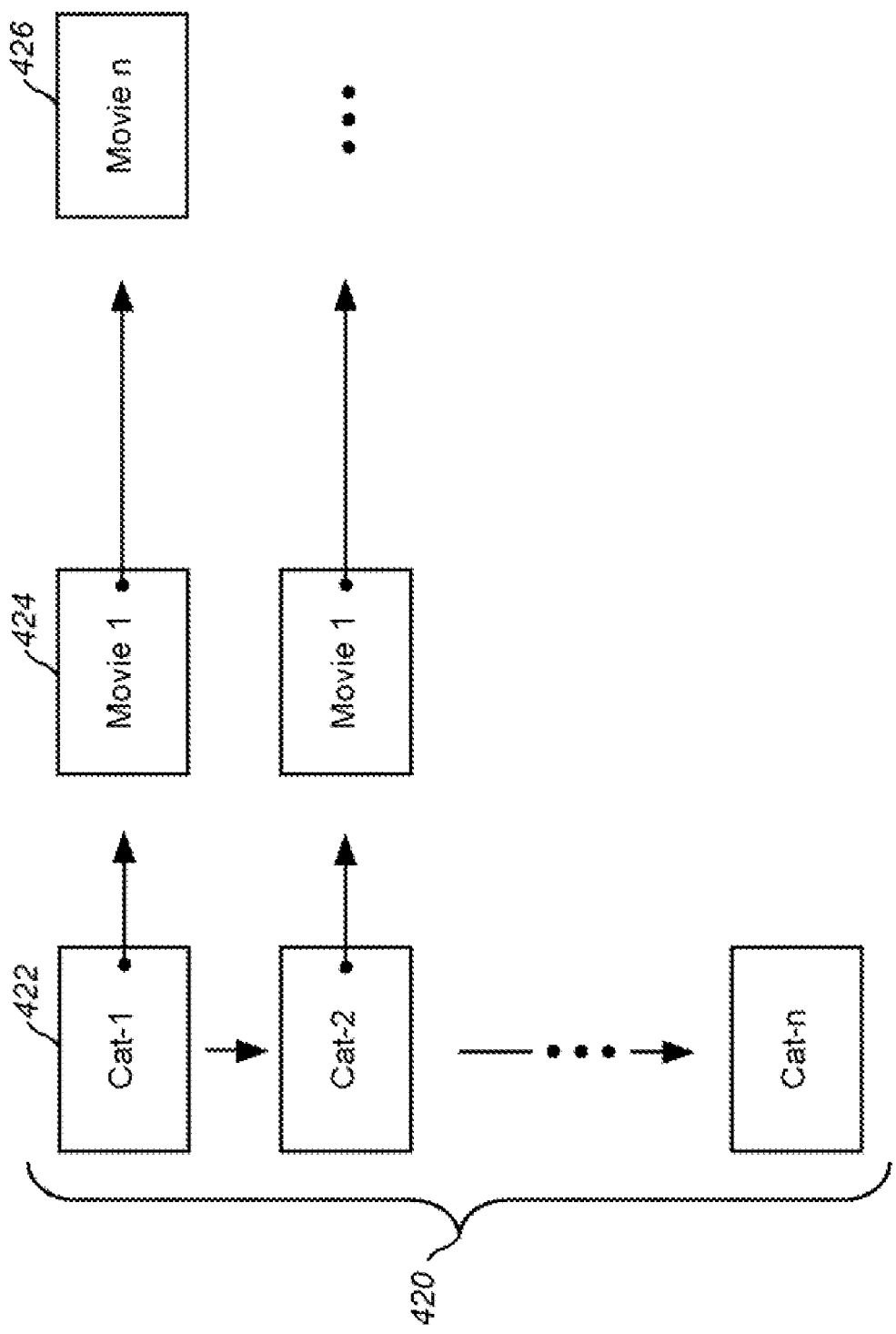
FIG. 20 is an example of an embodiment of a data structure used to associate categories with one or more multimedia presentation items.

Referring now to FIG. 20, shown is an example of an embodiment of a data structure that may be used to map categories to movies. The data structure 420 represents a relation between a predetermined set of categories and associated multimedia presentation items that are movies. Similar data structures and others may be used to represent this and other types of multimedia information in accordance with each of the applications, such as 304 and 306. The data structure 420 includes a list of predetermined categories. Each category may be associated with one or more multimedia items. In this example, cat-1 422 is associated with movie 424 and movie 426. The categories may be a set of predetermined categories in which, using either automated and/or manual techniques, categories are mapped to multimedia items, such as movies 424 and 426. A user may be selecting a movie in connection with a pay-per-view application. The user may select a category of movies, such as comedy, that corresponds to one or more categories, such as cat-1 422. This reduces the selection space to a subset of movies associated with this category. In this instance, the user query may result in only a single category, cat-1 422, and only those movies associated with this category. It is from this list of movies that the user may select a single movie or video resulting in control being passed to a video-on-demand or pay-per-view application program.

Referring to FIG. 21, shown is an example of an embodiment of a second data structure associating a movie with one or more indices that may be represented in the database 308. Data structure 430 may be used in conjunction with data structure 420 to display one or more indices using the browsing tool 316 in connection with a user query. In this example, once one or more movies may have been selected using data structure 420. Data structure 430 may be used to obtain the one or more indices associated with each movie. It should be noted that other data structures besides 430 may be used to store and retrieve information as needed to display associated indices using the browsing tool 316. For example, a linked list rather than a table format may be used. Other variations known to those skilled in the art may be used with appropriate storage and retrieval techniques in accordance with each variation.

Additionally, the information represented in data structure 420 and 430 in combination relates to one embodiment in which the multimedia presentations of interest to the user are reduced in accordance with predetermined categories associated with each of the presentations. Other embodiments may use other techniques to reduce the number of multimedia presentations of interest to a user. Similarly, the data structures used in connection with these techniques may also vary. The storage location of these data structures may also vary in accordance with each embodiment and system configuration.

What will now be described in conjunction with FIGS. 22-27 are illustrations and examples of particular applications that may be invoked in accordance with different kinds of multimedia presentations whose indices are displayed by the image browser 316.

Figure 22:
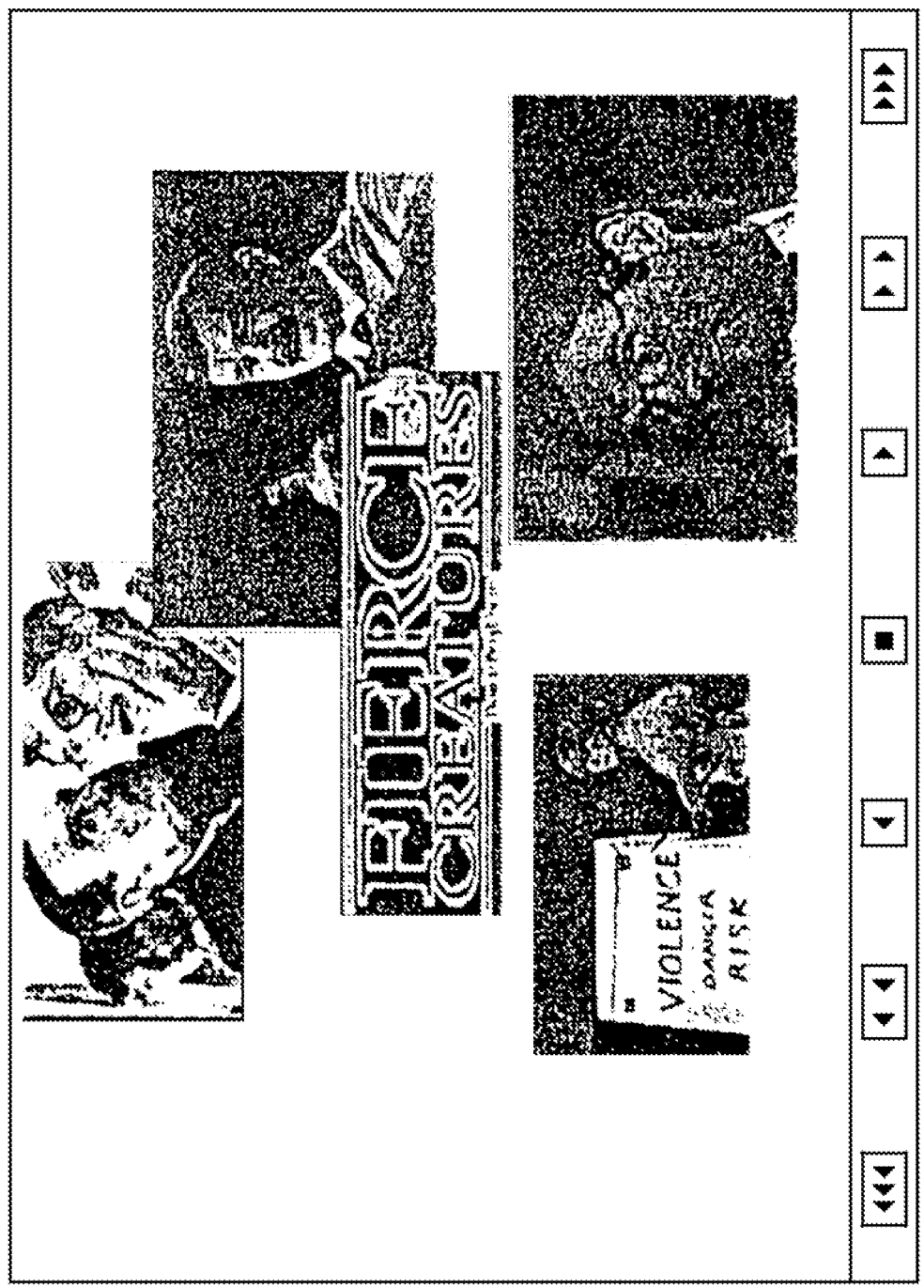
FIG. 22 is an example of an embodiment of a user interface display of video titles using the browsing tool.

Referring now to FIG. 22, shown is an example of an embodiment of a user interface display 400 to display video titles using the browser tool 316. This may be an interface, for example, presented with a video-on-demand selection as a service presented with a choice of entertainment video title where a user selects a particular video that they desire, for example, to have streamed over IP networks or other networks to home PCs or other display devices. Due to the availability of large numbers of titles available from the network, users of the service require support for narrowing down the space of potential selections. A particular subset of category selection may be performed resulting, for example, in a display of FIG. 20, 400, in which video key frames from designated movie favorites are presented as dynamic collage. At any time in this display, the user may select, as by a mouse click, a key frame of interest which results in the transfer of control to another application such as 306 to a new screen.

Figure 23:
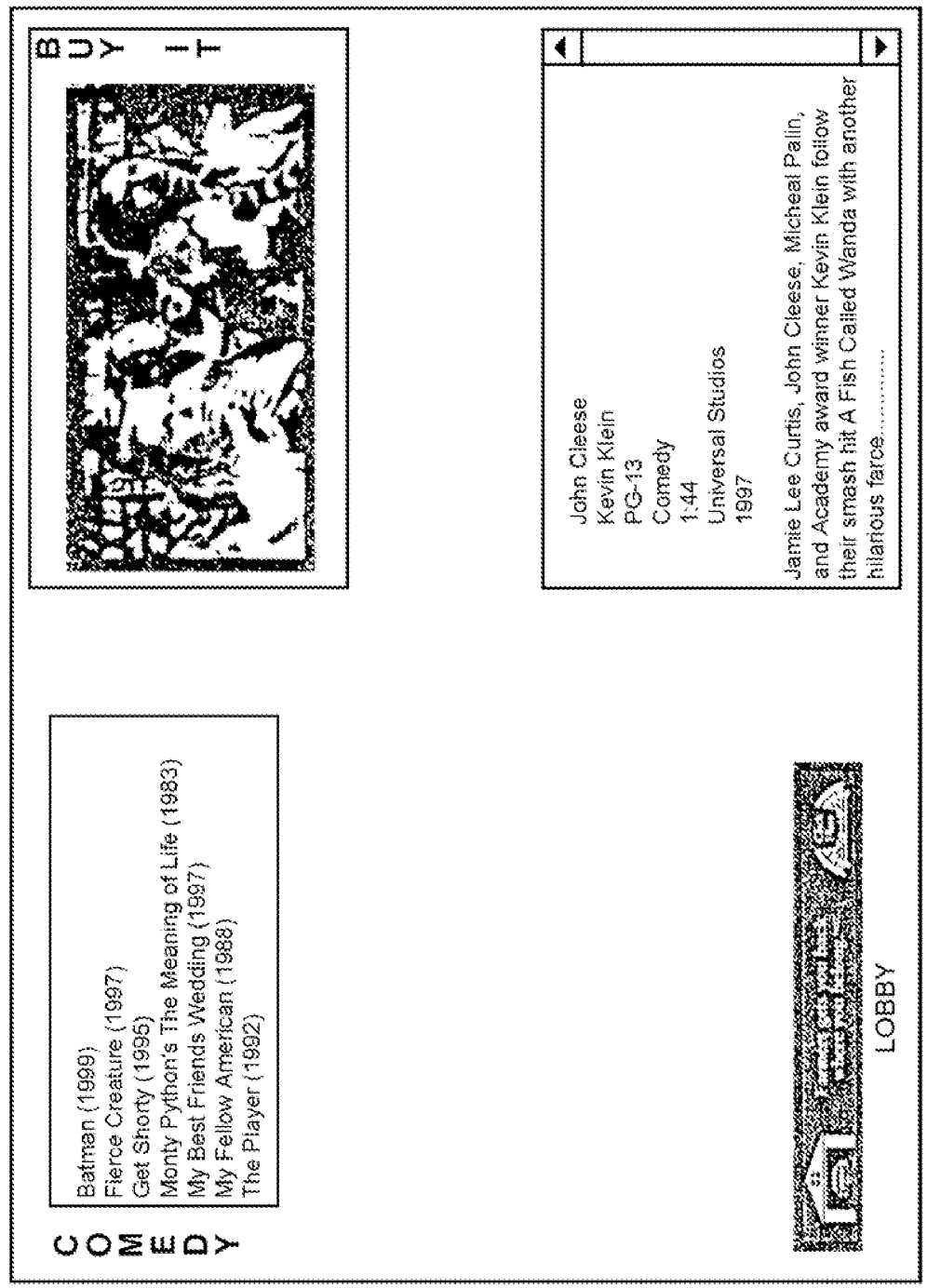
FIG. 23 is an example of an example of an embodiment of a screen displayed when a selection of a movie title has been made using the browsing tool.

Referring now to FIG. 23, shown is an example of an embodiment of the screen displayed when the selection of a movie title has been made from the screen 400 of FIG. 20 using the browsing tool 316. The display 402 of FIG. 23 presents a movie trailer and other information about an associated title selected. Thus, using the browsing tool techniques and display format previously described in combination, the user is assisted in "drilling down quickly" through a large space of movie titles to a point where a choice of whether to select or pay for a movie delivery can be reached. It should be noted that techniques by which representative video key frames may be generated from video content either automatically or semi-automatically are well-known to those schooled in the art.

Using the foregoing as may be done in connection with FIGS. 22 and 23, a sequence of video titles has been specified. In accordance with techniques previously described herein, server software may dynamically generate an HTML file that represents the results via a query resulting in the title skimming screen, for example, as shown in conjunction with FIG. 22 400. The browsing tool 316 takes as input the HTML or XML file that specifies the sequence of title objects, each of which is associated with a sequence of images that may be specified, for example, as URLs previously described in conjunction with the hierarchical data file 150 of FIG. 2A. Also as previously described, as part of the off-line processing, previously stored images, such as JPEG and GIF format files have been made available and accessible using various protocols such as HTTP. As the user views the title sequence, images are loaded incrementally in conjunction with the various display formats chosen. Any one of a variety of different layout techniques may be used, such as those previously described in conjunction with other figures herein.

Figure 24:
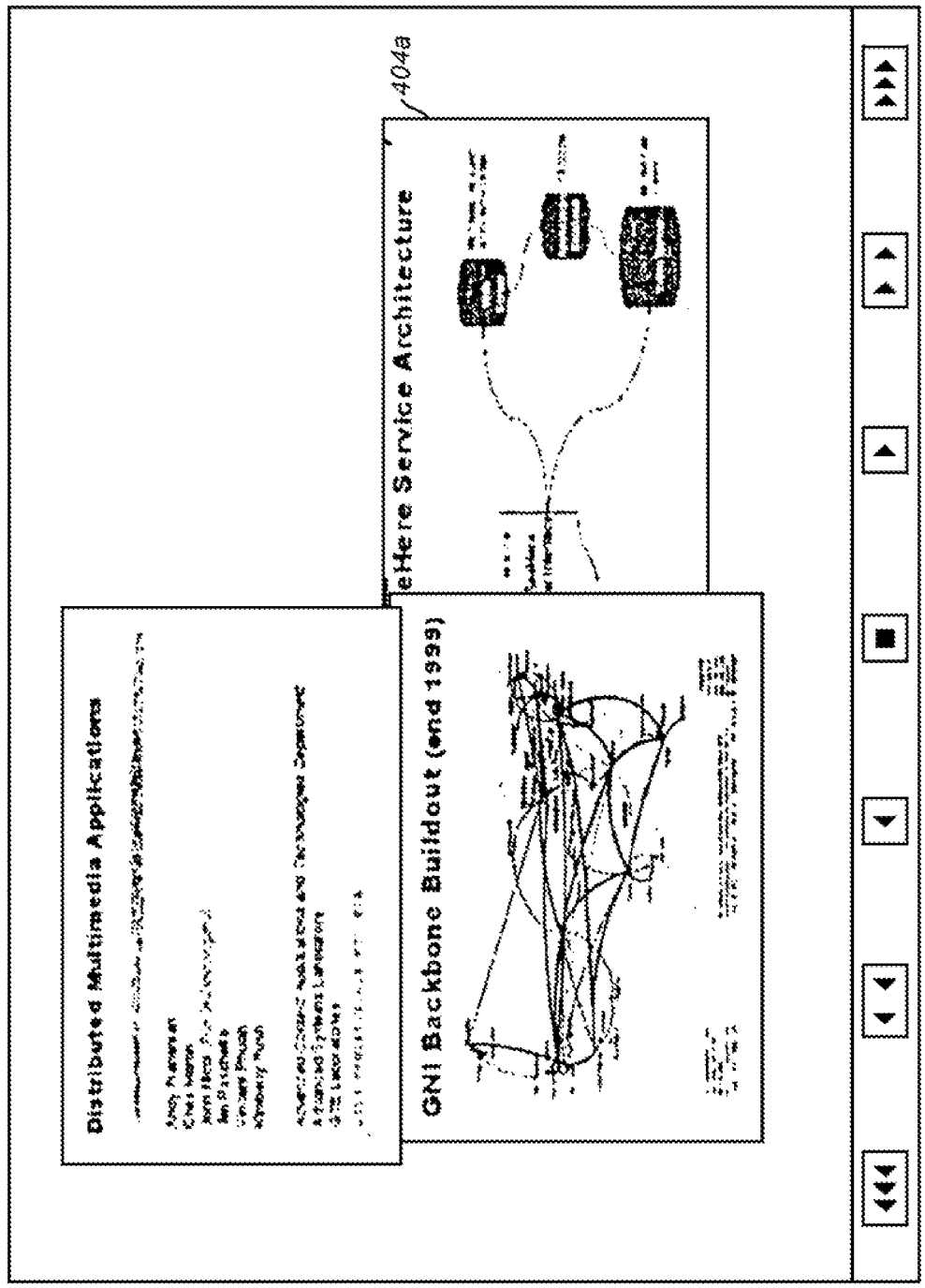
FIG. 24 is an example of an embodiment of a user interface display of a multimedia presentation using the browsing tool.

Referring now to FIG. 24, shown is an example of a software presentation player, for example, called DejaView. Generally, as will be described, this DejaView player is a software application that runs as a client on a user's computer in which the user experiences, for example in this application, a virtual auditorium-style presentation that includes temporally synchronized multimedia elements, such as the four media streams previously described, including view graphs, user notes, and audio and video streams of the speaker. The DejaView player such as 304 included in the system 300 of FIG. 15, is a tool that allows the user to navigate around a presentation in a random access fashion while maintaining synchronization between the various media streams. The DejaView application may use temporal and spatial browsing techniques of the browser 316 in which view graph miniatures serve as the indices displayed by the browser 316. The view graph images may be generated and stored prior to processing by the browsing tool 316. By selecting a particular view graph miniature displayed in the browser tool 316, control may be transferred to the DejaView player 304 to a particular presentation. FIG. 22 is an example of an embodiment of the user interface display of the multimedia presentation using the browsing tool in which miniature view graphs as part of a speaker's presentation are used as indices and displayed. When the user makes a particular selection of a view graph, such as 404a of FIG. 22, runtime or execution control may be transferred to the DejaView player 304.

Figure 25:
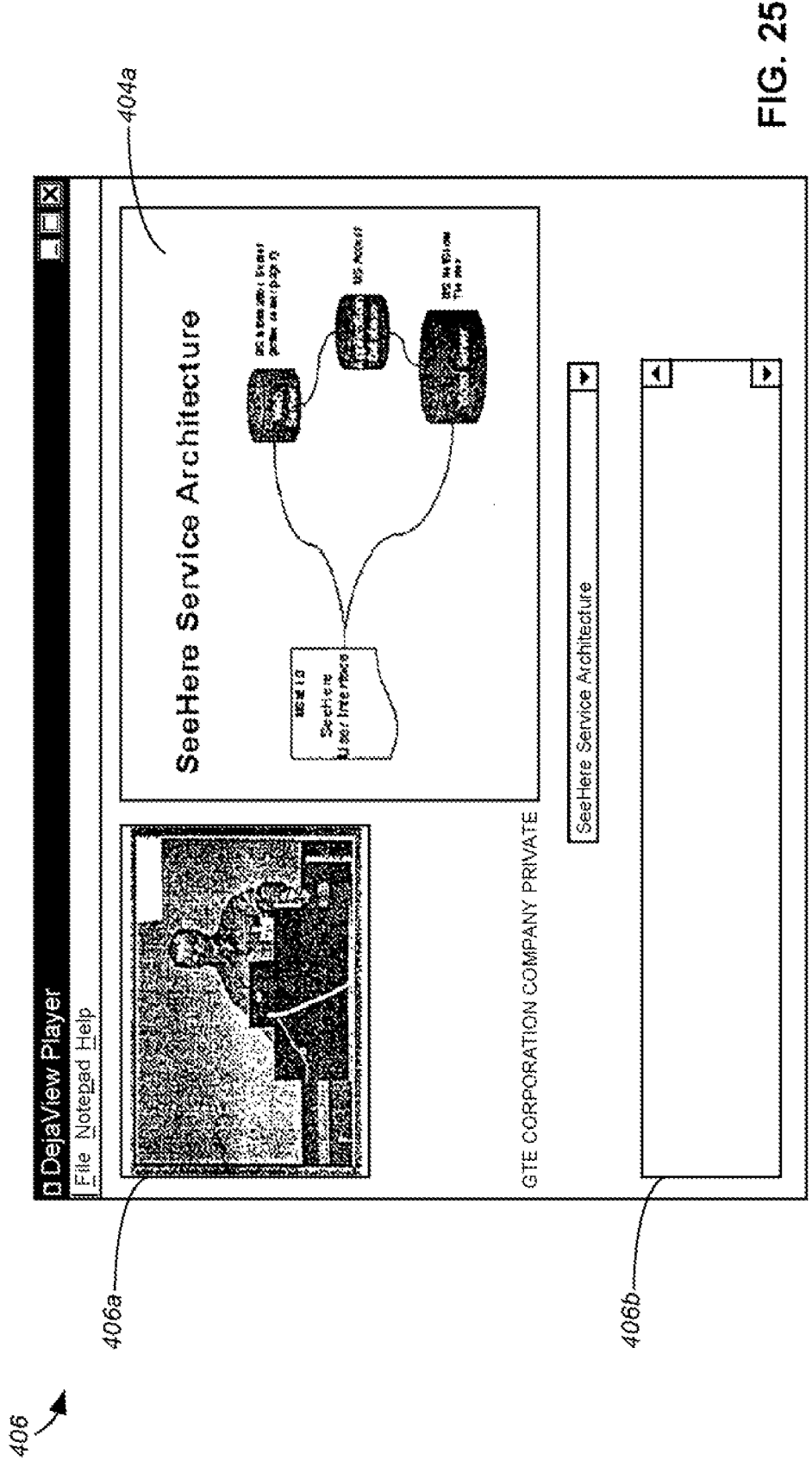
FIG. 25 is an example of an embodiment of a screen displayed when a selection of a multimedia presentation has been made using the browsing tool.

Referring now to FIG. 25, shown is an example of the embodiment of a screen displayed when a selection of a multimedia presentation has been made using the browsing tool such as by selecting the miniature view graph 404a. FIG. 25 displays an example of a screen under the control of the DejaView player 304 when a particular view graph is selected. The user is presented with the view graph in an enlarged form. Additionally, using the time stamp information associated with the view graph, the user is fast-forwarded to different places corresponding to the time stamp which are synchronized with the time stamp in the associated media streams. In other words, view graph 404a which has been selected occurs at a particular point in the presentation associated with a first time stamp. The first time stamp represents a marker or a "book mark" into the other video streams: the video stream, audio stream and the like. The DejaView player provides, for presenting to the user, a point of synchronization in each of the media streams.

Figure 26:
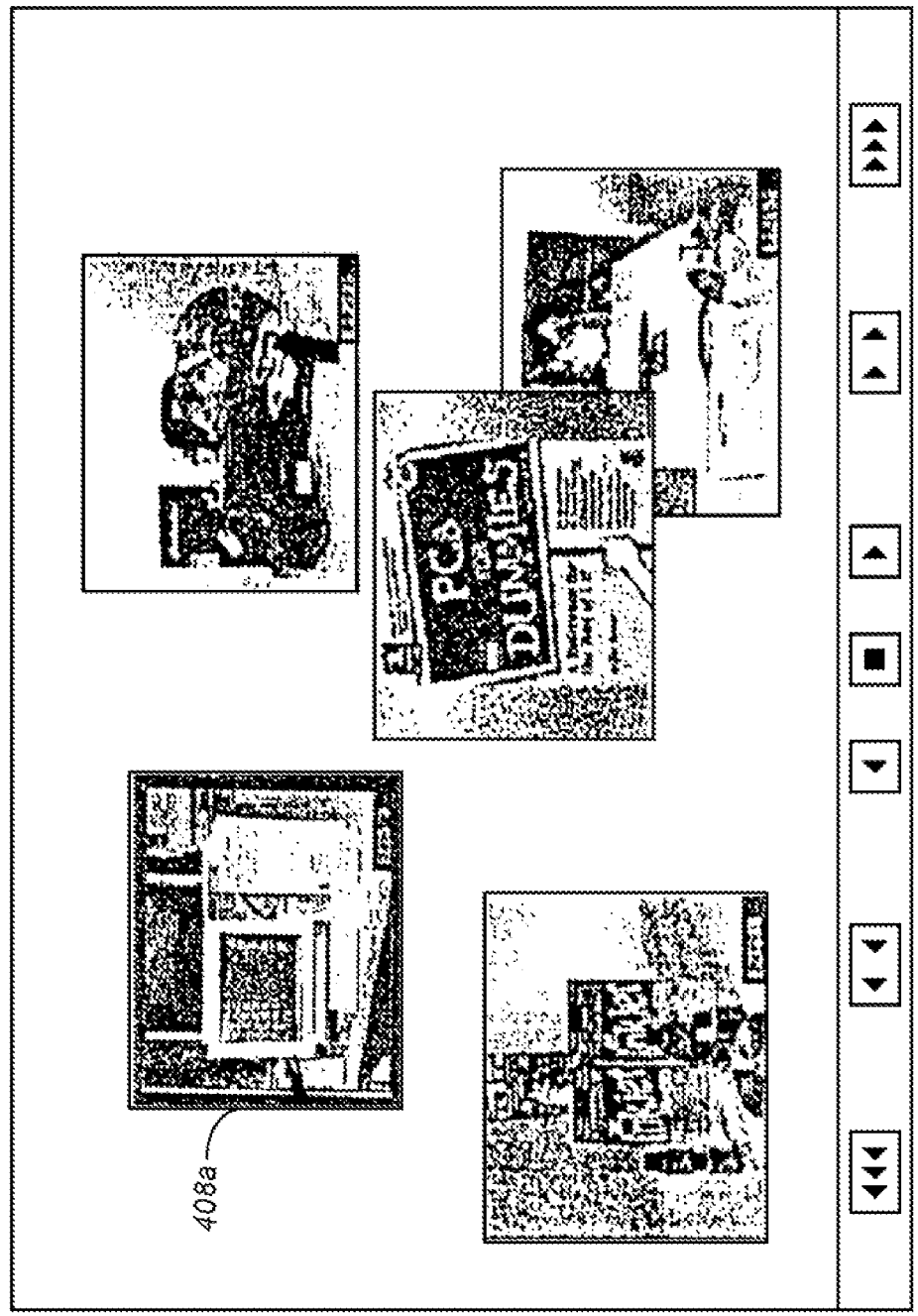
FIG. 26 is an example of an embodiment of a user interface display of multimedia shopping titles displayed using the browsing tool.

Referring now to FIG. 26, shown is an example of an embodiment of a user interface display of a multimedia shopping title in which the titles are displayed using a browsing tool 316. In this example embodiment, the proposed technique for indexing into multimedia presentations includes online all e-commerce shopping. Vendors such as QVC have demonstrated consumer appeal for convenience shopping services through the likes of QVC's product showcase television products. In such shows, consumers may be presented of blocks of product descriptions as well as certain related information such as real-time number of sales for that product and the like. The internet is one media which may provide similar on-demand access to such services, for example, as allowing displaying of video for product demonstration for a particular product. This technique, for example, may enhance traditional television shopping experience through the use of multimedia techniques. Various information is displayed in the screen 408 regarding personal computers. If a user selects, for example, element 408a from the screen, which is of a particular computer product processor, an e-commerce application may be invoked.

Figure 27:
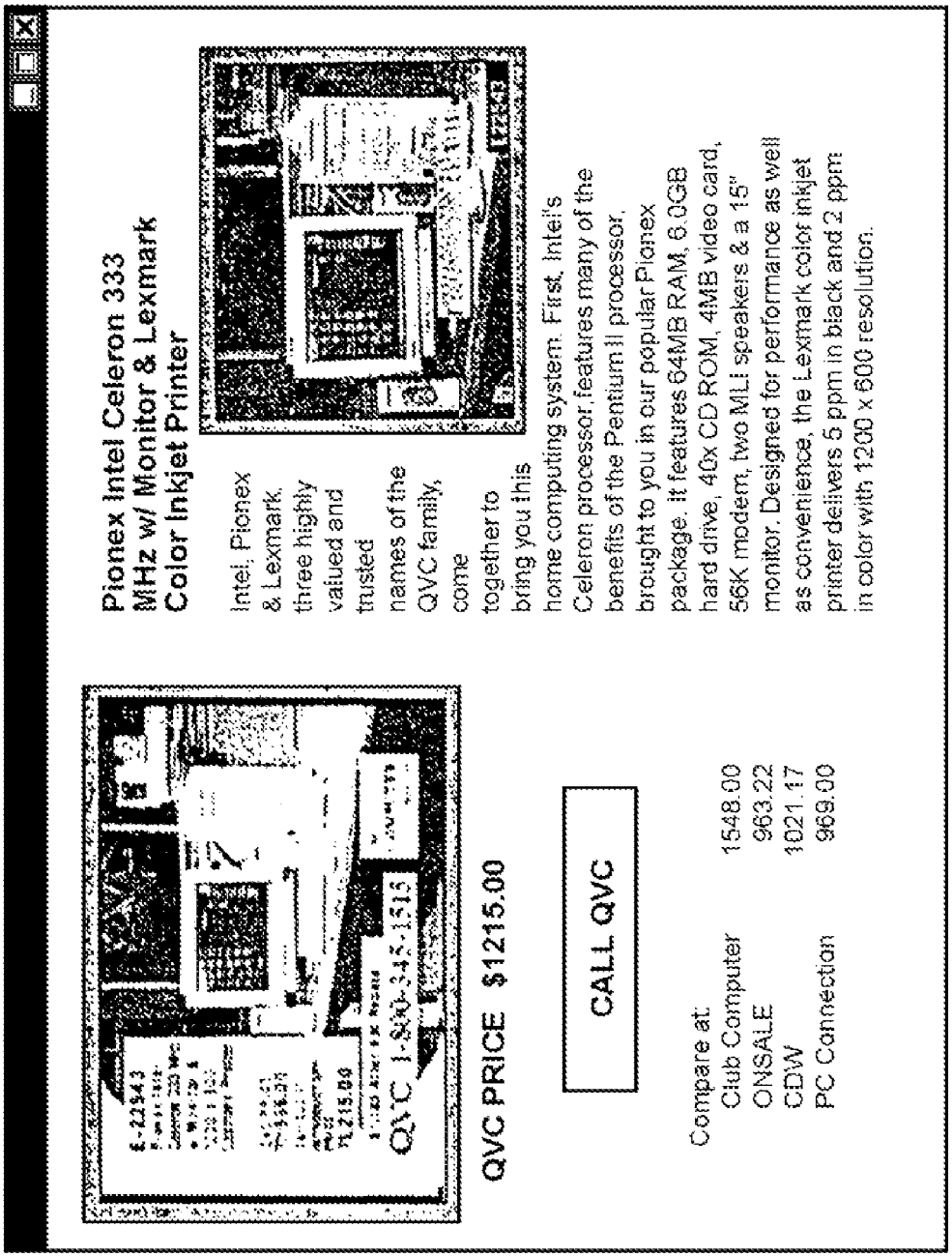
FIG. 27 is an example of an embodiment of a screen displayed when a selection of a multimedia shopping title has been made using the browsing tool.

Referring to FIG. 27, shown is an example of an embodiment of a screen display when the selection of a multimedia shopping title 408a has been made using the browsing tool 316. The screen displayed in FIG. 27 is that associated with a particular other application such as 306 where control has been transferred from the browser 316.

Generally, a DejaView Player 304 is one of the applications that may be used to display, for example, a multimedia presentation selected by a user in conjunction with the browsing tool 316. What will now be described is one embodiment of this player and related components which synchronize various media streams. Other techniques may be used in conjunction with other embodiments and implementations. Additionally, these techniques used to synchronize the four streams may be used to synchronize a subset of these streams with other applications.

The DejaView player 304 is part of a software application that may be used to capture and play multimedia information. In particular, this may be used for real time capture and creating synchronized multimedia streams therefrom which may accessed using a communications connection, such as one of a variety of network connections. The capture of the multiple multimedia streams may generally refer to media journaling techniques for capturing events, such as a lecture style presentation with visual aids in real time as they occur and then processing the combination of streams to create a synchronized multimedia presentation. The DejaView player 304 may be described as part of a media journaling application.

Figure 28:
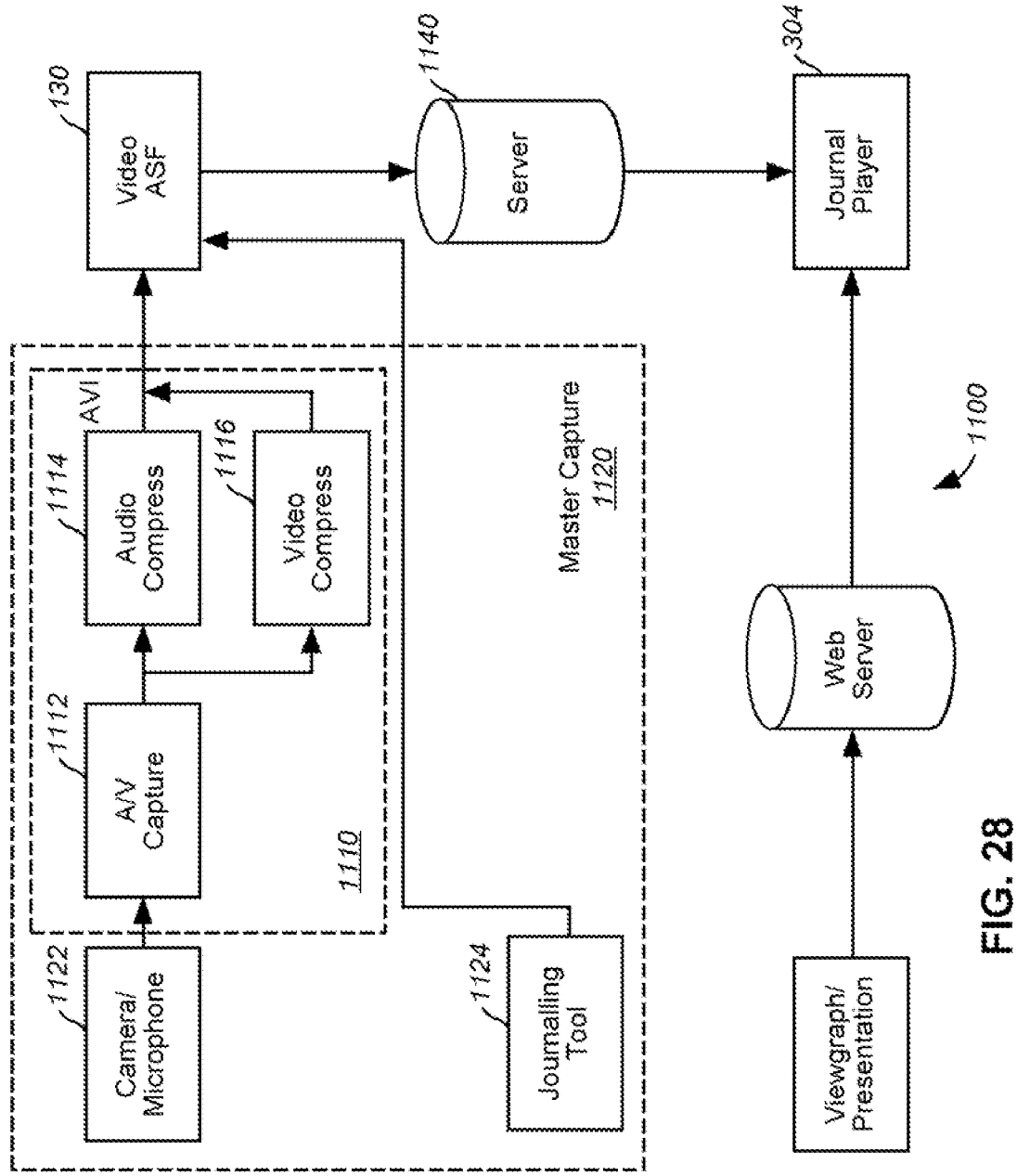
FIG. 28 is an example of an embodiment of a system that includes a journaling application for recording and playing back a multimedia presentation.

Referring now to FIG. 28, shown is an example of an embodiment of a media journaling application that includes the player 304 and other application components. This journaling application, in functional terms, provides a user with the capability of capturing multimedia content and related information to create a synchronized multimedia presentation. For example, a seminar style presentation may be captured digitally in real-time. Using certain post-processing techniques, within a very short period thereafter, additional information is combined and synchronized therewith. The new presentation is then made available on a network such as the Internet through a media journal player. The player 304 is, for example, a web browser-based and allows the user to view the whole presentation, or allows for seeking to different places in the presentation while maintaining the synchronization. Various aspects and components will be described in following paragraphs.

Referring to FIG. 28, shown is an embodiment of a media journaling system 1100 which includes an audio/video capture digitizer 1110 that works within a master capture 1120 to create and capture an audio/video presentation for further combination with other inputs, for example, a viewer's notes or a presenter's slides. The audio/video master capture 1110 includes an audio/video capture 1112 which is adapted to receive, for example, an analog video or audio signal, or both (hereinafter referred to as an audio/video signal). The captured audio/video signal is converted to corresponding digital signals that are further compressed in the audio compressor 1114 and video compressor 1116. The audio/video capture and digitizer 1110 are well known in the art, and are commercially available, for example, as a Winnov Videum AV card.

In this embodiment, the master capture 1120 includes a camera/microphone 1122 for actually recording an audio/video event. The output of the camera/microphone 1122 is typically an analog output that would require digitization and compression by the audio/video capture and digitizer 1110. However, one of ordinary skill in the art recognizes that with the increased availability of digital audio/video recording devices, audio/video interleaved (AVI) output may be immediately available such that the audio/video capture and digitizer may be bypassed in its entirety.

Time stamps may be determined, for example, in an automated or manual fashion for each of the viewgraphs in which each time stamp is a temporal marker in the speaker presentation. In one embodiment, this time stamp recordal may be automated using a user interface as may be included, for example, in the journaling tool 1124. Using this tool, the user may select a particular viewgraph to be used as an index. This selection may be made, for example, by clicking a mouse button. Upon this selection, corresponding time stamp information may be recorded in a predetermined file format. One or more of these timestamps may be stored in a timestamp file. The timestamp file may be used in connection with an AVI file, for example, which interleaves audio and video information into a single file format. An AVI file may be produced, for example, by monitoring real-time capture of raw audio-video feed. In one embodiment, an NTSC analog video feed from a camera may be connected to a personal computer. The personal computer may be, for example, a Pentium-class processor having a video digitizer card to digitize the incoming audio/video stream in real time to produce a single interleaved stream, an AVI file. Additionally, other information, such as textual notes, may also be generated using similar manual and/or automated techniques.

In one embodiment, the journaling tool 1124 used to record the presentation information may be, for example, incorporated into a standard web browser such as Microsoft Internet Explorer or Netscape Navigator. As known to those skilled in the art, alternatives, such as a stand-alone solution, may also be used in which standalone applications may access the Internet or other network directly. The journaling tool may use, for example, Windows Media Technologies from Microsoft Corporation, to integrate timestamp information that may be recorded also using the journaling tool as previously described.

Each of the different media streams, such as the AVI file, may be indexed with the time-stamp information, as may be gathered and stored in the time-stamp file. In one embodiment, a commercially available Microsoft tool, vidtoasf, may be used to produce a file that includes the time stamp information integrated into the AVI file. This tool outputs such a file in a commercially specified file format, the ASF or Active Stream File format that may be served or provided by a software server, for example, written using Microsoft Windows Media Technologies. The ASF file has the time stamp information embedded in it such that a DejaView player may trap and respond to viewgraph change events as the ASF stream the player is receiving plays out. The player then interprets these events using scripting logic within DejaView that updates the slideshow, notes and controls of the tool. In other words, the ASF file may be received by the DejaView player. As the ASF stream is received, the Windows Media Player ActiveX controls used by the player to present the stream is able to raise events corresponding to the timestamps detected in the stream. These events may be trapped and interpreted by scripting logic included in the player.

As known to those skilled in the art, ActiveX controls are generally reusable pieces of code written for example, in C++, Java, Visual Basic and the like. These may be incorporated into an HTML page to extend browser capabilities. Microsoft makes available a variety of ActiveX controls, such as those installed with Internet Explorer. Controls used in one embodiment of DejaView, for example, include Microsoft's Windows Media Technologies Control and Image Control. The Windows Media Player ActiveX control functions as a player of streaming audio/video, embedded in a Web page. It should be noted that viewgraph images may be displayed using the Image ActiveX control using, for example, the PicturePath property which is the URL of a .GIF or .MPEG image to be displayed.

An embodiment of the journaling tool may either be physically co-located or physically remote to the journaled event location. If co-located, the journaling tool may include a digitizing PC, video source (from camera), and audio input (local microphone). Available video capture software located on the digitizing PC, includes VidCap from Microsoft Corporation (which does not compress audio) or Premiere from Adobe. When the journaling tool is physically remote from the journaled event, the journal event's audio/video feed may be supplied in analog form via a cable, or digitally via a data network, for example.

Using Microsoft's Windows Media Technologies, an AVI file, and the timestamp log file, the ASF file may be produced including the integrated indexing information. The ASF file is in a form that may be streamed from a Windows Media Technologies server in real time to the journaler player, the DejaView player 304. The ASF movie may be stored in the Windows Media Technologies server 1140 along with other media on a web server and is ready for streaming from the server 1140. It should be noted that the Windows Media Technologies server is currently available from Microsoft Corporation. The ASF movie includes the timing information, as may be recorded using a journaling tool. A journaling playback device, such as the player 304, may be able to trap and respond to viewgraph change events as they occur accordingly updating other data streams, such as notes. The slide miniatures may be located, for example, also on the server 140 that may optionally be connected to a journaling tool.

Viewgraph miniatures may also be included in this embodiment, for example, to be displayed by the browser tool 316. These miniatures may be created using Microsoft Powerpoint97 if the viewgraphs are created using this application also. This may be done, for example, by using the Powerpoint97 "Save as HTML" wizard to generate the JPEG images.

In one embodiment as depicted in the system 1110, the journaling software application may include a player and a server component. The DejaView player 304 may be the client portion of the application residing and executing on a user's computer. The DejaView Player may be written, for example, using Windows Media Technologies and other components as described elsewhere herein. The DejaView Server portion may be written using the commercially available Microsoft Windows Media Technologies Server, for example, in which the server computer may be running Windows NT Server 4.0. To support the media capture process, a Pentium class PC running Windows 95 or Windows NT 4.0, for example, may be used. A video digitizer card may be, for example, the Winnov Videum AV card that also supports audio capture. A video camera, such as a SONY Hi-8 CamCorder, may be used to capture the audio/video feed of a presenter or speaker. In this embodiment, other cameras capable of producing an NTSC video out may also be used. It should be noted that the NTSC out of the camera may be fed directly into the video input of the video capture card of the computer supporting realtime video digitization.

The DejaView Player 304 may run, for example, on a Microsoft Windows 95 or NT platform and operates in one embodiment using Microsoft Internet Explorer 4.X. Playback of a DejaView presentation, such as using the ASF file in an embodiment, may be used in a computer system in conjunction with the Microsoft Windows Media Technologies Player. The Windows Media Technologies Player ActiveX control is an integral component in one implementation of the DejaView player. The Microsoft Windows Media Technologies Server may be used to stream audio/video content to DejaView players. The Microsoft Windows Technologies Server is supported, for example, on an NT 4.0 server platform.

Any one of a variety of video capture software tools may be used to digitize DejaView presentation feeds. For example, Microsoft VidCap or Adobe Premiere may be used. Alternatively, different hardware, such as the Videum video capture hardware, may also include software utilities for this purpose. Generally, the foregoing may vary in accordance with each embodiment and implementation.

The ASF file may be made available to clients from a Windows Media Technologies server. Other relates files, such as the JPEG viewgraphs, may be placed in locations on a Webserver being used in support of the DejaView player 304.

Figure 29:
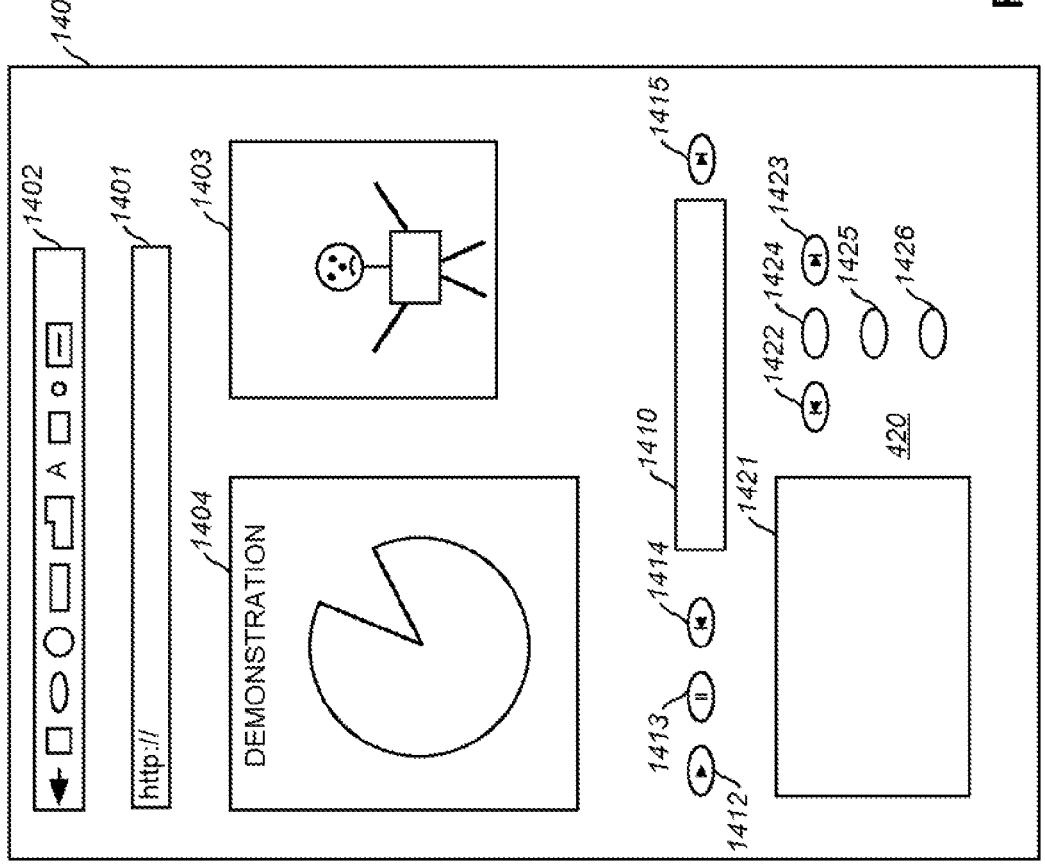
FIG. 29 is an example of an embodiment of a user interface display of a journaling application.

Referring now to FIG. 29, shown is an example of an embodiment of user interface screen of a journal player 304. In this example, the player 400 is an example of an embodiment of the DejaView player 304. It is depicted implemented as a web-based application, and hence is shown as accessed from a predetermined web site 1401. As may be seen, a web command window 1402 is the web based application interface, i.e., a Netscape Navigator or Microsoft Internet Explorer interface for allowing a user to issue commands via the web interface. The journal player 304 allows a user to playback and interact with multimedia presentations of journaled events. As the ASF movie is received by the journal player 304, Windows Media Player ActiveX is able to raise events corresponding to the time stamps detected in the movie stream. These events may be trapped and interpreted by programming logic of the journal player 304. Importantly, the journaled event may be provided to the journal player 304 across a network in real time, and a base of available content may change dynamically. A talking head window 1403 provides a video window that presents a talking head video of a presenter (with accompanying audio), for example. A graphics display window 1404 displays graphic images, for example, the presenter's view graphs. An electronic notepad window 1421 displays, for example, textual information pertaining to a presentation. A user may also create additional notes while viewing the presentation when a timing event coordinator tool is provided (to be described). Such newly created notes may be kept in synchronization by the journaling tool. The notes are storable on network servers for subsequent retrieval, or for sharing amongst users (several sets of notes) in a groupware environment. The journal player 304 may present the contents of the talking head window 1403, the graphics display window 1404 and the electronic notepad 1421 at the appropriate times.

The journal player 304 may also include a plurality of user controls for allowing a user to navigate the player to different parts of a presentation. In the embodiment, the first set of user controls are grouped together as navigation controls 1410. Navigation controls 1410 include a play control 1412, a pause control 1413, and previous slide 1414 and next slide 1415. The play control 1412, as the name implies, causes the presentation to begin to play, either from an initial start of resuming from a pause position. The pause control causes the presentation to temporarily freeze until the pause control 1413 is again selected or the play control 412 is elected. Alternatively, the play and pause controls 1412 and 1413 are integratable into a single control that toggles from the play to pause function and vice versa according to the current function. A table of contents menu 1411 is also included that provides a menu displaying the titles of the view graphs used by the presenter, which menu effectively acts as a table of contents for the presentation. A user may thus browse a presentation and go directly to an area of particular interest by selecting the view graph corresponding thereto. The presentation will resume synchronized playback from the point of the selected view graph. Alternatively, one could add functionality to allow a user to fast forward or fast reverse through the video itself while maintaining synchronization with the associated view graphs and notes.

A second set of user controls are the browse controls 1420 that allow a user to browse the user notes that are displayed in notes window 1421. There may be a one-to-one mapping of the user notes and view graphs in the journaled presentation as ensured by the journaling tool. Using the note window controls 1422 through 1426, the user may move back and forward any number of note pages independently of the rest of the presentation. Forward note control 1422 and back note control 1423 allow the user to go forward and backward through the notes, respectively. Once a desired note is found, the user may cause the journal player to resynchronize the rest of the presentation with that note by selecting a seek control 1424. A new note control 1425 is provided which allows the user to enter a new note, that may be synched to the presentation at its current position upon selecting the save control 426.

Figure 30:
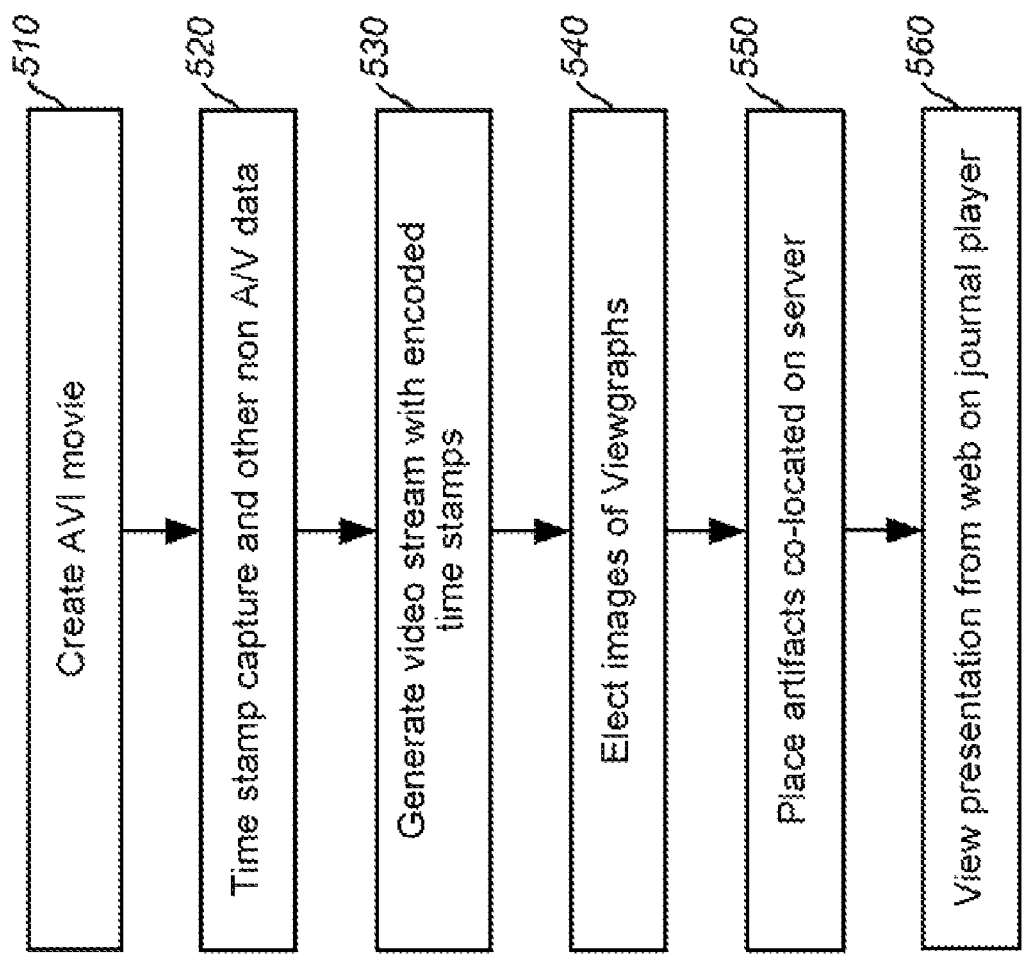
FIG. 30 is an example of a flowchart of an embodiment of steps of a method for capturing and viewing multimedia information.

Referring now to FIG. 30, shown is a flowchart of steps of a method for capturing and viewing information using the player 304, an embodiment of which has been described as included in FIG. 28, and FIG. 15. An AVI movie may be created in step 510. This step may additionally be an audio only capture, a video only capture, or an audio/video capture. Alternatively, the AVI movie may take the form of selecting and arranging content from pre-existing sources, such as a video tape of an event. At step 520, time stamps may be captured for any information related to the AVI movie of step 510. As already described, view graphs may be time stamped according to their presentation with a speaker (AVI movie). No limitation is intended in the present invention to view graphs as the AVI movie will dictate what additional content would be co-presented and hence time stamped accordingly. For example, photographs may be presented and time stamped with each introduction during a presentation. As an example, if the journaled event is a trial, then the exhibits may be time stamped when introduced and discussed. Importantly, the related information need not actually be present at this time because so long as a cue is provided that a time stamp is to be made, the content may be provided later. The time stamped related information could come from a web site or server and may be called as necessary during a presentation playback so long as the time stamp and identifying information may be recorded.

Having the appropriate video and corresponding related content now being properly time-stamped, a video stream is generated at step 530 with the time stamps now encoded in the AVI movie. The images or view graphs are elected in step 540 so that during a playback these images may be located and co-displayed with the presentation. In the system 300, these selected viewgraphs may be the multimedia indices, for example, stored in the database 308 and displayed by the browsing tool 316. At step 550 the images and any other items for playback of a presentation are stored on appropriate servers. The playback of the presentation on a journal player is accomplished at step 560. Referring back to FIG. 15, in system 300, the player 304 may be transferred control by the browsing tool 316 upon the user may requesting a presentation, for example, from a list. The images, notes and other information of the presentation may be included in the multimedia information storage 302. This information used in connection with the presentations may be accessible from a web site and the information accordingly provided to the journal player with the images, notes, and other non-presentation information being downloaded to the player from their corresponding server locations. Microsoft's Windows Media Technologies, as described in other locations herein in one embodiment, is effective for synchronizing the several media elements or software components based on events as they occur, for example, during a video stream. However, one limitation is that all time stamp information to be embedded in such video stream must be known a priori, that is, at compile time when the ASF movie is generated. While this provides a preferred realization for those instances where interactive synchronization is not required and the convenience of using currently available off-the-shelf products is desired, this does not provide a flexibility to allow users to generate their own notes any time during playback (i.e., runtime synchronization). An alternative involves using a timing event coordinator for creating time stamps post video stream.

Using the foregoing, additional flexibility may be achieved. Additional functionality of the real-time multimedia journaling may be achieved as well by using a timing event coordinator in place of the Windows Media Technologies element. The timing event coordinator keeps time and coordinates events among software components that exhibit temporal state changes. Use of the timing event coordinator herein will be described in an environment for synchronizing components within a multimedia presentation. However, one skilled in the art will recognize that application of the timing event coordinator is not limited to presentation type events. A presentation typically engages a user, has some initial state, $T_{begin}$, and changes state at discrete times as the presentation progresses to an end time, $T_{end}$. The coordinated components are the separate pieces of the presentation (events) that used to change state at discrete times.

Figure 31:
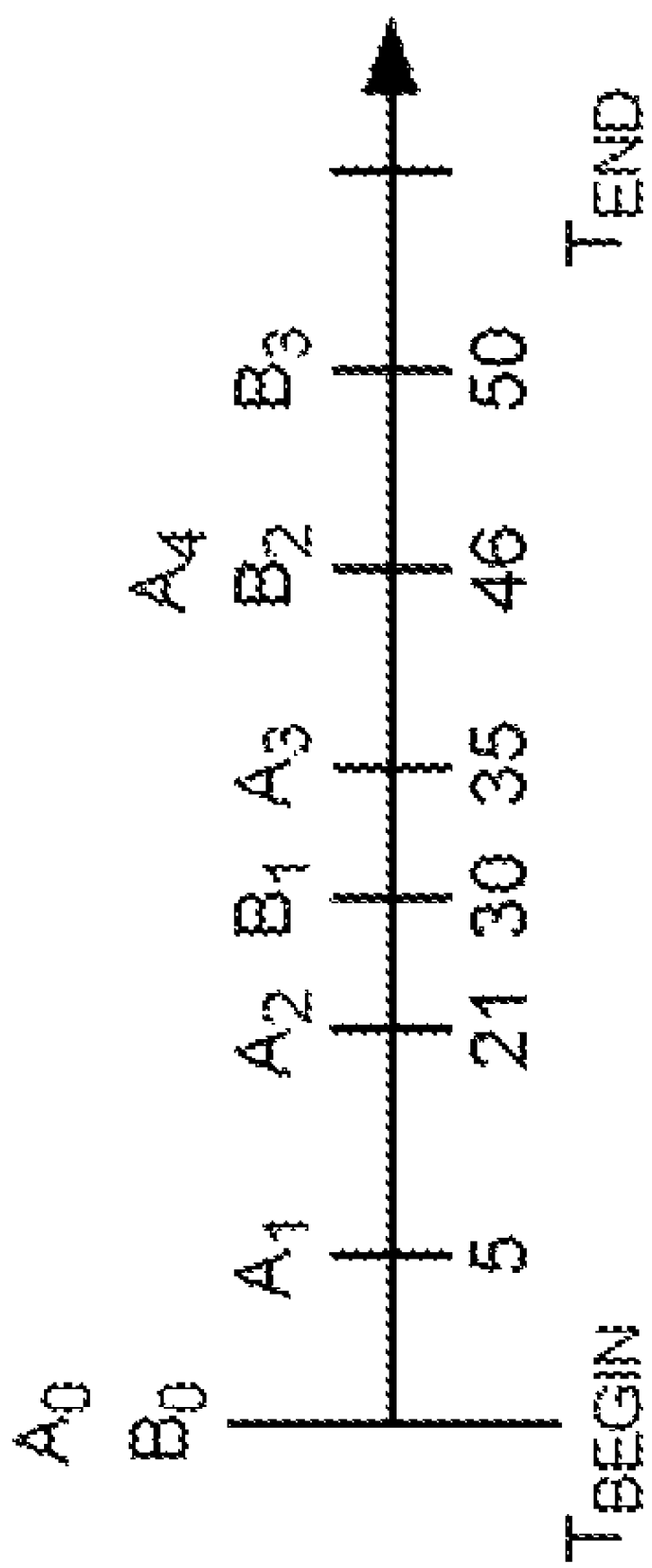
FIG. 31 is an example of an embodiment of a time line as may be used to represent the time coordination of events in a multimedia presentation.

Referring now to FIG. 31, shown is an example of an embodiment of a timeline that may be used to represent time coordination of events in a multimedia presentation. The timeline 601 is an example used in a presentation having only two coordinated components, A and B. However, the following may be generalized to more than two components and associated events. The timeline 601 includes numbered state changes for each component. For example, component A may represent view graph change events having an initial state $A_0$ at the start of the presentation and first changes state at $A_1$. Component B may represent note change events, for example, and may have an initial state $B_0$ and first changes state at $B_1$. A synchronized application may be created by having each component maintain its own time relative to the start of the presentation, $T_{REL}$. Alternately, each component may rely on a dedicated timing coordinator for notification to change states. This approach is described in more detail below.

The timing event coordinator may maintain state information for each component for the set of times, S, each relative to the presentation start time, $T_{REL}$, as to when they should change their state. Thus for component A, $S=\{A_0, A_1, A_2, A_3, A_4\}$. In addition to registering a set of time events with each component, a type may be used to differentiate the components, i.e., A=view graphs, B=notes. Each type has an index associated with each time, which index identifies the sequential relationship or order (the first state for that type, the second state, etc.). Additionally, each type may have a flag associated therewith to provide information as how to treat that type. As an example, the flag may be binary state of a "0" or a "1" that differentiates between two different treatments in which "0" means treat special, and "1" means no special treatment. Special treatment, in this example, may be that if a user jumps to a certain location in a presentation, then that component type with the "special flag" set may be treated so as the most current component relative to that location, should be displayed.

Thus, when each component registers its set, S, the timing event coordinator may merge S into a table of triples having value, type and index for each element of S, for which a flag may also be associated. For the timeline provided in FIG. 6, the table of combined sets, C, is as follows:
C={(0,1,0) (0,2,0) (5,1,1) (21,1,2) (30,2,1) (35,1,3) (46,1,4) (46,2,2) (50,2,3)}.
The first two triples of C describe components A and B respectively and refer to their initial values at time zero, with A represented as a type one, and B represented as a type two, each having an index initially at zero. The third triple in C is associated with component A for a time equal to five seconds, and has an index of "1" (the second A in the set).

The timing event coordinator supports an interface that allows a component to set the time $T_{REL}$ to an arbitrary time value, V. If this occurs, the timing event coordinator looks in C for a matching time value. If a match is found, events are generated with the corresponding type and index fields. These events are used to instruct the component represented by the associated type to perform that action at that time. If no matches are found, the timing event coordinator looks to the next greater triple in C, calculates the difference between the current $T_{REL}$ and sets a timer to raise an event at this time difference. Each time and event is raised by the timer, the period to the next event is determined for the next greater time value and the timer is set accordingly. This is repeated for each next greater time value. A reference for the timer concerning where in the video stream the event occurs is maintained by creating a series of predetermined time stamps in the video stream. In other words, a time stamp may be created every second with no component or event associated therewith. The granularity of such predetermined time stamps is determined according to the specific application requirements.

In one embodiment, the timing event coordinator may be implemented as an ActiveX control and may be used within Internet based applications including software components based on Java applets or ActiveX controls. Neither Java applets or ActiveX controls are intended to be a limitation in an embodiment or implementation of the timing event coordinator. In a typical application of the timing event coordinator, VBScript code within the application registers view graph change events with the timing event coordinator. The registration is with the type="1," flags and the set, $S_1=\{t_0, t_1, t_2, \ldots t_n\}$ of time stamp values. These time stamp values represent the times relative to the start of the presentation (as defined by the audio/video record of the presentation) when view graph change events occurred. For example, $t_4$ would represent the time when the fifth view graph change occurred.

The notepad component may register with the timing event coordinator with type=2, flags and the set, $S_2=\{u_0, u_1, u_2, \ldots u_n\}$ of time stamp values. These time stamp values represent the times relative to the start of the presentation that the individual notes were submitted. The timing event coordinator merges the notepad component registered timestamp information with the previously registered view graph display component time stamp information.

For example, if a user selects "goto note three" the application notifies the timing event coordinator and instructs it to go to type=two, index=two. The timing event coordinator responds by generating two events, one to the notepad component requesting a change to note three, and one to the view graph display component requesting a change to the view graph that present at this point in the presentation. Additionally, the application invokes an operation on the timing event coordinator to get the current $T_{REL}$ at the note three point. This is used to inform the audio/video component where to seek to in the associated media stream. Unless otherwise directed by the user, the application proceeds in normal fashion through the remainder of the presentation.

Using the timing event coordinator, users may be able to make new notes at runtime (in addition to those already recorded). A user viewing a presentation may take a note at any given point in the presentation. The notepad component may then contact the timing event coordinator to retrieve the current $T_{REL}$ at the new note point. After the note is complete, the notepad component may notify or signal the timing event coordinator and re-register its timing information using the same type as before. This new note then may function as the other notes. Still further, other users may make their set of notes available, for example, from a server, such that a group of users may share notes.

Figure 32:
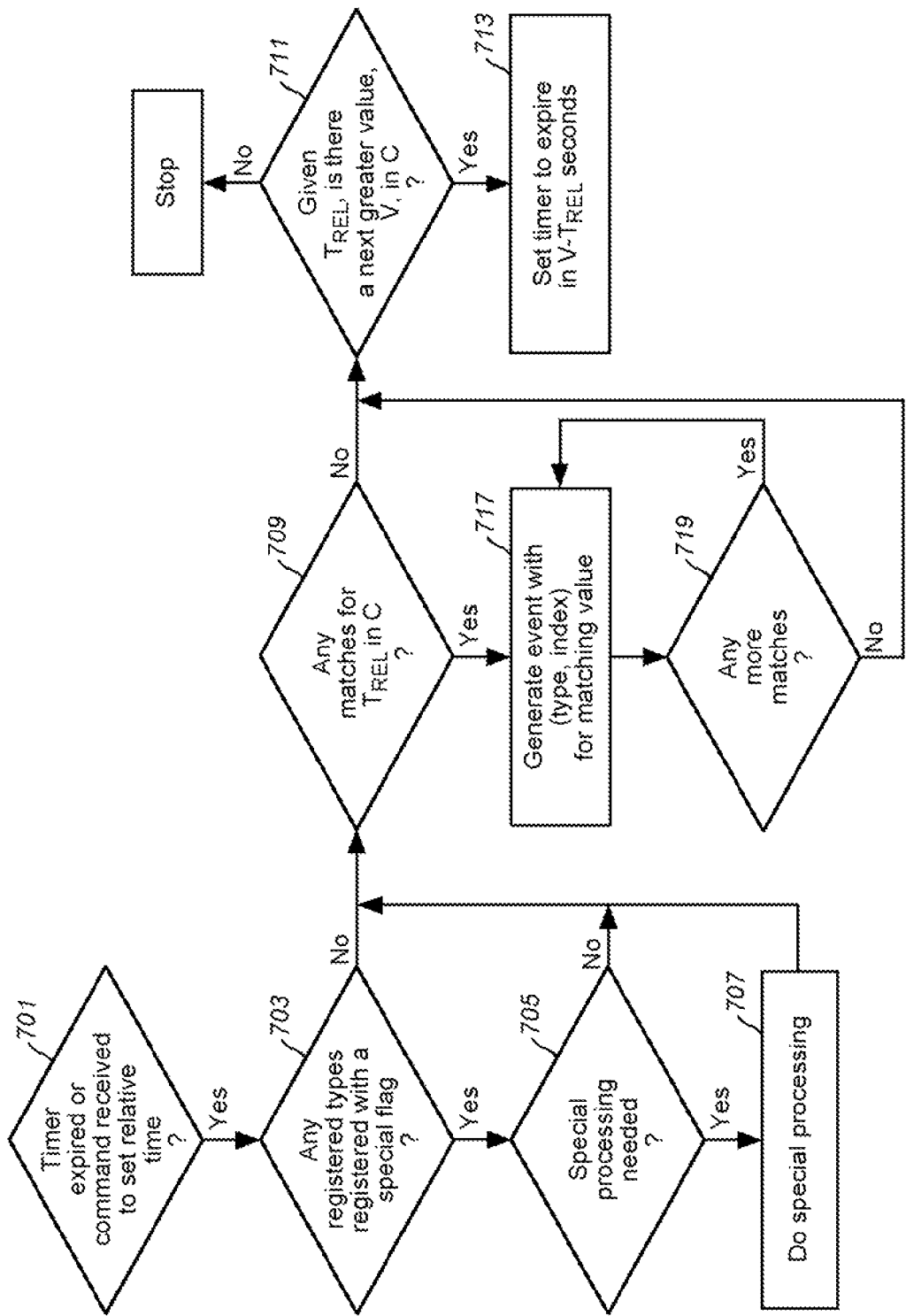
FIG. 32 is a flowchart of method steps of an embodiment for synchronizing interrelated components of a multimedia presentation.

Referring now to FIG. 32, shown is a flowchart of method steps of an embodiment for synchronizing interrelated components of a multimedia presentation. In this flowchart, steps that may be performed by a timing event coordinator are shown in flow diagram form for synchronizing interrelated components in a presentation as described above. The timing event coordinator method begins at step 701 which represents either the start of a presentation, or is caused by a user request to go to a certain time or event. At step 703 a test is made to determine whether any of the registered software component types have a special flag associated with them. Thus, if any one of the software components has a special flag, the result of the test will always be yes and control will flow to step 705. Assuming that a special flag is associated with one of the software components, a second test as to whether any special processing is needed is made at step 705. An example of special processing, for example, includes determining whether one or more software events need to be updated (or not updated) to the requested command and its associated time. A certain application of a journaled presentation may require that a view graph be updated to the requested time or command, but not the associated note, hence requiring special processing. Step 707 carries out such special processing.

If no special flags were detected in step 703, processing goes directly to step 709 where a test is made for matches in the relative time, $T_{REL}$, and the software components. A lack of any software component matches causes processing to proceed to step 711 wherein the presentation is restarted at $T_{REL}$ and a check is made to determine whether there is a greater time value, V, left in the presentation. A greater time value V will be treated in step 713 such that the difference between V and $T_{REL}$ is calculated and the timer is set to expire in that calculated time period. Control then returns to step 701. If there is not a greater time value, V, then the playback is concluded. Going back to step 709, if a match was found for $T_{REL}$ and the software component, then step 719 is executed where an event is generated such that the index for the type and index for that matching value. Step 719 is performed if more than one match was found (i.e., a note and view graph changed simultaneously). Steps 717 and 719 are repeated until all matches are processed before control is given to step 711.

While the invention has been particularly shown and described with reference to preferred embodiments thereof, it will be understood by those skilled in the art that various changes in form and details may be made therein without departing from the spirit and scope of the invention. The invention has been described using several commercial off the shelf products, which are not meant to be limitations as alternative products may be substituted given they provide suitable functionality for performing the tasks. Still further, the media journaler has been described using a presentation as the application environment. The use of the media journaler may be generalized and apply to other presentations and applications having different event types and occurrences than, for example, coordinating the events of presenters, view graphs and notes.

It should be noted that other techniques may be used to gather time-stamp and other information needed to appropriately synchronize the various media streams in accordance with each embodiment and implementation.

While the invention has been disclosed in connection with preferred embodiments shown and described in detail, various modifications and improvements thereon will become readily apparent to those skilled in the art. Accordingly, the spirit and scope of the present invention is to be limited only by the following claims.

The invention claimed is:

1. A method comprising:
   determining a subset of multimedia presentations in accordance with predetermined criteria;
   determining one or more multimedia data items, each of said one or more multimedia data items being an index into a corresponding one of said subset of multimedia presentations according to an indexing media format that is selected from a plurality of media formats associated with a corresponding one of said subset of multimedia presentations and each index being associated with a record in a database comprising at least a timestamp field that stores information identifying a temporal reference that indicates a play-time associated with a corresponding one of said subset of multimedia presentations;
   presenting said one or more multimedia data items for viewing in a user interface display;
   receiving at least one of direction controls and speed controls of said one or more multimedia data items viewed;
   receiving a selection of a first of said one or more multimedia data items; and
   transferring control to machine executable code executed to present a first one of said subset of multimedia presentations having said first multimedia data item as an index;
   wherein said first one of said subset of multimedia presentations is a for on-line shopping of a product.

2. A computer program product comprising machine executable code configured to cause a computing twice to perform the method of claim 1.

3. The method of claim 1, wherein said viewing one or more multimedia data items includes:
   presenting a hierarchical description of the information in an outline area; and
   presenting said one or more multimedia data items in a presentation area, said hierarchical description being synchronized with a first temporal arrangement of said one or more multimedia data items in said presentation area.

4. The method of claim 3, wherein said multimedia data items are presented in said presentation area using a stacking technique in which successive multimedia data items are presented slightly overlapping one or more previously presented multimedia data items, and the method further includes:
   controlling speed and direction of said one or more multimedia data items presented by stacking and unstacking successively presented multimedia data items in said presentation area.

5. The method of claim 3, wherein said multimedia data items are presented in said presentation area using a scrolling technique in which successive images are presented along a two-dimensional axis, and the method further includes: controlling speed and direction of said one or more multimedia data items are presented by controlling the direction and speed at which said one or more multimedia data items are presented along said two-dimensional axis.

6. The method of claim 3, wherein said multimedia data items are presented in aid presentation area using a three-dimensional presentation technique in which said multimedia data items are presented with a three-dimensional perspective with regard to a display viewpoint at a particular time.

7. The method of claim 3, wherein some of said multimedia data items includes a group of one or more images having a parent-child relationship in which there is one parent multimedia data item and one or more child multimedia data items, and the method further includes:
- dividing said presentation area into four quadrants;
- presenting said parent multimedia data item near a center of said presentation area; and
- presenting subsequent child multimedia data items beginning in an upper left quadrant and proceeding to present successive multimedia data items on a clockwise rotation in successive quadrants.

8. The method of claim 7, wherein each of said four quadrants is further divided into four subquadrants, each of said four quadrants having an outermost subquadrant corresponding to an outermost corner of said quadrant with respect to said presentation area, each of said child multimedia data items being presented in an outermost subquadrant associated with a quadrant, an outer corner of mid each child multimedia data item being randomly located within said outermost subquadrant.

9. The method of claim 1, wherein each of said multimedia presentations includes at least two media streams, a first media stream being used and index into said second media stream, wherein said first and second media streams are different.

10. The method of claim 9, wherein said second media stream is an audio stream and said first media stream is an image-based medium.

11. The method of claim 9, wherein each of said first and second media streams are the same.

12. The method of claim 1, further comprising: producing a database of indices, each of said indices being a multimedia data item.

13. A method comprising:
- determining one or more indices for a multimedia presentation, wherein each index is determined according to an indexing media format that is selected from a plurality of media formats associated with the multimedia presentation, said multimedia presentation having a first media stream and a second media stream, a portion of said first media stream being a first index into a portion of said second media stream, said first index being one of said one or more indices;
- storing information about said one or more indices in a database, said information comprising at least a timestamp field of a record that identifies a temporal reference that indicates a play-time associated with said multimedia presentation;
- providing multimedia objects in accordance with said information about said indices in said database for viewing in a user interface display;
- receiving at least one of speed controls and direction controls of said multimedia objects displayed;
- receiving a selection of a first of said multimedia objects; and
- invoking a software program for presenting said multimedia presentation having said first multimedia object as an index;
- wherein said software program is an electronic commerce shopping application, said first media stream and said second media stream reference a single media stream, said single media stream being an image stream of products for sale.

14. A computer program product comprising machine executable code configured to cause a computing device to perform the method of claim 13.

* * * * *